US012404983B1

(12) United States Patent
Okubo et al.

(10) Patent No.: US 12,404,983 B1
(45) Date of Patent: Sep. 2, 2025

(54) VEHICLE LAMP

(71) Applicant: Ichikoh Industries, Ltd., Isehara (JP)

(72) Inventors: Yasuhiro Okubo, Isehara (JP); Takayuki Kawamura, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/858,511

(22) PCT Filed: Apr. 26, 2023

(86) PCT No.: PCT/JP2023/016410
§ 371 (c)(1),
(2) Date: Oct. 21, 2024

(87) PCT Pub. No.: WO2023/210678
PCT Pub. Date: Nov. 2, 2023

(30) Foreign Application Priority Data

Apr. 27, 2022 (JP) .................................. 2022-073748
May 27, 2022 (JP) .................................. 2022-086939
Jun. 6, 2022 (JP) .................................. 2022-091900

(51) Int. Cl.
*F21S 43/20* (2018.01)
*F21W 103/60* (2018.01)

(52) U.S. Cl.
CPC ... *F21S 43/26411* (2024.05); *F21S 43/26231* (2024.05); *B60Q 2400/50* (2013.01); *F21W 2103/60* (2018.01)

(58) Field of Classification Search
CPC .................. F21W 2103/60; B60Q 2400/50
See application file for complete search history.

(56) References Cited

U.S. PATENT DOCUMENTS

2019/0322209 A1* 10/2019 Sugiyama ............... F21S 43/26
2022/0120406 A1* 4/2022 Woo ...................... F21S 43/255
(Continued)

FOREIGN PATENT DOCUMENTS

JP 2019-84915 A 6/2019
JP 2019-192350 A 10/2019
(Continued)

OTHER PUBLICATIONS

International Search Report issued Jul. 11, 2023 in PCT/JP2023/016410, filed on Apr. 26, 2023, 4 pages.

*Primary Examiner* — Eric T Eide
(74) *Attorney, Agent, or Firm* — Oblon, McClelland, Maier & Neustadt, L.L.P.

(57) ABSTRACT

A vehicle lamp includes first and second light sources, a collecting lens that collects light, a shielding member that passes collected light through a radiating slit, and a projecting lens that forms a radiation pattern with light. The collecting lens includes a first lens portion and a second lens portion that correspond to the first and second light sources, respectively, the radiating slit includes a near-side slit portion and a far-side slit portion that correspond to a near-side radiation design and a far-side radiation design, respectively, in the radiation pattern, the first lens portion and the second lens portion are opposed to the far-side slit portion and the near-side slit portion, respectively. A collecting lens member, the shielding member, and a projecting lens member are fixed to a supporting member such that a collecting lens frame and a shielding frame overlap with each other in an optical axis direction.

21 Claims, 20 Drawing Sheets

(56) References Cited

U.S. PATENT DOCUMENTS

2023/0166650 A1\*  6/2023  Lim .................. F21S 43/14
2023/0294595 A1\*  9/2023  Ryoo ................ F21S 45/47
                                                362/516

FOREIGN PATENT DOCUMENTS

| JP | 2019-215958 A | 12/2019 |
| JP | 2020-102332 A | 7/2020 |
| JP | 2021-111465 A | 8/2021 |

\* cited by examiner

VEHICLE LAMP

TECHNICAL FIELD

The present disclosure relates to a vehicle lamp.

BACKGROUND ART

Vehicle lamps that form a radiation pattern on a road surface in the vicinity of a vehicle has been considered (for example, see Patent Literature 1). This conventional vehicle lamp projects light from a light source through a slit of a shade (shielding member) to form a radiation pattern and can inform a viewer of some intention. This conventional vehicle lamp guides the light from the light source to the shade with a light guide and thus efficiently uses the light from the light source. Further, a vehicle lamp described in Patent Literature 3 has a configuration in which the light from a light source is collected by a collecting lens, the collected light is emitted to a slit of a shielding member, and the light transmitted through the slit is emitted to a road surface in front of a vehicle by a projecting lens. With this configuration, each optical member of the collecting lens, the shielding member, and the projecting lens is supported by a supporting member in a state of being held by a component such as a frame or a case.

CITATION LIST

Patent Literature

PTL 1: Japanese Unexamined Patent Publication No. 2019-192350
PTL 2: Japanese Unexamined Patent Publication No. 2020-102332
PTL 3: Japanese Unexamined Patent Publication No. 2021-111465

SUMMARY OF THE INVENTION

Problems to be Solved by the Invention

However, in the conventional vehicle lamps, since the light from the light source is diffused in the light guide to make the light (light flux) distribution on the shade uniform, it is difficult to adjust the light distribution on the shade, and it is difficult to form a radiation pattern having a desired brightness distribution. Further, in the vehicle lamp described in Patent Literature 3, it is required to accurately attach each optical member.

The present disclosure has been made in view of the above-described circumstances, and an object of the present disclosure is to provide a vehicle lamp capable of forming a radiation pattern having a desired brightness distribution while efficiently using light from a light source, and capable of accurately attaching an optical component.

Means for Solving the Problem

A vehicle lamp according to the present disclosure includes a first light source and a second light source arranged in parallel, a collecting lens that collects light from the first light source and the second light source, a shielding member that is provided with a radiating slit that partially passes the light collected by the collecting lens, and a projecting lens that projects the light having passed through the shielding member to form a radiation pattern, the collecting lens includes a first lens portion that corresponds to the first light source and a second lens portion that corresponds to the second light source, the radiating slit includes a near-side slit portion that corresponds to a near-side radiation design projected onto a near position in the radiation pattern and a far-side slit portion that corresponds to a far-side radiation design projected onto a farther position than the near-side radiation design in the radiation pattern, the first lens portion is provided to be opposed to the far-side slit portion, and the second lens portion is provided to be opposed to the near-side slit portion.

A vehicle lamp according to the present disclosure includes a plurality of light sources, a collecting lens that collects light from the plurality of light sources, a shielding member that is provided with a plurality of slit portions that partially passes the light collected by the collecting lens, and a projecting lens that projects the light having passed through the shielding member to form a radiation pattern including a plurality of radiation designs that corresponds to the plurality of slit portions, the light sources are provided individually corresponding to the slit portions, and the collecting lens includes a plurality of lens portions that individually corresponds to the slit portions and overlaps with each other and is provided with a light reduction portion that reduces light between the plurality of lens portions.

A vehicle lamp according to the present disclosure includes a light source, a collecting lens member in which a collecting lens that collects light emitted from the light source and a collecting lens frame holding the collecting lens are formed as one member, a shielding member in which a slit formation portion including a slit that partially passes a part of the light collected by the collecting lens and a shielding frame holding the slit formation portion are formed as one member, a projecting lens member provided with a projecting lens that projects the light having passed through the slit onto a road surface to form a radiation pattern, and a supporting member that supports the light source, and the collecting lens member, the shielding member, and the projecting lens member are fixed to the supporting member such that the collecting lens frame and the shielding frame overlap with each other in an optical axis direction.

In the above-described vehicle lamp, the entire collecting lens member is formed using a material forming the collecting lens, and the shielding member is formed to cover the collecting lens and the collecting lens frame of the collecting lens member when viewed from the front.

In the above-described vehicle lamp, in the projecting lens member, the projecting lens and a projecting lens frame holding the projecting lens are formed as one member, and the collecting lens member, the shielding member, and the projecting lens member are fixed to the supporting member such that the collecting lens frame, the shielding frame, and the projecting lens frame overlap with each other in the optical axis direction.

In the above-described vehicle lamp, the collecting lens of the collecting lens member is provided behind the collecting lens frame in the optical axis direction, and the projecting lens of the projecting lens member is provided in front of the projecting lens frame in the optical axis direction.

In the above-described vehicle lamp, the supporting member includes a base portion including a support surface that supports the light source and a fixing portion that fixes the collecting lens frame, the shielding frame, and the projecting lens frame, and the fixing portion protrudes from the support surface.

In the above-described vehicle lamp, the fixing portion is provided with an end surface serving as a reference surface to fix the collecting lens frame, the shielding frame, and the projecting lens frame at a leading end in a protruding direction, and the end surface is formed to be orthogonal to the optical axis direction.

Effect of the Invention

With the vehicle lamp according to the present disclosure, it is possible to form a radiation pattern having a desired brightness distribution while efficiently using light from a light source, and it is possible to accurately attach an optical component.

MODE FOR CARRYING OUT THE INVENTION

Figure 1:
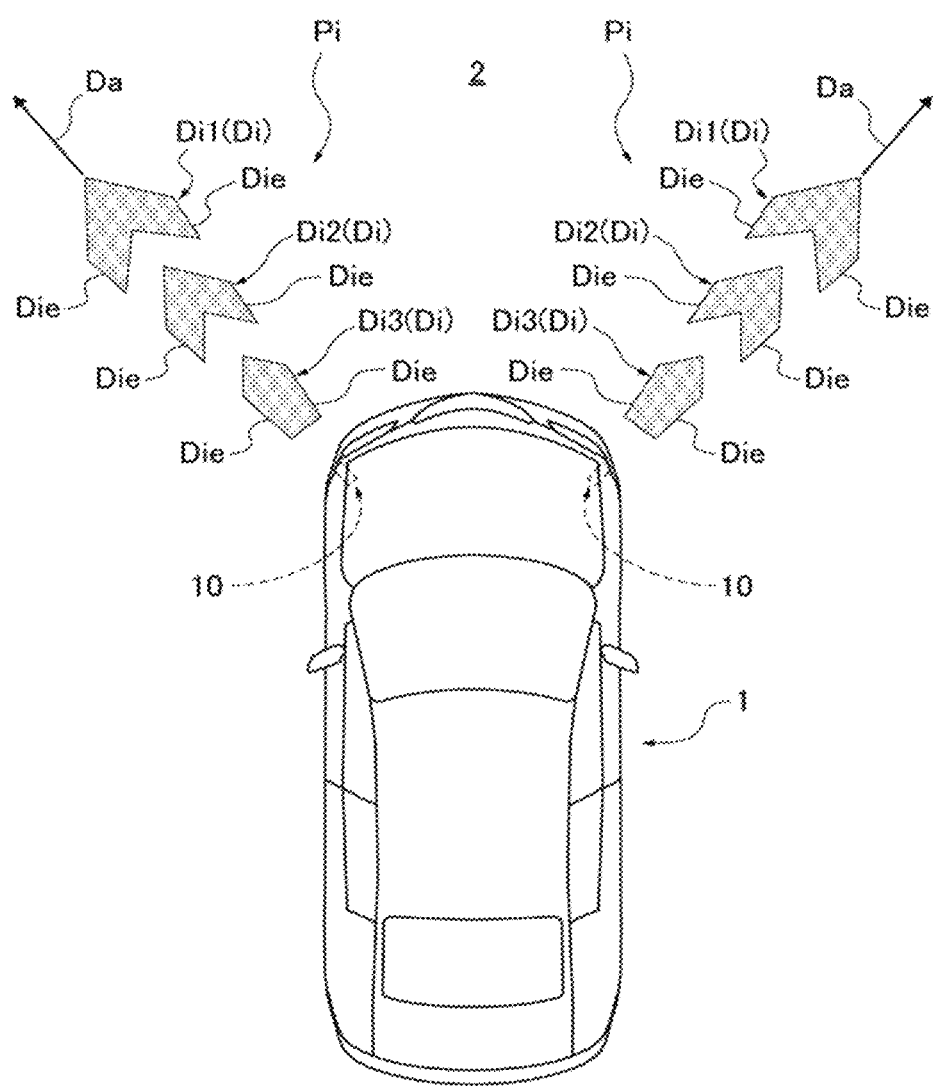
FIG. 1 is an explanatory diagram illustrating a state in which a vehicle lamp according to a first embodiment of the present disclosure is mounted on a vehicle and forms each radiation pattern.

A first embodiment of a vehicle lamp 10 as an example of a vehicle lamp according to the present disclosure will be described below with reference to the drawings. In FIG. 1, in order to facilitate understanding of the state in which the vehicle lamp 10 is provided, the vehicle lamp 10 is illustrated in an emphasized manner with respect to a vehicle 1 and does not necessarily match the actual state. In addition, in FIG. 4, optical members among the constituent members of the vehicle lamp 10, i.e., the portions that optically act on light from both light sources (31, 32) to form a radiation pattern Pi are extracted and illustrated. Further, in FIGS. 8 to 12, only the periphery of a shade portion 51 (each of slit portions 54 of the shade portion 51) is illustrated in order to facilitate understanding of the state in which each area is formed on a shade 15 (the slit portion 54 thereof). In FIGS. 8 to 12, in each area illustrated, the area corresponding to the level of the light flux (light amount) is surrounded by a broken line, and the light (light flux) distribution is illustrated as a contour line in which the light flux increases toward the center of the area.

First Embodiment

The vehicle lamp 10 according to the first embodiment, which is an embodiment of the vehicle lamp according to the present disclosure, will be described with reference to FIGS.

1 to 12. As illustrated in FIG. 1, the vehicle lamp 10 according to the first embodiment is used as a lamp of the vehicle 1 such as an automobile and is provided in a front portion of the vehicle 1 to form the radiation pattern Pi on a road surface 2 in the vicinity of the front of the vehicle 1, separately from a headlamp provided in the vehicle 1. The vicinity of the front of the vehicle 1 always includes a proximity area closer to the vehicle 1 than a headlight area irradiated by the headlight provided in the vehicle 1 and may partially include the headlight area. The vehicle lamp 10 may also form the radiation pattern Pi on the road surface 2 in the vicinity of the rear or side of the vehicle 1 and is not limited to the configuration according to the first embodiment.

According to the first embodiment, each of the vehicle lamps 10 is provided on the front end of the vehicle 1 at a position higher than the road surface 2 and is provided in a state where a projection optical axis Lp (see FIG. 2 and the like) is inclined with respect to the road surface 2. The two vehicle lamps 10 have basically the same configuration except that the mounting positions and the positions where the radiation patterns Pi are formed are different. In the description below, in each of the vehicle lamps 10, the direction in which the projection optical axis Lp extends, i.e., the direction in which light is irradiated (projected), is an optical axis direction (Z in the drawings), a vertical direction when the optical axis direction extends along a horizontal plane is an up-down direction (Y in the drawings), and the direction (horizontal direction) orthogonal to the optical axis direction and the up-down direction is a width direction (X in the drawings) (see FIG. 2 and the like).

Figure 2:
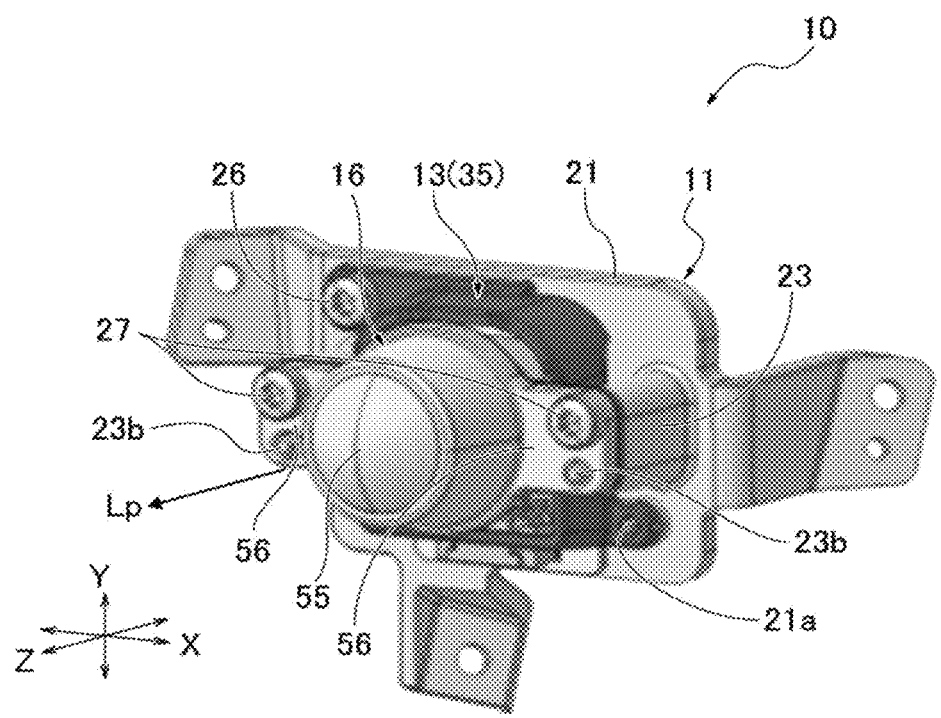
FIG. 2 is an explanatory diagram illustrating a configuration of the vehicle lamp.
Figure 3:
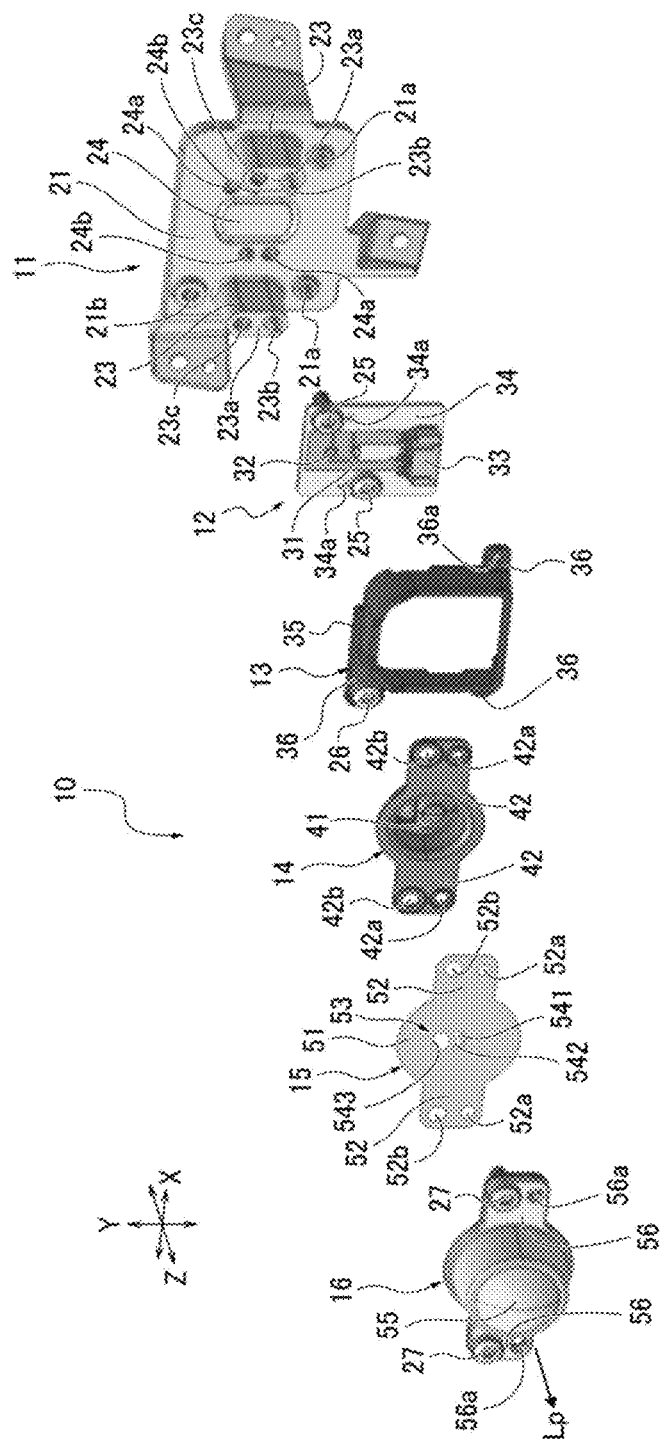
FIG. 3 is an exploded view illustrating the configuration of the vehicle lamp.
Figure 4:
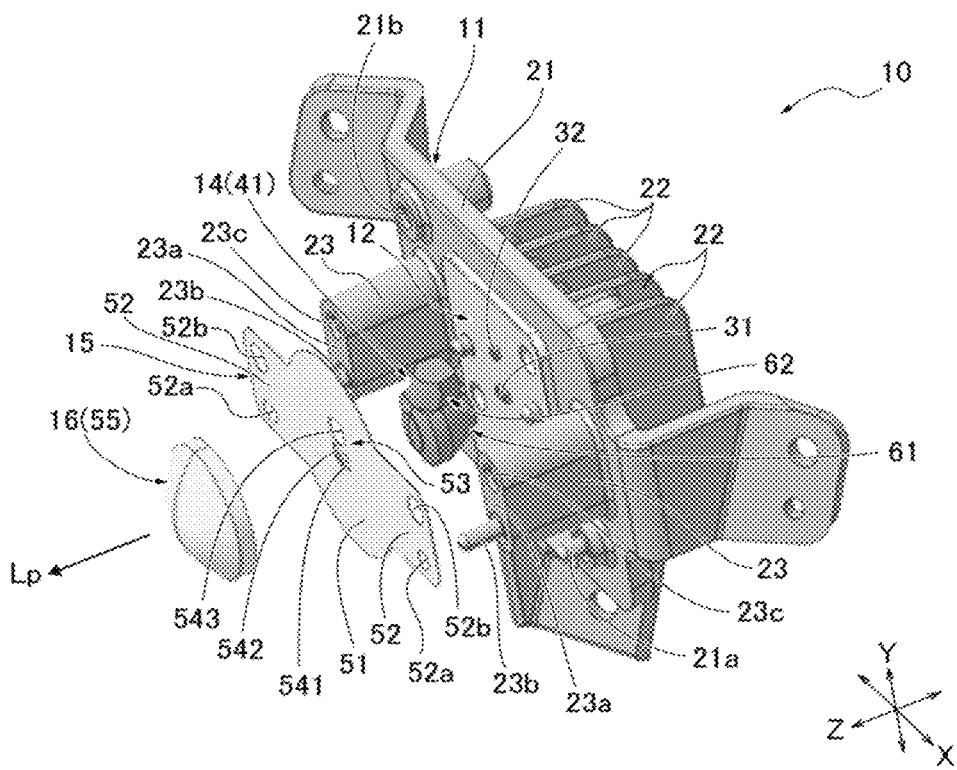
FIG. 4 is an exploded view illustrating only optical members in the configuration of the vehicle lamp.

As illustrated in FIGS. 2 to 4, in the vehicle lamp 10, a light source portion 12, a shielding frame 13, a collecting lens 14, a shade 15, and a projecting lens 16 are attached to an installation base portion 11 to form a single projection optical system and constitute a road surface projection unit of a projector type. The installation base portion 11 is a portion where the light source portion 12 is provided, is made of aluminum die-casting or resin having thermal conductivity, and functions as a heat sink that releases the heat generated in the light source portion 12 to the outside as a whole. The installation base portion 11 includes a base portion 21, a plurality of heat radiation fins 22 (see FIG. 4), and a pair of mounting arm portions 23.

The base portion 21 has a flat plate shape orthogonal to the optical axis direction and is provided with a light source mounting area 24 at the center thereof. The light source mounting area 24 defines an area where the light source portion 12 is mounted and, as illustrated in FIG. 3, is a flat surface and is provided with a pair of screw holes 24a and a pair of positioning protrusions 24b. The pair of screw holes 24a is provided at diagonal positions in the light source mounting area 24 and can be fixed by screwing screws 25. The pair of positioning protrusions 24b is provided at ends of the light source mounting area 24 in a width direction and protrude forward in the optical axis direction. Each of the heat radiation fins 22 is formed in a plate shape orthogonal to the width direction on the rear side of the base portion 21 (the rear side in the optical axis direction (the side opposite to the direction in which light is emitted)). The heat radiation fins 22 are arranged side by side (in parallel) at predetermined intervals in the width direction.

In the base portion 21, a pair of positioning protrusions 21a is provided on the lower side of the two mounting arm portions 23, and the screw hole 21b is provided on the upper side of one of the mounting arm portions 23. The positioning protrusion 21a protrudes forward in the optical axis direction. The shielding frame 13 can be fixed by screwing a screw 26 into the screw hole 21b. The installation base portion 11 radiates the heat generated in the light source portion 12 installed at the light source mounting area 24 to the outside mainly from each of the heat radiation fins 22.

The pair of mounting arm portions 23 is provided as a pair on both outer sides in the width direction of the light source mounting area 24 and protrudes forward from the base portion 21 in the optical axis direction. End portions 23a of the two mounting arm portions 23 on the front side in the optical axis direction are flat surfaces orthogonal to the optical axis direction, and the end portions 23a are located at the same position (on the same plane) in the optical axis direction. Each of the end portions 23a is provided with a positioning protrusion 23b and a screw hole 23c. The positioning protrusion 23b is provided in a lower portion of the end portion 23a in the up-down direction and protrudes forward in the optical axis direction. The screw hole 23c is provided in an upper portion of the end portion 23a in the up-down direction, and the collecting lens 14, the shade 15, and the projecting lens 16 can be fixed by screwing a screw 27.

The light source portion 12 includes a first light source 31, a second light source 32, a connector terminal 33, and a substrate 34 on which these components are mounted. The first light source 31 and the second light source 32 include a light emitting element such as a light emitting diode (LED). According to the first embodiment, the first light source 31 and the second light source 32 emit light in amber color (amber light) with a Lambertian distribution centered on the emission optical axis. The colors (wavelength bands), the mode of distribution, the number of colors, and the like, of the first light source 31 and the second light source 32 may be appropriately set and are not limited to the configuration according to the first embodiment.

Figure 5:
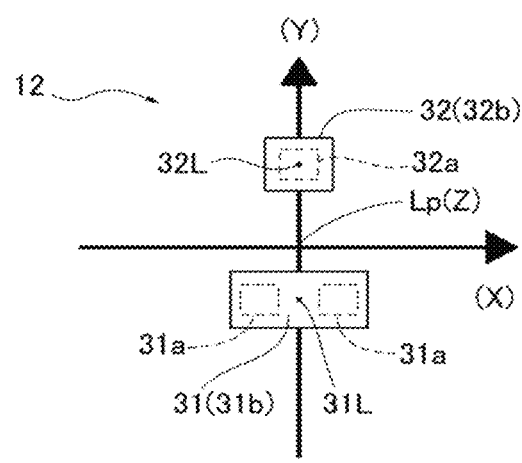
FIG. 5 is an explanatory diagram illustrating a configuration and a positional relationship of a first light source and a second light source.

As illustrated in FIG. 5 and the like, the first light source 31 and the second light source 32 according to the first embodiment are arranged in parallel in the up-down direction with the projection optical axis Lp interposed therebetween, the first light source 31 is located below the projection optical axis Lp, and the second light source 32 is located above the projection optical axis Lp. The first light source 31 has a rectangular shape elongated in the width direction and includes two LED chips 31a and a phosphor 31b covering each of them. The second light source 32 has a substantially square shape and includes one LED chip 32a and a phosphor 32b covering it. The first light source 31 and the second light source 32 emit light from the LED chips 31a, 32a as amber light by passing the light through the phosphors 31b, 32b. Therefore, in the first light source 31, the phosphor 31b functions as a first light emission surface, and in the second light source 32, the phosphor 32b functions as a second light emission surface.

In the first light source 31 and the second light source 32, emission optical axes 31L, 32L are set to extend from the respective centers in the optical axis direction. The emission optical axis 31L and the emission optical axis 32L are substantially parallel to the projection optical axis Lp. The emission optical axes 31L, 32L have a positional relationship such that the straight line connecting them passes through the projection optical axis Lp. According to the first embodiment, in the up-down direction, the distance from the projection optical axis Lp to the first light source 31 and the emission optical axis 31L is smaller than the distance from the projection optical axis Lp to the second light source 32 and the emission optical axis 32L. In other words, according to the first embodiment, there is a positional relationship such that the first light source 31 is closer to the projection optical axis Lp than the second light source 32.

The connector terminal 33 is electrically connected to a wiring pattern of the substrate 34, and a connection connector connected to a lighting control circuit is detachably attached. The connector terminal 33 is provided at a lower end portion of the substrate 34 in the up-down direction so that the connection connector can be easily attached and detached. When the connection connector is attached to the connector terminal 33, electric power can be supplied from the lighting control circuit to the light sources 31, 32 via the wiring pattern.

The substrate 34 has a plate shape formed of a resin material such as a glass epoxy substrate, and the first light source 31 and the second light source 32 are mounted on the substrate 34. The substrate 34 is provided with a pair of screw through-holes corresponding to the pair of screw holes 24a of the light source mounting area 24 of the base portion 21 of the installation base portion 11 and a pair of positioning holes 34a corresponding to the pair of positioning protrusions 24b of the light source mounting area 24. The substrate 34 is attached to the light source mounting area 24 by inserting the corresponding positioning protrusions 24b to the pair of positioning holes 34a and screwing the screws 25 inserted into the pair of screw through-holes into the corresponding screw holes 24a. As a result, the substrate 34 causes the light source mounting area 24, i.e., the first light source 31 and the second light source 32 mounted thereon, to be opposed to the collecting lens 14. The substrate 34 appropriately supplies power from the lighting control circuit via the connector terminal 33 to turn on the first light source 31 and the second light source 32.

The shielding frame 13 prevents the light emitted from the first light source 31 and the second light source 32 from leaking out from between the light source portion 12 (the substrate 34) and the collecting lens 14 and includes a frame portion main body 35 and a mounting portion 36. The frame portion main body 35 includes a plate-like member that has a predetermined dimension in the optical axis direction and extends in an annular shape to surround substantially the entire area of the light source portion 12 (the substrate 34). In the frame portion main body 35, the dimension in the optical axis direction is partially reduced on the lower side in the up-down direction, and the connector terminal 33 of the light source portion 12 can be attached to and detached from the connection connector. The pair of mounting portions 36 has a plate shape protruding from the frame portion main body 35 in the width direction at positions corresponding to the positioning protrusion 21a and the screw hole 21b of the base portion 21. The mounting portion 36 corresponding to the positioning protrusion 21a is provided with a positioning hole 36a, and the mounting portion 36 corresponding to the screw hole 21b is provided with a screw through-hole through which the screw 26 can be inserted. The shielding frame 13 is attached to the base portion 21 of the installation base portion 11 by inserting the positioning protrusion 21a into the positioning hole 36a and screwing the screw 26 inserted into the screw through-hole into the screw hole 21b.

The collecting lens 14 collects the light emitted from the first light source 31 and the second light source 32 and collects the light in the periphery of each of the slit portions 54 described below on the shade 15, i.e., in the area where each of the slit portions 54 is provided while including all of the slit portions 54 on the shade 15. As illustrated in FIG. 3, the collecting lens 14 includes a collecting lens main body 41 that collects light from the first light source 31 and the second light source 32 and a pair of collecting lens mounting pieces 42 that protrudes from the collecting lens main body 41 in the width direction. The collecting lens main body 41 is basically a convex lens, and optical characteristics thereof are set to form an inner ring light distribution area Ai and an outer ring light distribution area Ao (see FIGS. 8 and 9) on the shade 15. This will be described below.

The two collecting lens mounting pieces 42 are formed in a plate shape orthogonal to the optical axis direction and can be applied to the end portions 23a of the two mounting arm portions 23 of the base portion 21 of the installation base portion 11. Each of the collecting lens mounting pieces 42 is provided with a collecting lens positioning hole 42a and a collecting lens screw through-hole 42b. Each of the collecting lens positioning holes 42a allows the positioning protrusion 23b to be fitted into the collecting lens positioning hole 42a in a state where the collecting lens mounting piece 42 is applied to the end portion 23a. Each of the collecting lens screw through-holes 42b allows the screw 27 screwed into the screw hole 23c to be inserted into the collecting lens screw through-holes 42b in a state where the collecting lens mounting piece 42 is applied to the end portion 23a. The collecting lens 14 is attached to the two mounting arm portions 23 (the end portions 23a thereof) of the installation base portion 11 by inserting the corresponding positioning protrusions 23b into the respective collecting lens positioning holes 42a and screwing the respective screws 27 inserted into the respective collecting lens screw through-holes 42b into the corresponding screw holes 23c.

The shade 15 is an example of a shielding member that forms the radiation pattern Pi by causing the light from the first light source 31 or the second light source 32 collected by the collecting lens 14 to partially pass through a radiating slit 53. As illustrated in FIG. 1, in the radiation pattern Pi, three radiation designs Di are arranged at substantially equal intervals in a direction away from the vehicle 1. In this case, when each of the radiation designs Di is individually illustrated, the radiation design farthest from the vehicle 1 is defined as a first radiation design Di1, and the radiation designs are defined as a second radiation design Di2 and a third radiation design Di3 in order as they are closer to the vehicle 1. According to the first embodiment, the first radiation design Di1 and the second radiation design Di2 are V-shaped symbols that are widely opened, and the first radiation design Di1 is larger than the second radiation design Di2. The third radiation design Di3 has an elongated pentagonal shape extending from the vehicle 1 toward the second radiation design Di2, a base end on the vehicle 1 side has a shape in which corners are provided at both ends of a straight line orthogonal to an arrow direction Da described below, and the other end away from the vehicle 1 has a V shape corresponding to the first radiation design Di1 and the second radiation design Di2. The dimension of the third radiation design Di3 in the direction orthogonal to the arrow direction Da is smaller than the first radiation design Di1 and the second radiation design Di2. In the radiation pattern Pi, the first radiation design Di1 and the second radiation design Di2 are far-side radiation designs, and the third radiation design Di3 is a near-side radiation design.

The radiation pattern Pi is formed by arranging the first radiation design Di1, the second radiation design Di2, and the third radiation design Di3 on the same straight line so as to be away from the vehicle 1 on the road surface 2 as a projection surface. Therefore, the radiation pattern Pi can look like an arrow pointing in the arrow direction Da from the vehicle 1 by arranging the three radiation designs Di. The direction indicated by the arrow as the radiation pattern Pi, i.e., the direction in which the apexes of the V shapes of the radiation designs Di are arranged, is defined as the arrow direction Da, and the side indicated by the arrow direction Da (the first radiation design Di1 side) is defined as the front side of the arrow direction Da. According to the first embodiment, the three radiation designs Di have both side ends Die located in a direction orthogonal to the arrow direction Da. The both side ends Die are located on the same straight line that is inclined toward the inner side (the side closer to the vehicle 1) as it is closer to the back side in the arrow direction Da and emphasize an impression that the three radiation designs Di constitute the arrow indicating the arrow direction Da. The radiation pattern Pi including the three radiation designs Di is formed by the shade 15.

As illustrated in FIGS. 3 and 4, the shade 15 is made of a plate-like member that basically blocks transmission of light and includes a shade portion 51 and a pair of shade mounting pieces 52. The shade mounting pieces 52 protrude from both sides of the shade portion 51 in the width direction and can be applied to the respective collecting lens mounting pieces 42 of the collecting lens 14 attached to the end portions 23a of the two mounting arm portions 23 of the installation base portion 11. Each of the shade mounting pieces 52 is provided with a shade positioning hole 52a and a shade screw through-hole 52b. Each of the shade positioning holes 52a allows the positioning protrusion 23b passed therethrough to be fitted into the shade positioning hole 52a in a state where the shade mounting piece 52 is applied to the collecting lens mounting piece 42. Each of the shade screw through-holes 52b allows the screw 27 inserted into the collecting lens screw through-hole 42b to be inserted into the shade screw through-hole 52b in a state where the shade mounting piece 52 is applied to the collecting lens mounting piece 42. The shade 15 is attached to the two mounting arm portions 23 of the installation base portion 11 via the collecting lens 14 by inserting the corresponding positioning protrusion 23b to each of the shade positioning holes 52a and screwing each of the screws 27 inserted into each of the shade screw through-holes 52b into the corresponding screw hole 23c. In the shade 15, the center position of the shade portion 51 is located on the projection optical axis Lp by attaching the shade mounting piece 52 to the two mounting arm portions 23.

Figure 8:
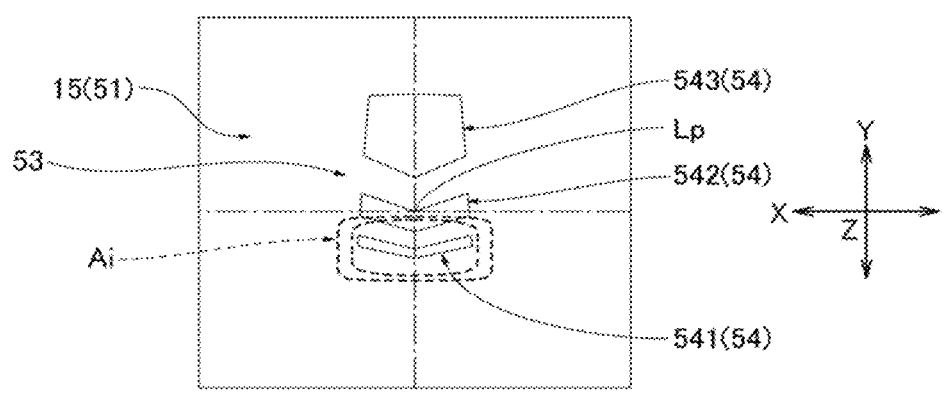
FIG. 8 is an explanatory diagram illustrating a light distribution in an inner ring light distribution area formed on the shade with light from the first light source, which is incident on a first lens portion of the collecting lens from a curved incidence surface portion and is emitted from an inner emission surface portion of a first emission surface.

The shade portion 51 is provided with the radiating slit 53 formed by partially cutting out and penetrating the plate-like member. The radiating slit 53 partially transmits the light from the first light source 31 and the second light source 32 collected by the collecting lens 14 (the collecting lens main body 41), thereby forming the radiation pattern Pi to be projected into a predetermined shape. The radiating slit 53 corresponds to the radiation pattern Pi and, as illustrated in FIGS. 3, 4, 8, and the like, includes the three slit portions 54 according to the first embodiment.

The three slit portions 54 correspond one to-one to the three radiation designs Di. Since the projecting lens 16 inverts the shade 15 (the radiating slit 53) and projects the inverted shade 15 onto the road surface 2, each of the slit portions 54 has a rotationally symmetrical positional relationship around the projection optical axis Lp with respect to the positional relationship of each of the radiation designs Di of the radiation pattern Pi (see FIGS. 3 and 4). Therefore, in each of the slit portions 54, a first slit portion 541 on the lowermost side in the up-down direction corresponds to the first radiation design Di1 of the radiation pattern Pi, and a second slit portion 542 above it corresponds to the second radiation design Di2. Thus, the first slit portion 541 and the second slit portion 542 are far-side slit portions corresponding to the first radiation design Di1 and the second radiation design Di2 which are far-side radiation designs. In each of the slit portions 54, a third slit portion 543 on the uppermost side is a near-side slit portion corresponding to the third radiation design Di3, i.e., a near-side radiation design.

The position of each of the slit portions 54 on the shade portion 51 is set such that each of the radiation designs Di has a target size and a target positional relationship on the road surface 2. In the shade 15 according to the first embodiment, the third slit portion 543 is provided above the projection optical axis Lp in the up-down direction, the second slit portion 542 is provided below it, and the first slit portion 541 is provided below it. The substantially entire second slit portion 542 is located below the horizontal line including the projection optical axis Lp, and parts of both end portions in the width direction are located above the horizontal line including the projection optical axis Lp so as to across the horizontal line. Therefore, in the shade 15 (the shade portion 51), three quarters or more of the far-side slit portions (the first slit portion 541 and the second slit portion 542) are provided below the projection optical axis Lp of the projecting lens 16. The light transmitted through the shade 15 (each of the slit portions 54 of the radiating slit 53) is projected onto the road surface 2 by the projecting lens 16.

The first slit portion 541 and the second slit portion 542, which are far-side slit portions, are formed in a shape resembling a largely opened V-shaped symbol similarly to the respective corresponding radiation designs Di and are vertically and horizontally inverted with respect to the respective radiation designs Di. Further, the third slit portion 543, which is a near-side slit portion, is formed in a pentagonal shape extending from the upper side toward the second slit portion 542 similarly to the corresponding third radiation design Di3 and is vertically and horizontally inverted with respect to the third radiation design Di3. The sizes and the intervals of the three slit portions 54 are set in accordance with the distances to the road surface 2 so that the radiation designs Di have the sizes illustrated in FIG. 1 and are arranged at substantially equal intervals on the road surface 2. Specifically, in the vehicle lamp 10, since the projection optical axis Lp is provided to be inclined with respect to the road surface 2, the distances from the shade 15 and the projecting lens 16 to the road surface 2 are different, and therefore, when projected onto the road surface 2 by the projecting lens 16, each of the slit portions 54 (each of the radiation designs Di that is light transmitted therethrough) has the size and the interval corresponding to the distance.

Therefore, the size and the interval of each of the slit portions 54 are set in accordance with the distance to the road surface 2 so that the radiation designs Di have the above-described size and are arranged at substantially equal intervals on the road surface 2. Specifically, according to the first embodiment, the first slit portion 541 has a shape resembling a thin V-shaped symbol, and the second slit portion 542 has a shape resembling a V-shaped symbol that is thicker than the first slit portion 541. In the shade portion 51, the second slit portion 542 has a positional relationship in which a bent portion of an upper outline included in the outline of the V-shaped symbol protruding downward coincides with the projection optical axis Lp (see FIG. 8 and the like). Further, the third slit portion 543 has a shape similar to a regular pentagon shape protruding toward the second slit portion 542. Each of the slit portions 54 is formed in a shape wider than the corresponding radiation design Di in the width direction.

In this manner, the three slit portions 54 are different in size from the respective radiation designs Di and are arranged at different intervals. In each of the slit portions 54, the first slit portion 541 has the smallest reduction ratio with respect to the corresponding radiation design Di, and the passed light is enlarged at the largest enlargement ratio when projected on the road surface 2 to form the first radiation design Di1. In addition, in each of the slit portions 54, the third slit portion 543 has the largest reduction ratio with respect to the corresponding radiation design Di, and the transmitted light is enlarged at the smallest enlargement ratio when projected onto the road surface 2 to form the third radiation design Di3.

As illustrated in FIGS. 2 and 3, the projecting lens 16 includes a projecting lens main body 55 that projects light having passed through the shade 15 and a pair of projecting lens mounting pieces 56 that protrudes from it in the width direction. As illustrated in FIG. 4 and the like, the projecting lens main body 55 is a convex lens having a circular shape when viewed in the optical axis direction and is a free-form surface in which the incidence surface and the emission surface are convex surfaces according to the first embodiment. The projecting lens main body 55 forms the radiation pattern Pi on the road surface 2 inclined with respect to the projection optical axis Lp as illustrated in FIG. 1 by projecting the radiating slit 53 (each of the slit portions 54 thereof) of the shade 15. The incidence surface and the emission surface may be convex or concave surfaces as long as the projecting lens main body 55 is a convex lens and are not limited to the configuration according to the first embodiment.

The two projecting lens mounting pieces 56 are formed in a plate shape orthogonal to the optical axis direction and can be applied to the shade mounting pieces 52 of the shade 15 attached to the end portions 23a of the two mounting arm portions 23 of the installation base portion 11. Each of the projecting lens mounting pieces 56 is provided with a projecting lens positioning hole 56a and a projecting lens screw through-hole. Each of the projecting lens positioning holes 56a allows the positioning protrusion 23b passed therethrough to be fitted into the projecting lens positioning hole 56a in a state where the projecting lens mounting piece 56 is applied to the shade mounting piece 52. Each of the projecting lens screw through-holes allows the screw 27 inserted through the shade screw through-hole 52b to be inserted into the projecting lens screw through-hole in a state where the projecting lens mounting piece 56 is applied to the shade mounting piece 52. The projecting lens 16 is attached to the two mounting arm portions 23 (the end portions 23a thereof) of the installation base portion 11 by inserting the corresponding positioning protrusion 23b into each of the projecting lens positioning holes 56a and screwing each of the screws 27 inserted into the respective projecting lens screw through-holes into the corresponding screw hole 23c. Accordingly, in the projecting lens 16, the projection optical axis Lp, which is the optical axis of the projecting lens main body 55, is directed in a predetermined direction, and the direction of the projection optical axis Lp of the vehicle lamp 10 is set.

Next, the configuration of the collecting lens main body 41 of the collecting lens 14 will be described mainly with reference to FIGS. 6 and 7. The collecting lens main body 41 includes a first lens portion 61 that corresponds to the first light source 31 and a second lens portion 62 that corresponds to the second light source 32. In the collecting lens 14 (the collecting lens main body 41) according to the first embodiment, the first lens portion 61 and the second lens portion 62 are integrally formed in a state where the second lens portion 62 is placed on the first lens portion 61.

The first lens portion 61 has a substantially circular shape in a front view in the optical axis direction. The first lens portion 61 according to the first embodiment collects the light emitted from the first light source 31 and having a spread as a whole in a state close to being parallel to the projection optical axis Lp and causes the light to travel to the shade portion 51. The first lens portion 61 includes a first incidence surface 63 opposed to the first light source 31 and a first emission surface 64 directed to the opposite side.

Figure 7:
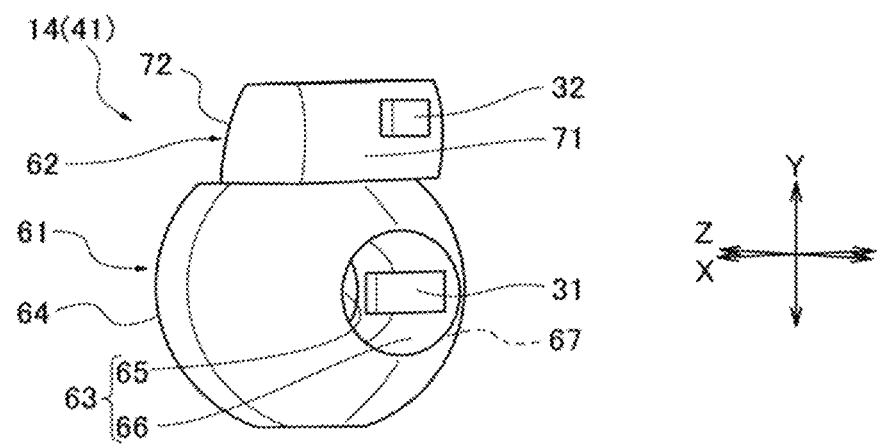
FIG. 7 is an explanatory diagram illustrating a positional relationship between the two light sources and the collecting lens main body of the collecting lens.

As illustrated in FIG. 7, a central portion of the first incidence surface 63 is recessed to the inside of the first lens portion 61 (the side opposite to the first light source 31), and the first incidence surface 63 includes a curved incidence surface portion 65 curved convexly outward at the center thereof and an annular incidence surface portion 66 surrounding it. A truncated cone-shaped reflective surface 67 surrounding the annular incidence surface portion 66 is provided around the first incidence surface 63.

The curved incidence surface portion 65 is opposed to the first light source 31 in the optical axis direction, and the first light source 31 is located in the vicinity of the focal point on the rear side (rear focal point). The curved incidence surface portion 65 causes light emitted from the first light source 31 to be incident on the first lens portion 61 as parallel light traveling substantially parallel to the axis line of the first lens portion 61. This parallel light (light that is parallel) refers to light that is collimated when the light passes through the curved incidence surface portion 65.

The annular incidence surface portion 66 is provided to protrude from the curved incidence surface portion 65 toward the first light source 31 and causes light that does not travel to the curved incidence surface portion 65 among the light from the first light source 31 to be incident on the first lens portion 61. The reflective surface 67 is formed at a position where the light entering the first lens portion 61 from the annular incidence surface portion 66 travels. When the reflective surface 67 reflects the light incident from the annular incidence surface portion 66, the light becomes parallel light traveling substantially parallel to the axis line of the first lens portion 61. The reflective surface 67 may reflect light by using total reflection, or may reflect light by adhering aluminum, silver, or the like by vapor deposition, coating, or the like. Accordingly, the first incidence surface 63 causes the light emitted from the first light source 31 to travel into the first lens portion 61 as parallel light traveling substantially parallel to the axis line of the first lens portion 61, and guides the light to the first emission surface 64.

Therefore, in the first lens portion 61, on the first incidence surface 63, the light having passed through the curved incidence surface portion 65 becomes direct light that directly travels toward the first emission surface 64, and the light having passed through the annular incidence surface portion 66 and reflected by the reflective surface 67 becomes reflected light that travels toward the first emission surface 64 after being internally reflected.

The first emission surface 64 emits light, which is incident from the first incidence surface 63 and is converted into parallel light, to the front side in the front-back direction. As illustrated in FIG. 6 and the like, the first emission surface 64 has a substantially circular shape in a front view and includes an inner emission surface portion 68 and an outer emission surface portion 69 having different optical settings. The inner emission surface portion 68 is provided in an area which is in the vicinity of the center of the first emission surface 64 and in which light having passed through the curved incidence surface portion 65 travels. The inner emission surface portion 68 according to the first embodiment has a substantially circular shape in a front view. The inner emission surface portion 68 refracts the light having passed through the curved incidence surface portion 65 to cause the light to travel toward the front side in the front-back direction while greatly diffusing the light in the width direction (horizontal direction). The inner emission surface portion 68 forms a plurality of light distribution images of the first light source 31 at positions corresponding to the optical characteristics on the shade 15 (the shade portion 51) in an appropriately overlapping manner by emitting light from the first light source 31 through the curved incidence surface portion 65. The optical characteristics can be set by adjusting the curvatures (surface shapes) of the inner emission surface portion 68 together with the curved incidence surface portion 65 for each place and, according to the first embodiment, the curvatures are set to be gradually changed.

The inner emission surface portion 68 appropriately refracts the light emitted from the first light source 31 and passing through the curved incidence surface portion 65, thereby irradiating the light onto the shade 15 to form the inner ring light distribution area Ai illustrated in FIG. 8. In the inner ring light distribution area Ai, the entire area of the first slit portion 541 corresponding to the far side in the far-side slit portion (forming the first radiation design Di1 located on the far side in the far-side radiation design) has a substantially equal light amount on the shade 15.

Figure 6:
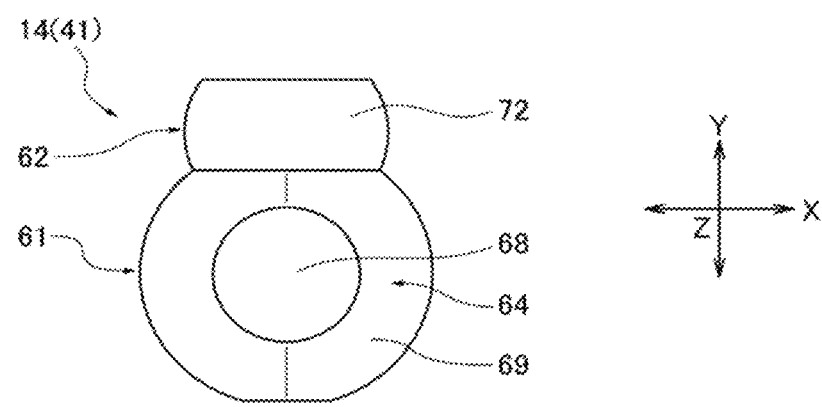
FIG. 6 is an explanatory diagram illustrating a state of a collecting lens main body of a collecting lens as viewed from a shade side.

As illustrated in FIG. 6 and the like, the outer emission surface portion 69 is provided in an area surrounding the inner emission surface portion 68 and is located in an area where the light emitted from the first light source 31 and reflected by the reflective surface 67 via the annular incidence surface portion 66 travels. The outer emission surface portion 69 refracts the light emitted from the first light source 31, passing through the annular incidence surface portion 66, and reflected by the reflective surface 67, thereby causing the light to travel toward the front side in the front-back direction to be collected on the axis line side of the first lens portion 61. The outer emission surface portion 69 emits the light reflected by the reflective surface 67 to form a plurality of light distribution images of the first light source 31 at positions corresponding to the optical characteristics on the shade 15 in an appropriately overlapping manner. The optical characteristics can be set by adjusting the curvatures (surface shapes) of the outer emission surface portion 69 together with the reflective surface 67 for each place and, according to the first embodiment, the curvatures are set to be gradually changed.

Figure 9:
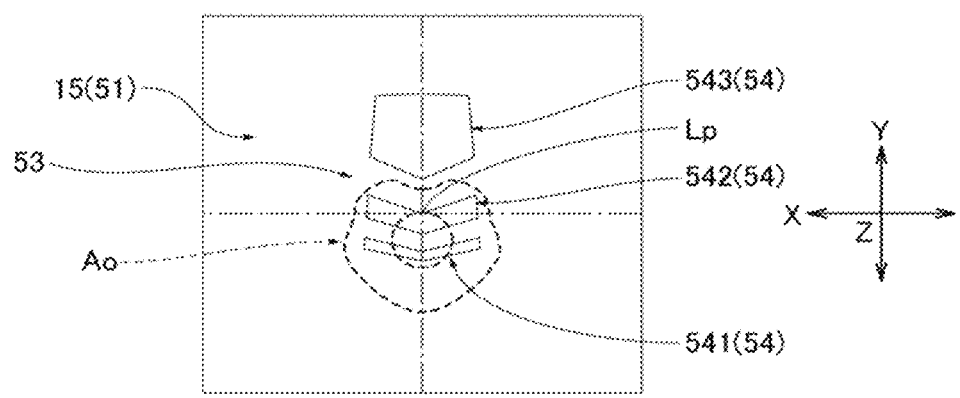
FIG. 9 is an explanatory diagram illustrating a light distribution in an outer ring light distribution area formed on the shade with light from the first light source, which is incident on the first lens portion of the collecting lens from an annular incidence surface portion, is reflected by a reflective surface, and then is emitted from an outer emission surface portion of the first emission surface.
Figure 10:
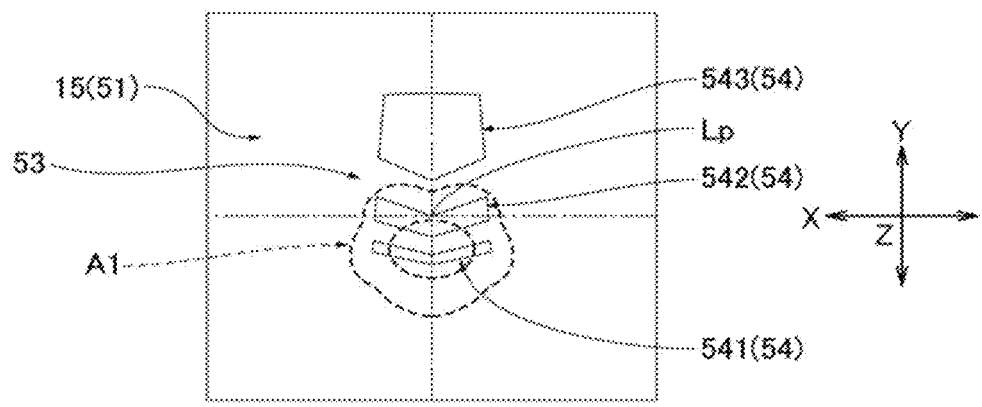
FIG. 10 is an explanatory diagram illustrating a light distribution of a first light distribution area formed by overlapping the inner ring light distribution area and the outer ring light distribution area by the first light source on the shade.

The outer emission surface portion 69 appropriately refracts the light which is emitted from the first light source 31, passes through the annular incidence surface portion 66, and is reflected by the reflective surface 67, thereby irradiating the light onto the shade 15 to form the outer ring light distribution area Ao illustrated in FIG. 9. The outer ring light distribution area Ao is an area where a high light flux (light amount) is formed on the shade 15. The outer ring light distribution area Ao has the maximum value of the light flux from the apex of the first slit portion 541 to the middle position in the width direction and in the vicinity of the apex of the second slit portion 542 and surrounds the entire area of the remaining far-side slit portions, i.e., the entire remaining area of the first slit portion 541 and the second slit portion 542, with a light flux lower than the maximum value. In the outer ring light distribution area Ao, there is a large difference in light flux between the area where the light flux has the maximum value and the area surrounding it, and the change in light flux at the boundary is continuous. In the outer ring light distribution area Ao, the central light flux having the maximum value is at least higher than that in the inner ring light distribution area Ai. Here, since the lens optical axis of the first lens portion 61 extends toward the apex of the first slit portion 541, it is easy to form the outer ring light distribution area Ao as described above.

In this way, the first lens portion 61 forms the inner ring light distribution area Ai to irradiate the entire area of the first slit portion 541 with the light from the first light source 31 via the inner emission surface portion 68 and forms the outer ring light distribution area Ao to irradiate the entire area of the far-side slit portion while providing the highest light flux in the vicinity of the apex of the first slit portion 541 with the light from the first light source 31 via the outer emission surface portion 69. Therefore, the first lens portion 61 forms a first light distribution area A1 illustrated in FIG. 10 by causing the light from the first light source 31, i.e., the direct light traveling toward the inner emission surface portion 68 via the curved incidence surface portion 65 and the reflection light reflected by the reflective surface 67 via the annular incidence surface portion 66 and traveling toward the outer emission surface portion 69, to pass through different optical paths as described above. The first light distribution area A1 is formed by overlapping the inner ring light distribution area Ai and the outer ring light distribution area Ao described above and irradiates the first slit portion 541 and the second slit portion 542, i.e., the entire far-side slit portion, with the highest light flux from the apex of the first slit portion 541 to the middle position in the width direction and in the vicinity of the apex of the second slit portion 542.

As illustrated in FIGS. 6 and 7, the second lens portion 62 is a convex lens having a substantially rectangular shape elongated in the width direction when viewed from the front in the optical axis direction and, as a whole, collects the light emitted from the second light source 32 and having a spread in a state close to being parallel to the projection optical axis Lp and causes the light to travel to the shade portion 51. The second lens portion 62 includes a second incidence surface 71 opposed to the second light source 32 and a second emission surface 72 directed to the opposite side. Therefore, the second incidence surface 71 forms an incidence surface of the collecting lens 14 together with the first incidence surface 63 of the first lens portion 61. In addition, the second emission surface 72 forms an emission surface of the collecting lens 14 together with the first emission surface 64 of the first lens portion 61. According to the first embodiment, the second lens portion 62 is a free-form surface in which the second incidence surface 71 and the second emission surface 72 are convex surfaces. The second incidence surface 71 and the second emission surface 72 may be convex surfaces or concave surfaces as long as the second lens portion 62 is a convex lens, and are not limited to the configuration according to the first embodiment.

The second incidence surface 71 is opposed to the second light source 32 in the optical axis direction, and the second light source 32 is located in the vicinity of the focal point on the rear side (rear focal point). The second incidence surface 71 causes light emitted from the second light source 32 to be incident on the second lens portion 62 as parallel light traveling substantially parallel to the axis line of the second lens portion 62. The second emission surface 72 is provided on the side opposite to the second incidence surface 71 and refracts the light having passed through the second incidence surface 71 to cause the light to travel toward the front side in the front-back direction while diffusing the light. The second emission surface 72 forms a plurality of light distribution images of the second light source 32 at positions corresponding to the optical characteristics on the shade 15 (the shade portion 51) in an appropriately overlapping manner by emitting light from the second light source 32 via the second incidence surface 71. The optical characteristics can be set by adjusting the curvatures (surface shapes) of the second emission surface 72 together with the second incidence surface 71 for each place and, according to the first embodiment, the curvatures are set to be gradually changed.

Figure 11:
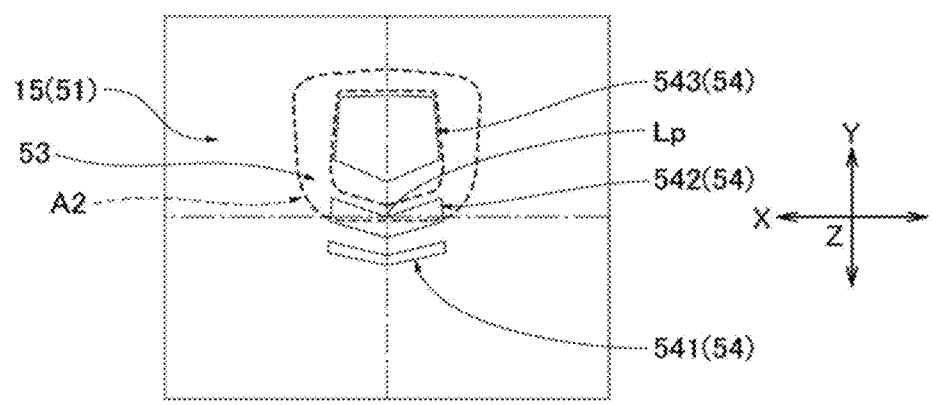
FIG. 11 is an explanatory diagram illustrating a light distribution in a second light distribution area formed on the shade with light from a second light source, which is incident on a second lens portion of the collecting lens from a second incidence surface and is emitted from a second emission surface.

The second emission surface 72 appropriately refracts the light emitted from the second light source 32 and passing through the second incidence surface 71, thereby irradiating the light onto the shade 15 to form a second light distribution area A2 illustrated in FIG. 11. In the second light distribution area A2, the entire area of the third slit portion 543, which is a near-side slit portion, has a substantially equal light flux (light amount) on the shade 15. Here, a substantially equal light flux in the entire area means that a change in the light flux is smaller than that in at least the outer ring light distribution area Ao, and preferably means a substantially uniform light flux. It is assumed that the second light distribution area A2 according to the first embodiment has a lower light flux than the first light distribution area A1, i.e., the inner ring light distribution area Ai and the outer ring light distribution area Ao.

Figure 12:
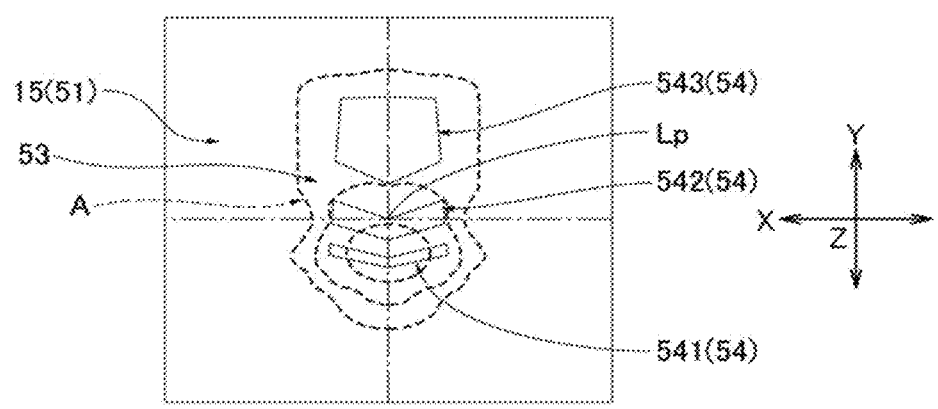
FIG. 12 is an explanatory diagram illustrating a light distribution of a light distribution area on the shade by the first light source and the second light source.

Accordingly, the collecting lens 14 forms the light distribution area A illustrated in FIG. 12 by overlapping the first light distribution area A1 formed by the first lens portion 61 with the light from the first light source 31 and the second light distribution area A2 formed by the second lens portion 62 with the light from the second light source 32. The light distribution area A provides the highest light flux from the apex of the first slit portion 541 to the middle position in the width direction and in the vicinity of the apex of the second slit portion 542, has the next highest light flux in the remaining portions of the first slit portion 541 and the second slit portion 542, and is uniform in the entire area of the third slit portion 543 with a light flux lower than them. For this reason, the collecting lens 14 according to the first embodiment sets the vicinity of the apex of the first slit portion 541 forming the first radiation design Di1 as the maximum light flux place on the shade 15. As described above, on the shade 15, the collecting lens 14 can form a predetermined light flux distribution with a predetermined modulation (inflection (differences in the level of the light flux)) for the far-side slit portion and can form a uniform light flux lower than that of the far-side slit portion for the near-side slit portion.

Next, the operation of the vehicle lamp 10 will be described. The vehicle lamp 10 supplies power from the lighting control circuit to the two light sources (31, 32) from the substrate 34 and thus can appropriately turn on and off them. The light from the two light sources (31, 32) is collected by the collecting lens 14 to irradiate the shade 15, passes through the radiating slit 53 (each of the slit portions 54), and is then projected by the projecting lens 16, thereby forming the radiation pattern Pi on the road surface 2. In the radiation pattern Pi, the light transmitted through the radiating slit 53 (each of the slit portions 54) of the shade 15 having the light (light flux) distribution described above is projected by the projecting lens 16, and thus the three radiation designs Di are arranged substantially on the straight line while the first radiation design Di1, in particular, the vicinity of the leading end thereof has the highest light flux. Further, in the vehicle lamp 10 according to the first embodiment, since the first light source 31 and the second light source 32 emit monochromatic light, it is possible to significantly suppress the influence of chromatic aberration in the projecting lens 16, and it is possible to make the radiation pattern Pi, i.e., each of the radiation designs Di clear.

The vehicle lamp 10 is interlocked with the turn lamps, and when one of the right and left turn lamps is turned on, the first light source 31 and the second light source 32 provided on the turned-on side are turned on to form the radiation pattern Pi on the road surface 2. Therefore, in a scene where the vehicle 1 is traveling from an alley with poor visibility to a different alley, the vehicle lamp 10 can cause a person on the different alley to visually recognize the radiation pattern Pi formed on the road surface 2 even when the person cannot visually recognize the vehicle 1. In addition, in the vehicle 1, when the hazard lamps are turned on, the two left and right vehicle lamps 10 simultaneously form the radiation patterns Pi on the road surface 2, and therefore, it is possible to more reliably recognize that the hazard lamps are turned on, compared to a case where only the left and right turn lamps are blinked.

Further, in the radiation pattern Pi formed by the vehicle lamp 10, the first radiation design Di1 and the second radiation design Di2, which are far-side radiation designs, are formed in a V shape, and the third radiation design Di3, which is a near-side radiation design, is formed in a pentagonal shape elongated in the arrow direction Da. Therefore, the vehicle lamp 10 can give an impression that the far-side radiation design (the first radiation design Di1 and the second radiation design Di2) corresponds to the arrow head in the symbol of the arrow and the near-side radiation design (the third radiation design Di3) corresponds to the shaft in the symbol of the arrow, and can more effectively give an impression of pointing in the arrow direction Da. In addition, in the radiation pattern Pi according to the first embodiment, the both side ends Die of the three radiation designs Di are located on the same straight line inclined toward the inner side (the side closer to the vehicle 1) as it is closer to the back side in the arrow direction Da. Accordingly, the vehicle lamp 10 can cause a person around the vehicle 1 to more intuitively recognize that the radiation pattern Pi indicates the arrow direction Da.

In the vehicle lamp 10, the first light source 31 of the light source portion 12 is configured such that the two LED chips 31a are arranged in parallel in the width direction, and the corresponding far-side slit portions, i.e., the first slit portion 541 and the second slit portion 542, are formed in a shape that resembles a V-shaped symbol that is elongated in the width direction. Therefore, the vehicle lamp 10 can efficiently irradiate the far-side slit portion over the entire area in the width direction, and the far-side radiation design formed by the far-side slit portion, i.e., the first radiation design Di1 and the second radiation design Di2, can be brightened over the entire area.

Here, in the conventional vehicle lamp described in the related art document, a plurality of light guides is provided individually corresponding to a plurality of light sources, and light from each light source is efficiently used. In the conventional vehicle lamp, each of the light guide members diffuses light therein to emit light having a substantially uniform light flux distribution, and a shade (shielding member) is irradiated with the light passing through each of the light guide members to obtain a substantially uniform light (light flux) distribution on the shade. Further, in the conventional vehicle lamp, since the light from the light source corresponding to each light guide is guided onto the shade, the light is separately guided onto the shade for each light source. For this reason, it is difficult for the conventional vehicle lamp to obtain a desired light distribution as in the case where an area having a high light flux is partially formed while continuously changing the light flux in an area having a low light flux on the shade.

On the other hand, for the two light sources (31, 32), the vehicle lamp 10 is provided with the single collecting lens 14 that collects light from each of them. The collecting lens 14 includes the first lens portion 61 that corresponds to the first light source 31 and the second lens portion 62 that corresponds to the second light source 32. In the first lens portion 61, the light emitted from the first light source 31 in a direction substantially along the emission optical axis 31L is incident from the curved incidence surface portion 65 of the first incidence surface 63, and the light emitted from the first light source 31 in a spreading direction (at a large angle with respect to the emission optical axis 31L) is incident from the annular incidence surface portion 66 of the first incidence surface 63 and reflected by the reflective surface 67. The first lens portion 61 emits the light passing through the curved incidence surface portion 65 mainly from the inner emission surface portion 68 of the first emission surface 64 and emits the light passing through the annular incidence surface portion 66 and reflected by the reflective surface 67 mainly from the outer emission surface portion 69 of the first emission surface 64. Then, the first lens portion 61 forms the inner ring light distribution area Ai on the shade 15 with the light having passed through the curved incidence surface portion 65 and the inner emission surface portion 68 and forms the inner ring light distribution area Ai on the shade 15 with the light having passed through the annular incidence surface portion 66, reflected by the reflective surface 67, and passed through the outer emission surface portion 69. In this way, in the first lens portion 61, the outer ring light distribution area Ao and the inner ring light distribution area Ai having different positions, sizes, and light (light flux) distributions are formed using the difference between the optical path passing through the curved incidence surface portion 65 and the inner emission surface portion 68 and the optical path passing through the annular incidence surface portion 66, the reflective surface 67, and the outer emission surface portion 69. The first lens portion 61 overlaps the outer ring light distribution area Ao and the inner ring light distribution area Ai having different light distributions, thereby forming the first light distribution area A1 having a light flux distribution with a predetermined modulation (inflection (differences in the level of the light flux)) on the far-side slit portion (the first slit portion 541 and the second slit portion 542).

In addition, since the second lens portion 62 is a convex lens, the light from the second light source 32 is incident from the second incidence surface 71 and is emitted from the second emission surface 72, and the second light distribution area A2, which is lower than the first light distribution area A1 and has a uniform light flux, is formed on the near-side slit portion (the third slit portion 543) of the shade 15. Here, the near-side slit portion corresponds to the third radiation design Di3, which is a near-side radiation design in the radiation pattern Pi and is projected onto a place close to the vehicle 1, i.e., a place at a close distance from the vehicle lamp 10, and therefore, in order to form the near-side radiation design which is easy to see, it is desirable that the light flux be uniform and lower than that of the far-side slit portion.

Therefore, by using the single collecting lens 14 for both the light sources (31, 32), the vehicle lamp 10 can emit light onto the shade 15 with a desired light distribution and can form the first light distribution area A1 having a desired light flux distribution and the second light distribution area A2 having a uniform light flux lower than the first light distribution area A1. Then, the vehicle lamp 10 forms the light distribution area A by overlapping the first light distribution area A1 and the second light distribution area A2 on the shade 15, thereby forming the radiation pattern Pi that is easy to see with a desired brightness distribution. Therefore, as compared with conventional vehicle lamps, the vehicle lamp 10 can easily adjust the light distribution of the light distribution area A formed on the shade 15 and can form the radiation pattern Pi having a desired brightness distribution while having a simple configuration using the single collecting lens 14.

Here, the third radiation design Di3 according to the first embodiment has a shape elongated in the arrow direction Da and extends to the vicinity of the vehicle 1 in which the vehicle lamp 10 is mounted. In other words, the third radiation design Di3 according to the first embodiment is formed in a shape elongated in the arrow direction Da to reduce the interval with the vehicle 1. Then, since the third slit portion 543 corresponds to the third radiation design Di3, the third slit portion 543 has a large dimension on the shade portion 51. Then, when the third slit portion 543 is irradiated by using a lens having a predetermined light flux distribution in which the light flux is modulated as in the first lens portion 61, it is difficult to irradiate the entire area, and unevenness of the brightness, such as the occurrence of a dark place, occurs in the formed third radiation design Di3, and there is a concern that the appropriate third radiation design Di3 cannot be formed.

In contrast, the vehicle lamp 10 forms the first light distribution area A1 having a predetermined light flux distribution using the first lens portion 61 for the far-side slit portion (the first slit portion 541 and the second slit portion 542) and forms the second light distribution area A2 having a uniform light flux using the second lens portion 62 for the near-side slit portion (the third slit portion 543). Therefore, even with the use of the single collecting lens 14, the vehicle lamp 10 can form both a portion having a predetermined light flux distribution with modulation and a portion having a uniform light flux on the shade portion 51. Therefore, the vehicle lamp 10 can make the middle of the leading end of the far-side radiation design (the first radiation design Di1 and the second radiation design Di2) clear as a center, can make the entire near-side radiation design (the third radiation design Di3) clear, and can form the more appropriate radiation pattern P.

The vehicle lamp 10 according to the first embodiment can obtain the following effects. The vehicle lamp 10 includes the first light source 31 and the second light source 32 arranged in parallel, the collecting lens 14 that collects light from them, the shade 15 as a shielding member provided with the radiating slit 53 that partially passes the light collected thereby, and the projecting lens 16 that projects the light having passed therethrough to form the radiation pattern Pi. The collecting lens 14 includes the first lens portion 61 that corresponds to the first light source 31 and the second lens portion 62 that corresponds to the second light source 32. The radiating slit 53 includes the near-side slit portion (the third slit portion 543) that corresponds to the near-side radiation design (the third radiation design Di3) and the far-side slit portion (the first slit portion 541 and the second slit portion 542) that corresponds to the far-side radiation pattern (the first radiation design Di1 and the second radiation design Di2). The first lens portion 61 is provided to be opposed to the far-side slit portion, and the second lens portion 62 is provided to be opposed to the near-side slit portion. Therefore, the vehicle lamp 10 can form two light distribution areas (the first light distribution area A1 and the second light distribution area A2 according to the first embodiment) having different positions, sizes, and light (light flux) distributions by passing through two different optical paths of the first lens portion 61 and the second lens portion 62 using the single collecting lens 14 for the two light sources (31, 32). Further, in the vehicle lamp 10, the optical characteristics of the first lens portion 61 can be set in accordance with the light distribution area required on the far-side slit portion, and the optical characteristics of the second lens portion 62 can be set in accordance with the light distribution area required on the near-side slit portion. Therefore, the vehicle lamp 10 can efficiently use the light from the two light sources (31, 32) and can irradiate the near-side slit portion and the far-side slit portion with a desired light flux distribution while simplifying the configurations of the first lens portion 61 and the second lens portion 62. Therefore, the vehicle lamp 10 can easily adjust the light distribution on the shielding member and can form the radiation pattern Pi having a desired brightness distribution.

In the vehicle lamp 10, the first lens portion 61 forms, on the shielding member (the shade 15), the first light distribution area A1 to irradiate the entire area of the far-side slit portion with the light from the first light source 31, and the second lens portion 62 forms, on the shielding member (the shade 15), the second light distribution area A2 to irradiate the entire area of the near-side slit portion with the light from the second light source 32. Therefore, in the vehicle lamp 10, the positions and optical characteristics of the first light source 31 and the first lens portion 61 can be set to form the first light distribution area A1, and the positions and optical characteristics of the second light source 32 and the second lens portion 62 can be set to form the second light distribution area A2. Therefore, the vehicle lamp 10 can form the radiation pattern Pi having a desired brightness distribution while simplifying the configuration of the collecting lens 14.

In the vehicle lamp 10, the first lens portion 61 includes the curved incidence surface portion 65 opposed to the first light source 31, the annular incidence surface portion 66 surrounding the curved incidence surface portion 65, and the reflective surface 67 surrounding the annular incidence surface portion 66. In addition, the second lens portion 62 is a convex lens that collects light from the second light source 32. The first lens portion 61 forms the inner ring light distribution area Ai to irradiate the far-side slit portion with the light from the first light source 31 via the curved incidence surface portion 65 on the shielding member (the shade 15). In addition, the first lens portion 61 forms, on the shielding member (the shade 15), the outer ring light distribution area Ao to irradiate the entire area of the far-side slit portion while providing a light flux in the vicinity of the center of the far-side slit portion higher than surroundings with the light from the first light source 31 having passed through the annular incidence surface portion 66 and reflected by the reflective surface 67. Therefore, the vehicle lamp 10 can form the outer ring light distribution area Ao and the inner ring light distribution area Ai having different positions, sizes, and light (light flux) distributions by using the difference in the optical path in the first lens portion 61, can form the first light distribution area A1 having a light flux distribution with a predetermined modulation by overlapping them, and can form a far-side radiation design having a desired brightness distribution.

In the vehicle lamp 10, the second light distribution area A2 has a lower light flux than the inner ring light distribution area Ai and the outer ring light distribution area Ao and has a smaller light flux difference than the outer ring light distribution area Ao. For this reason, the vehicle lamp 10 can easily form the second light distribution area A2 as described above by the second lens portion 62, which is a convex lens, and can form a near-side radiation design having a desired brightness distribution.

In the vehicle lamp 10, the first lens portion 61 and the second lens portion 62 are integrated. Therefore, in the vehicle lamp 10, the relative positional accuracy between the first lens portion 61 and the second lens portion 62 can be improved, and the assembly process and the like can be facilitated.

With the vehicle lamp 10, in the shielding member (the shade 15), three quarters or more of the far-side slit portions (the first slit portion 541 and the second slit portion 542) are provided below the projection optical axis Lp of the projecting lens 16. For this reason, in the vehicle lamp 10, the first lens portion 61 and the second lens portion 62 (the center positions (axis lines) thereof) can be provided to be vertically arranged to interpose the projection optical axis Lp in the collecting lens 14, and the vehicle lamp 10 can have a small configuration as a whole.

In the vehicle lamp 10, the first light source 31 and the second light source 32 are arranged in parallel in the vertical direction, and the first light source 31 is located below the second light source 32. For this reason, the vehicle lamp 10 can be provided with the first light source 31 and the second light source 32 in accordance with the arrangement of the first lens portion 61 and the second lens portion 62 in the collecting lens 14, and can have a small configuration as a whole.

In the vehicle lamp 10, the far-side radiation design includes the first radiation design Di1 and the second radiation design Di2, and the far-side slit portion includes the first slit portion 541 that corresponds to the first radiation design Di1 and the second slit portion 542 that corresponds to the second radiation design Di2. In the vehicle lamp 10, the first light distribution area A1 provides, in the vicinity of the center of the first slit portion 541, the highest light flux in the first light distribution area A1 and the second light distribution area A2. Therefore, the vehicle lamp 10 can irradiate the center of the far-side slit portion with the highest light flux, the center of the far-side radiation design of the radiation pattern Pi can be made clear, and the visibility can be improved by making the radiation pattern Pi have a desired brightness distribution.

Therefore, the vehicle lamp 10 according to the first embodiment as a vehicle lamp according to the present disclosure can form the radiation pattern Pi having a desired brightness distribution while efficiently using the light from both the light sources (11, 12).

Although the vehicle lamp according to the present disclosure has been described above based on the first embodiment, the specific configuration is not limited to the first embodiment, and design changes, additions, and the like are allowed without departing from the gist of the invention according to each claim in the scope of claims.

According to the first embodiment, the radiation pattern Pi is configured such that the first radiation design Di1 and the second radiation design Di2, which are two V-shaped symbols, and the third radiation design Di3, which has a corresponding pentagonal shape, are arranged at substantially equal intervals in the direction away from the vehicle 1. However, as long as the radiation pattern is formed by the shade (shielding member) and includes a far-side radiation design and a near-side radiation design, the design of the symbol as the radiation design Di, the formation position, the number of the radiation designs Di, and the like, may be appropriately set, and are not limited to the configuration according to the first embodiment. The near-side radiation design may be projected onto a near position in the radiation pattern Pi, and the corresponding near-side slit portion may be provided to be opposed to the second lens portion 62, and is not limited to the configuration according to the first embodiment. Further, the far-side radiation design may be projected onto a position farther than the near-side radiation design in the radiation pattern Pi, and the corresponding far-side slit portion may be provided to be opposed to the first lens portion 61, and is not limited to the configuration according to the first embodiment.

Although the vehicle lamp 10 is provided in the front portion of the vehicle 1 according to the first embodiment, the vehicle lamp 10 may be accommodated in a door mirror, may be provided in a lamp chamber of a headlamp or a lamp chamber of a tail lamp (lamp chambers on both right and left sides of a rear portion of the vehicle), or may be provided in a vehicle body as long as it is provided in the vehicle 1 in accordance with the position where the radiation pattern is formed for the vehicle 1, and is not limited to the configuration according to the first embodiment.

Furthermore, according to the first embodiment, the first light source 31 and the second light source 32 emit amber light. However, the color of the light emitted from the light source may be appropriately set in accordance with the arrangement location and the content to be conveyed, and is not limited to the configuration according to the first embodiment.

According to the first embodiment, the shade 15 that causes the light collected by the collecting lens 14 to pass through the radiating slit 53 is used as the shielding member. However, the shielding member may have a different configuration as long as the shielding member is provided with the radiating slit 53 that partially passes the light collected by the collecting lens 14, and is not limited to the configuration according to each embodiment. As a different configuration, for example, it is possible to use a shielding plate (filter) in which a radiating slit that partially transmits light is provided in a plate-shaped film member that blocks the transmission of light and the light having passed through the collecting lens 14 is transmitted through the radiating slit.

According to the first embodiment, the vehicle lamp 10 is provided in the vehicle 1 driven by a driver. However, the vehicle lamp may be provided in a vehicle having an automatic driving function, and is not limited to the configuration according to the first embodiment. In this case, the vehicle lamp may form the radiation pattern at the timing corresponding to the usage for which the vehicle lamp is provided, i.e., at the timing corresponding to some intention regarding the operation of the vehicle 1, and is not limited to the configuration according to the first embodiment.

In the configuration according to the first embodiment, the light source portion 12 is provided on the installation base portion 11 having a function as a heat sink, and the shielding frame 13, the collecting lens 14, the shade 15, and the projecting lens 16 are attached to the installation base portion 11. However, the vehicle lamp may have a different configuration as long as the light from the light source is collected on the shielding member by the collecting lens and projected by the projecting lens to form the radiation pattern, and is not limited to the configuration according to the first embodiment.

According to the first embodiment, the first light source 31 includes the two LED chips 31a and the phosphor 31b covering it, and the second light source 32 includes the one LED chip 32a and the phosphor 32b covering it. However, as long as the first light source 31 corresponds to the first lens portion 61 and the second light source 32 corresponds to the second lens portion 62, the configuration of each of the two light sources may be appropriately set and is not limited to the configuration according to the first embodiment.

Figure 13:
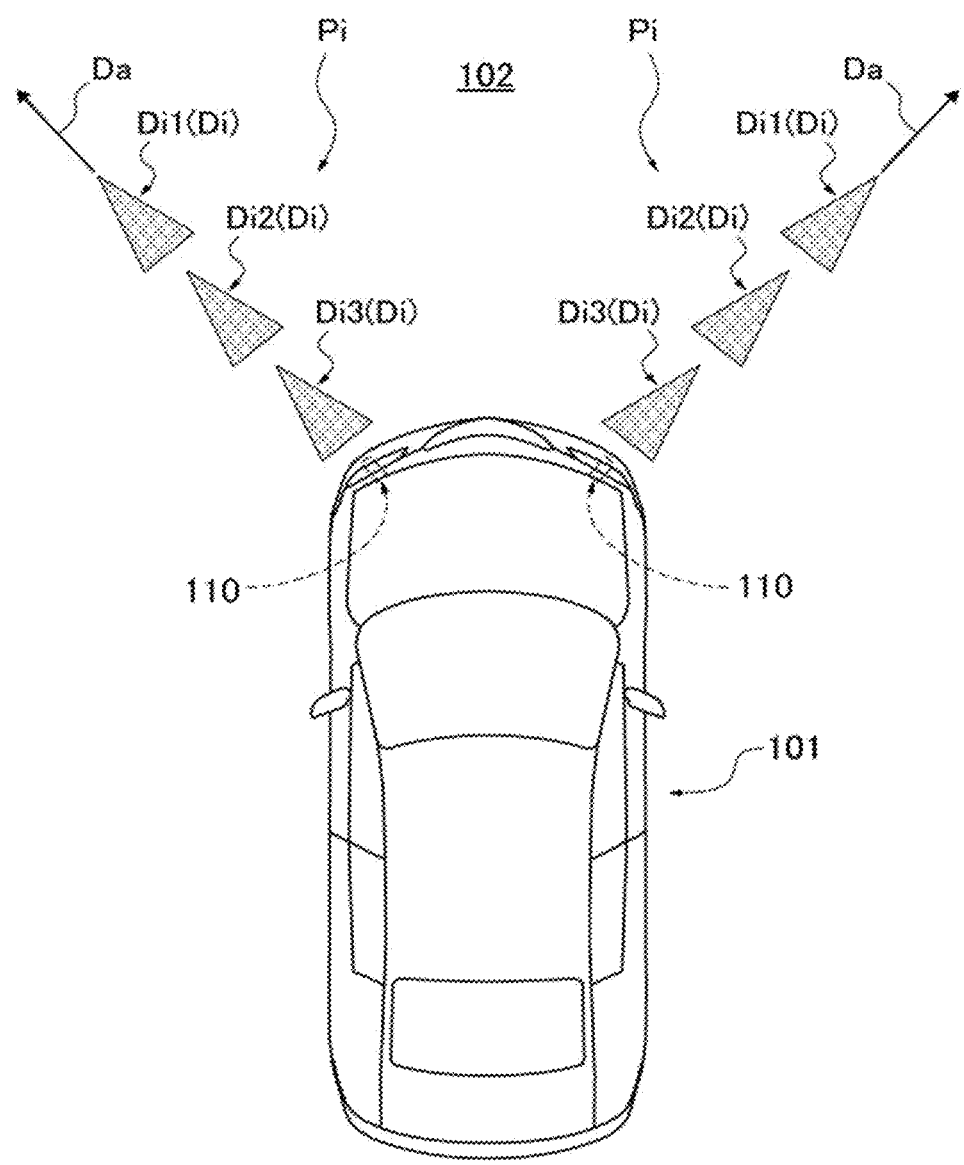
FIG. 13 is an explanatory diagram illustrating a state (full lighting) in which a vehicle lamp according to a second embodiment of the present disclosure is mounted on a vehicle and forms each radiation pattern.

Hereinafter, a second embodiment of a vehicle lamp 110 as an example of a vehicle lamp according to the present disclosure will be described with reference to the drawings. In FIG. 13, the vehicle lamp 110 is emphasized with respect to a vehicle 101 in order to facilitate understanding of the state in which the vehicle lamp 110 is provided, and does not necessarily coincide with the actual state. Further, in FIG. 21, only the periphery of a shade portion 133 (each slit portion 136 thereof) is illustrated in order to facilitate understanding of a state in which the second light distribution area is formed in a second slit portion 1362 by the light from a second light source 125 on a shade 114 (a radiating slit 135 of the shade portion 133) and an unintended light distribution area (stray light area) is formed in a third slit portion 1363. In each area illustrated in FIG. 21, the area corresponding to the level of the light flux (light amount) is surrounded by a broken line, and the light (light flux) distribution is illustrated like a contour line in which the light flux increases toward the center of the area.

Second Embodiment

The vehicle lamp 110 according to the second embodiment, which is an embodiment of the vehicle lamp according to the present disclosure, will be described with reference to FIGS. 13 to 21. As illustrated in FIG. 13, the vehicle lamp 110 according to the second embodiment is used as a lamp of the vehicle 101 such as an automobile and is provided in a front portion of the vehicle 101 to form the radiation pattern Pi on a road surface 102 in the vicinity of the front of the vehicle 101, separately from a headlamp provided in the vehicle 101. The vicinity of the front of the vehicle 101 always includes a proximity area closer to the vehicle 101 than a headlight area irradiated by the headlight provided in the vehicle 101 and may partially include the headlight area. The vehicle lamp 110 may also form the radiation pattern Pi on the road surface 102 in the vicinity of the rear or side of the vehicle 101 and is not limited to the configuration according to the second embodiment.

According to the second embodiment, each of the vehicle lamps 110 is provided on the front end of the vehicle 101 at a position higher than the road surface 102 and is provided in a state where the projection optical axis Lp (see FIG. 14 and the like) is inclined with respect to the road surface 102. The two vehicle lamps 110 have basically the same configuration except that the mounting positions and the positions where the radiation patterns Pi are formed are different. In the description below, in each of the vehicle lamps 110, the direction in which the projection optical axis Lp extends, i.e., the direction in which light is irradiated (projected), is an optical axis direction (Z in the drawings), a vertical direction when the optical axis direction extends along a horizontal plane is an up-down direction (Y in the drawings), and the direction (horizontal direction) orthogonal to the optical axis direction and the up-down direction is a width direction (X in the drawings) (see FIG. 14 and the like).

Figure 14:
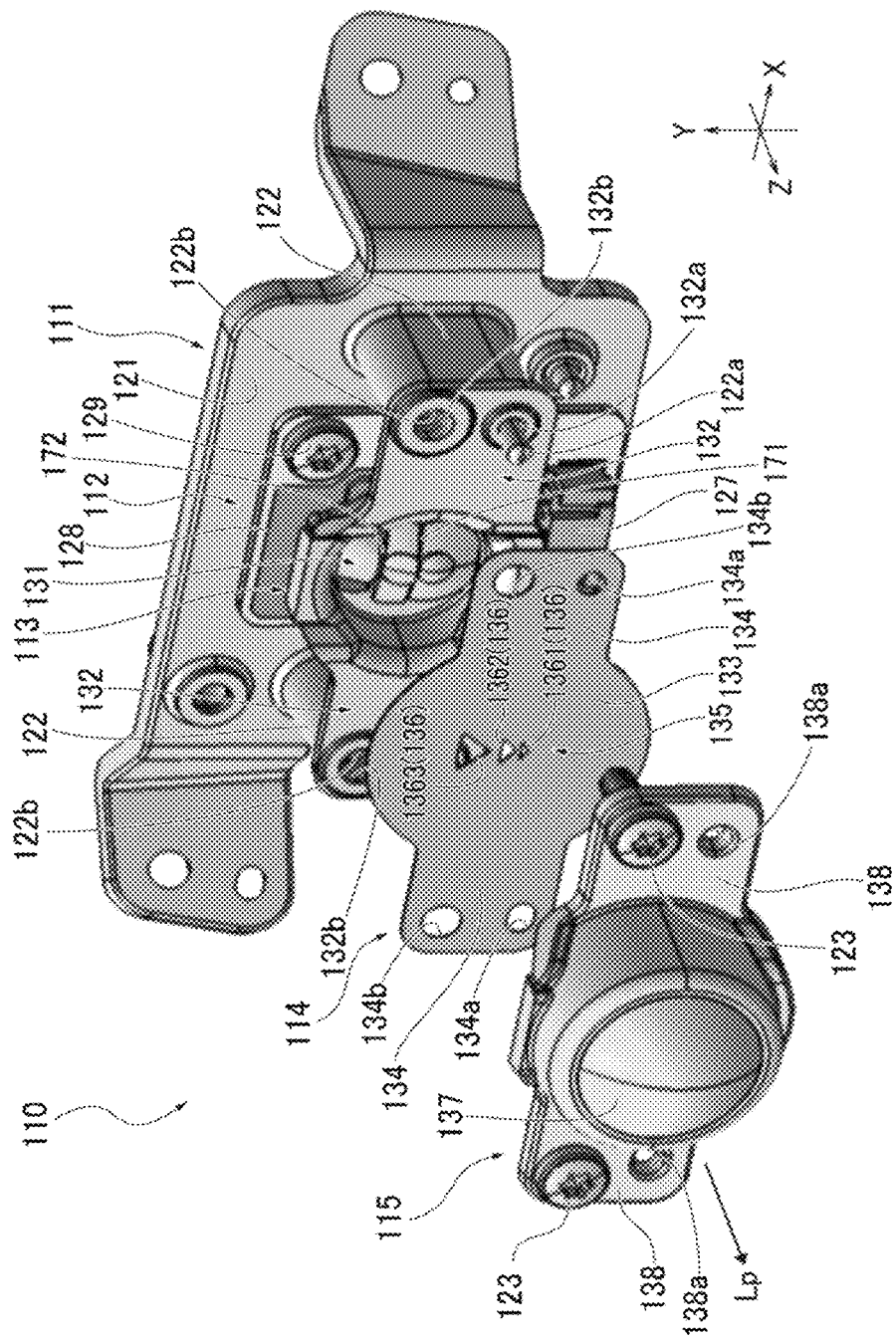
FIG. 14 is an exploded view illustrating a configuration of the vehicle lamp.

As illustrated in FIG. 14, in the vehicle lamp 110, a light source portion 112, a collecting lens 113, the shade 114, and a projecting lens 115 are attached to an installation base portion 111 to form a single projection optical system and constitute a road surface projection unit of a projector type. The installation base portion 111 is a portion where the light source portion 112 is provided, is made of aluminum die-casting or resin having thermal conductivity, and functions as a heat sink that releases the heat generated in the light source portion 112 to the outside as a whole. The installation base portion 111 includes a base portion 121 and a pair of mounting arm portions 122.

The base portion 121 has a flat plate shape orthogonal to the optical axis direction and, the light source portion 112 is mounted on a light source mounting area at the center. The light source mounting area has a flat surface and is provided with a plurality of screw holes and a plurality of positioning protrusions. In addition, the base portion 121 is provided with a plurality of heat radiation fins, and the heat generated in the light source portion 112 installed at the light source mounting area is radiated to the outside mainly from each of the heat radiation fins.

The pair of mounting arm portions 122 is provided as a pair on both outer sides in the width direction of the light source portion 112 and protrudes forward from the base portion 121 in the optical axis direction. End portions of the two mounting arm portions 122 on the front side in the optical axis direction are flat surfaces orthogonal to the optical axis direction. Each of the end portions is provided with a positioning protrusion 122a and a screw hole 122b. The positioning protrusion 122a is provided in a lower portion of the end portion in the up-down direction and protrudes forward in the optical axis direction. The screw hole 122b is provided in an upper portion of the end portion in the up-down direction, and the collecting lens 113, the shade 114, and the projecting lens 115 can be fixed by screwing a screw 123.

The light source portion 112 includes a first light source 124, a second light source 125, a third light source 126 (see FIG. 15 and the like), a connector terminal 127, and a substrate 128 on which these components are mounted. The three light sources (124, 125, 126) include a light emitting element such as a light emitting diode (LED). According to the second embodiment, the three light sources (124, 125, 126) emit light in amber color (amber light) with a Lambertian distribution centered on the emission optical axis. The colors (wavelength bands), the mode of distribution, the number of colors, and the like, of the three light sources (124, 125, 126) may be appropriately set and are not limited to the configuration according to the second embodiment.

Figure 15:
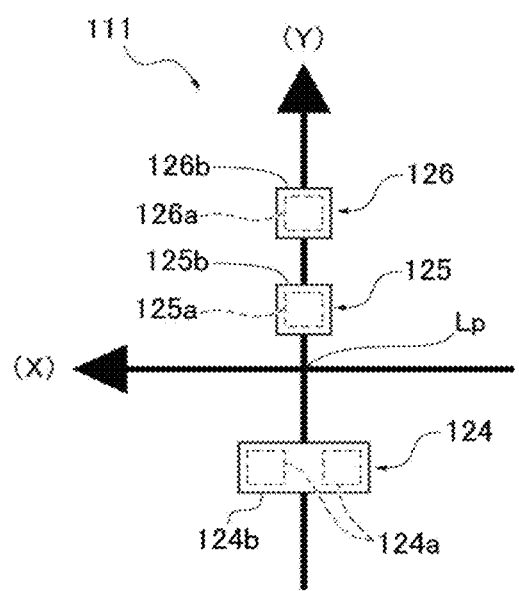
FIG. 15 is an explanatory diagram illustrating a configuration and a positional relationship of a first light source, a second light source, and a third light source in a light source portion.

As illustrated in FIG. 15 and the like, the three light sources (124, 125, 126) according to the second embodiment are arranged in parallel in the up-down direction with the projection optical axis Lp interposed therebetween, the first light source 124 is located below the projection optical axis Lp, the second light source 125 is located above the projection optical axis Lp, and the third light source 126 is located above the second light source 125. The first light source 124 has a rectangular shape elongated in the width direction and includes two LED chips 124a and a phosphor 124b covering each of them. The second light source 125 has a substantially square shape and includes one LED chip 125a and a phosphor 125b covering it. The third light source 126 has a substantially square shape and includes one LED chip 126a and a phosphor 126b covering it. The three light sources (124, 125, 126) emit light from the LED chips 124a, 125a, 126a as amber light by passing the light through the phosphors 124b, 125b, 126b. Therefore, in the first light source 124, the phosphor 124b functions as a first light emission surface, in the second light source 125, the phosphor 125b functions as a second light emission surface, and in the third light source 126, the phosphor 126b functions as a third light emission surface.

As illustrated in FIG. 14, the connector terminal 127 is electrically connected to a wiring pattern of the substrate 128, and a connection connector connected to a lighting control circuit is detachably attached. The connector terminal 127 is provided at a lower end portion of the substrate 128 in the up-down direction so that the connection connector can be easily attached and detached. When the connection connector is attached to the connector terminal 127, electric power can be supplied from the lighting control circuit to the light sources (124, 125, 126) via the wiring pattern.

The substrate 128 has a plate shape formed of a resin material such as a glass epoxy substrate, and each of the light sources (124, 125, 126) is mounted thereon. In the substrate 128, a plurality of screw through-holes is provided corresponding to the respective screw holes of the light source mounting area of the base portion 121 of the installation base portion 111, and a plurality of positioning holes is provided corresponding to the respective positioning protrusions of the light source mounting area. The substrate 128 is attached to the base portion 121 by inserting the corresponding positioning protrusions to the positioning holes and screwing screws 129 inserted into the screw through-holes into the corresponding screw holes. Accordingly, the substrate 128 causes the mounted light sources (124, 125, 126) to be opposed to the collecting lens 113. The substrate 128 appropriately supplies power from the lighting control circuit via the connector terminal 127 to appropriately turn on the light sources (124, 125, 126).

The collecting lens 113 collects the light emitted from each of the light sources (124, 125, 126) and collects the light in the periphery of each of the slit portions 136 described below on the shade 114, i.e., in the area where each of the slit portions 136 is provided while including all the slit portions 136 on the shade 114. The collecting lens 113 includes a collecting lens main body 131 that collects light from each of the light sources (124, 125, 126) and a pair of collecting lens mounting pieces 132 that protrudes from the collecting lens main body in the width direction. The collecting lens main body 131 and the collecting lens mounting piece 132 are integrally formed, and are integrally formed by resin molding using a mold according to the second embodiment. Optical characteristics of the collecting lens main body 131 are set to form a predetermined light distribution area on the shade 114. This will be described below.

The two collecting lens mounting pieces 132 are formed in a plate shape orthogonal to the optical axis direction and can be applied to the end portions of the two mounting arm portions 122 of the base portion 121 of the installation base portion 111. Each of the collecting lens mounting pieces 132 is provided with a collecting lens positioning hole 132a and a collecting lens screw through-hole 132b. The positioning protrusion 122a can be fitted into each of the collecting lens positioning holes 132a in a state where the collecting lens mounting piece 132 is applied to the end portion. The screws 123 screwed into the screw holes 122b can be inserted into the respective collecting lens screw through-holes 132b in a state where the collecting lens mounting piece 132 is applied to the end portion. The collecting lens 113 is attached to the two mounting arm portions 122 (the end portions thereof) of the installation base portion 111 by inserting the corresponding positioning protrusions 122a into the collecting lens positioning holes 132a and screwing the screws 123 inserted into the collecting lens screw through-holes 132b into the corresponding screw holes 122b.

The shade 114 is an example of a shielding member that forms the radiation pattern Pi by causing the light from each of the light sources (124, 125, 126) collected by the collecting lens 113 to partially pass through the radiating slit 135 described below. As illustrated in FIG. 13, in the radiation pattern Pi, the three radiation designs Di are arranged at substantially equal intervals in a direction away from the vehicle 101. In this case, when each of the radiation designs Di is individually illustrated, the radiation design farthest from the vehicle 101 is defined as the first radiation design Di1, and the radiation designs are defined as the second radiation design Di2 and the third radiation design Di3 in order as they are closer to the vehicle 101. According to the second embodiment, each of the radiation designs Di has a substantially isosceles triangle shape having a base on the vehicle 101 side and has substantially the same size and the same shape.

The radiation pattern Pi is formed by arranging the first radiation design Di1, the second radiation design Di2, and the third radiation design Di3 on the same straight line so as to be away from the vehicle 101 on the road surface 102 as a projection surface. Thus, the radiation pattern Pi can look like an arrow indicating the arranged direction by arranging the three radiation designs Di. The direction indicated by the arrow as the radiation pattern Pi, i.e., the direction in which the apexes of the substantially isosceles triangles of the radiation designs Di are arranged is the arrow direction Da, and the indicated side (the first radiation design Di1 side) is the front side of the arrow direction Da. The radiation pattern Pi including the three radiation designs Di is formed by the shade 114.

As illustrated in FIG. 14, the shade 114 is made of a plate-like member that basically blocks transmission of light and includes a shade portion 133 and a pair of shade mounting pieces 134. The shade mounting pieces 134 protrude from both sides of the shade portion 133 in the width direction and can be applied to the respective collecting lens mounting pieces 132 of the collecting lens 113 attached to the end portions of the two mounting arm portions 122 of the installation base portion 111. Each of the shade mounting pieces 134 is provided with a shade positioning hole 134a and a shade screw through-hole 134b. Each of the shade positioning holes 134a allows the positioning protrusion 122a passed therethrough to be fitted into the shade positioning hole 134a in a state where the shade mounting piece 134 is applied to the collecting lens mounting piece 132. Each of the shade screw through-holes 134b allows the screw 123 inserted into the collecting lens screw through-hole 132b to be inserted into the shade screw through-hole 134b in a state where the shade mounting piece 134 is applied to the collecting lens mounting piece 132. The shade 114 is attached to the two mounting arm portions 122 of the installation base portion 111 via the collecting lens 113 by inserting the corresponding positioning protrusion 122a to each of the shade positioning holes 134a and screwing each of the screws 123 inserted into each of the shade screw through-holes 134b into the corresponding screw hole 122b. In the shade 114, the center position of the shade portion 133 is located on the projection optical axis Lp by attaching the shade mounting piece 134 to the two mounting arm portions 122.

The shade portion 133 is provided with the radiating slit 135 formed by partially cutting out and penetrating the plate-like member. The radiating slit 135 partially transmits the light from each of the light sources (124, 125, 126) collected by the collecting lens 113 (the collecting lens main body 131 thereof), thereby forming the radiation pattern Pi to be projected into a predetermined shape. The radiating slit 135 corresponds to the radiation pattern Pi, and includes the three slit portions 136 according to the second embodiment.

The three slit portions 136 correspond one to-one to the three radiation designs Di. Since the projecting lens 115 inverts the shade 114 (the radiating slit 135) and projects the inverted shade 114 onto the road surface 102, each of the slit portions 136 has a rotationally symmetric positional relationship around the projection optical axis Lp with respect to the positional relationship of each of the radiation designs Di of the radiation pattern Pi. Therefore, in each of the slit portions 136, a first slit portion 1361 on the lowermost side in the up-down direction corresponds to the first radiation design Di1 of the radiation pattern Pi, a second slit portion 1362 above it corresponds to the second radiation design Di2, and a third slit portion 1363 above it corresponds to the third radiation design Di3.

The position and the size of each of the slit portions 136 on the shade portion 133 are set such that each of the radiation designs Di has a target size and a target positional relationship on the road surface 102. In the shade 114 according to the second embodiment, in the up-down direction, the third slit portion 1363 is provided above the projection optical axis Lp, the second slit portion 1362 is provided on the projection optical axis Lp, and the first slit portion 1361 is provided below the second slit portion (see FIG. 21). The light transmitted through the shade 114 (each of the slit portions 136 of the radiating slit 135) is projected onto the road surface 102 by the projecting lens 115.

The slit portions 136 are formed in a substantially isosceles triangle shape similarly to the respective corresponding radiation designs Di and are vertically and horizontally inverted with respect to the respective radiation designs Di. The sizes and the intervals of the three slit portions 136 are set in accordance with the distances to the road surface 102 so that the radiation designs Di have the sizes illustrated in FIG. 13 and are arranged at substantially equal intervals on the road surface 102. Specifically, in the vehicle lamp 110, since the projection optical axis Lp is provided to be inclined with respect to the road surface 102, the distances from the shade 114 and the projecting lens 115 to the road surface 102 are different, and therefore, when projected onto the road surface 102 by the projecting lens 115, each of the slit portions 136 (each of the radiation designs Di that is light transmitted therethrough) has the size and the interval corresponding to the distance. Specifically, according to the second embodiment, the first slit portion 1361 is a substantially isosceles triangle that is the smallest and is contracted in the height direction, the second slit portion 1362 is a substantially isosceles triangle that is larger than the first slit portion 1361, and the third slit portion 1363 is a substantially isosceles triangle that is larger than the second slit portion 1362 and is curved so that the bottom surface slightly swells. Each of the slit portions 136 is wider than the corresponding radiation design Di in the width direction, and the interval between the second slit portion 1362 and the third slit portion 1363 is larger than the interval between the first slit portion 1361 and the second slit portion 1362.

In this way, the three slit portions 136 are different in size from the respective radiation designs Di and are arranged at different intervals. In each of the slit portions 136, the first slit portion 1361 has the smallest reduction ratio with respect to the corresponding radiation design Di, and the passed light is enlarged at the largest enlargement ratio when projected on the road surface 102 to form the first radiation design Di1. In addition, in each of the slit portions 136, the third slit portion 1363 has the largest reduction ratio with respect to the corresponding radiation design Di, and the passed light is enlarged at the smallest enlargement ratio when being projected onto the road surface 102 to form the third radiation design Di3.

The projecting lens 115 includes a projecting lens main body 137 that projects light having passed through the shade 114 and a pair of projecting lens mounting pieces 138 that protrudes from it in the width direction. The projecting lens main body 137 is a convex lens having a circular shape when viewed in the optical axis direction and, according to the second embodiment, is a free-form surface in which the incidence surface and the emission surface are convex surfaces. The projecting lens main body 137 forms the radiation pattern Pi on the road surface 102 inclined with respect to the projection optical axis Lp by projecting the radiating slit 135 (each of the slit portions 136 thereof) of the shade 114 (see FIG. 13). The incidence surface and the emission surface may be convex or concave surfaces as long as the projecting lens main body 137 is a convex lens and are not limited to the configuration according to the second embodiment.

The two projecting lens mounting pieces 138 are formed in a plate shape orthogonal to the optical axis direction and can be applied to the shade mounting pieces 134 of the shade 114 attached to the end portions of the two mounting arm portions 122 of the installation base portion 111. Each of the projecting lens mounting pieces 138 is provided with a projecting lens positioning hole 138*a* and a projecting lens screw through-hole. Each of the projecting lens positioning holes 138*a* allows the positioning protrusion 122*a* passed therethrough to be fitted into the projecting lens positioning hole 138*a* in a state where the projecting lens mounting piece 138 is applied to the shade mounting piece 134. Each of the projecting lens screw through-holes allows the screw 123 inserted through the shade screw through-hole 134*b* to be inserted into the projecting lens screw through-hole in a state where the projecting lens mounting piece 138 is applied to the shade mounting piece 134. The projecting lens 115 is attached to the two mounting arm portions 122 (the end portions thereof) of the installation base portion 111 by inserting the corresponding positioning protrusion 122*a* into each of the projecting lens positioning holes 138*a* and screwing each of the screws 123 inserted into the respective projecting lens screw through-holes into the corresponding screw hole 122*b*. Accordingly, in the projecting lens 115, the projection optical axis Lp, which is the optical axis of the projecting lens main body 137, is directed in a predetermined direction, and the direction of the projection optical axis Lp of the vehicle lamp 110 is set.

Next, the configuration of the collecting lens main body 131 of the collecting lens 113 will be described mainly with reference to FIGS. 16 to 19. The collecting lens main body 131 (the collecting lens 113) includes a front surface 141 opposed to the shade 114 and a back surface 142 opposed to the light source portion 112. The collecting lens main body 131 includes a first lens portion 143 that corresponds to the first light source 124, a second lens portion 144 that corresponds to the second light source 125, and a third lens portion 145 that corresponds to the third light source 126. In the collecting lens 113 (the collecting lens main body 131) according to the second embodiment, the first lens portion 143, the second lens portion 144, and the third lens portion 145 are integrally formed in a state where the second lens portion 144 is placed on the first lens portion 143 and the third lens portion 145 is placed on the second lens portion 144. In the collecting lens 113 according to the second embodiment, the (optical) shapes of the front surface 141 side and the back surface 142 side of the first lens portion 143, the second lens portion 144, and the third lens portion 145 are set so that each of the slit portions 136 of the shade 114 is appropriately irradiated with the light emitted from the light source portion 112, i.e., each light source (124, 125, 126).

Figure 16:
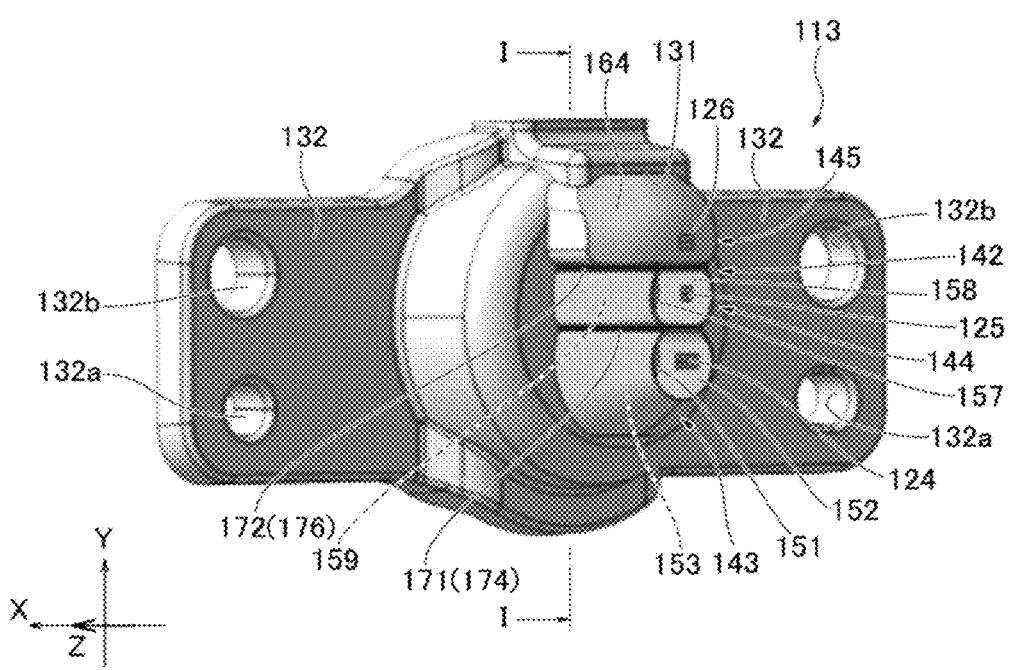
FIG. 16 is an explanatory diagram illustrating a state of a collecting lens as viewed from the light source portion side.
Figure 17:
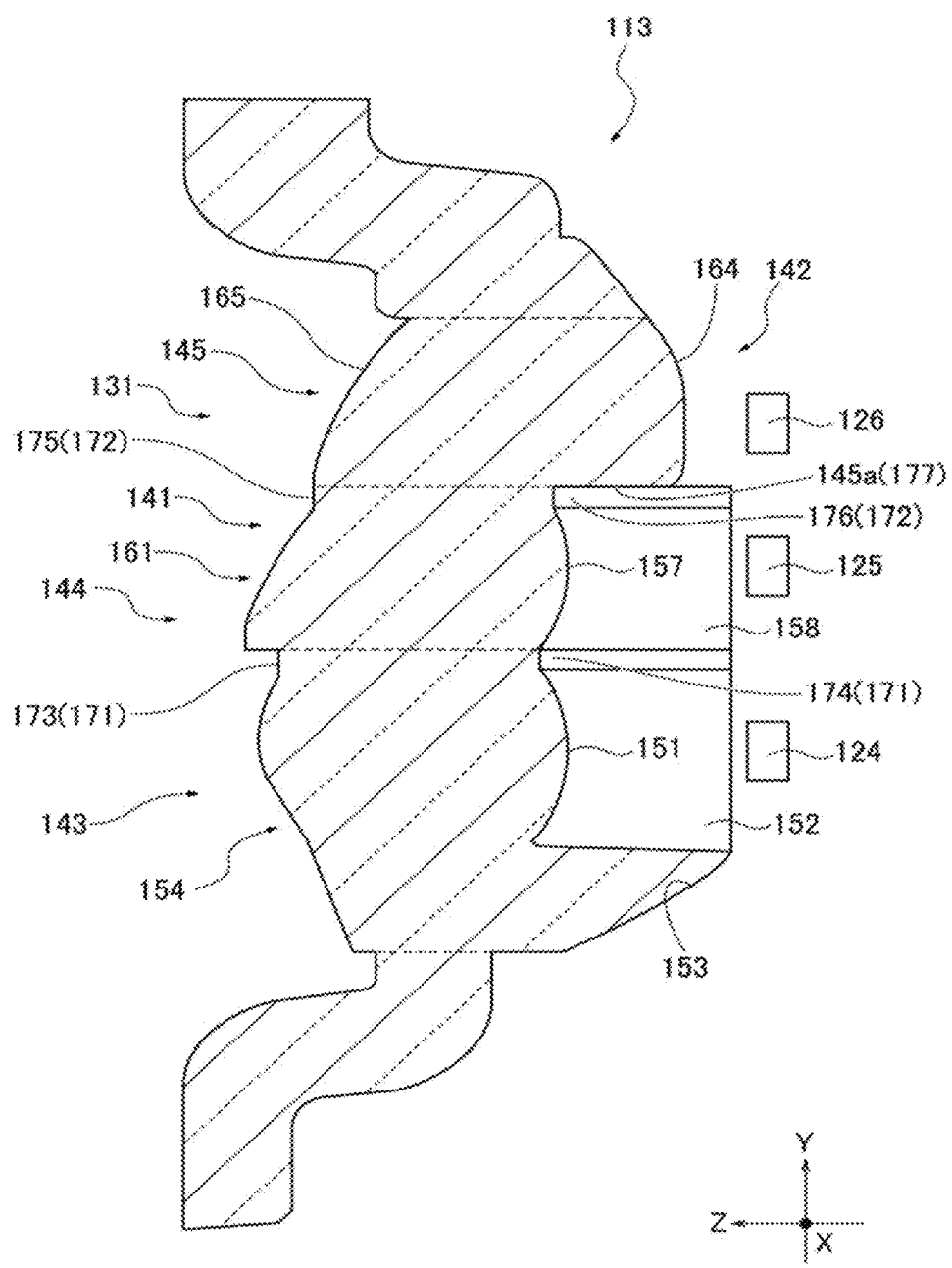
FIG. 17 is an explanatory diagram illustrating a cross-section taken along the line I-I illustrated in FIG. 16.
Figure 19:
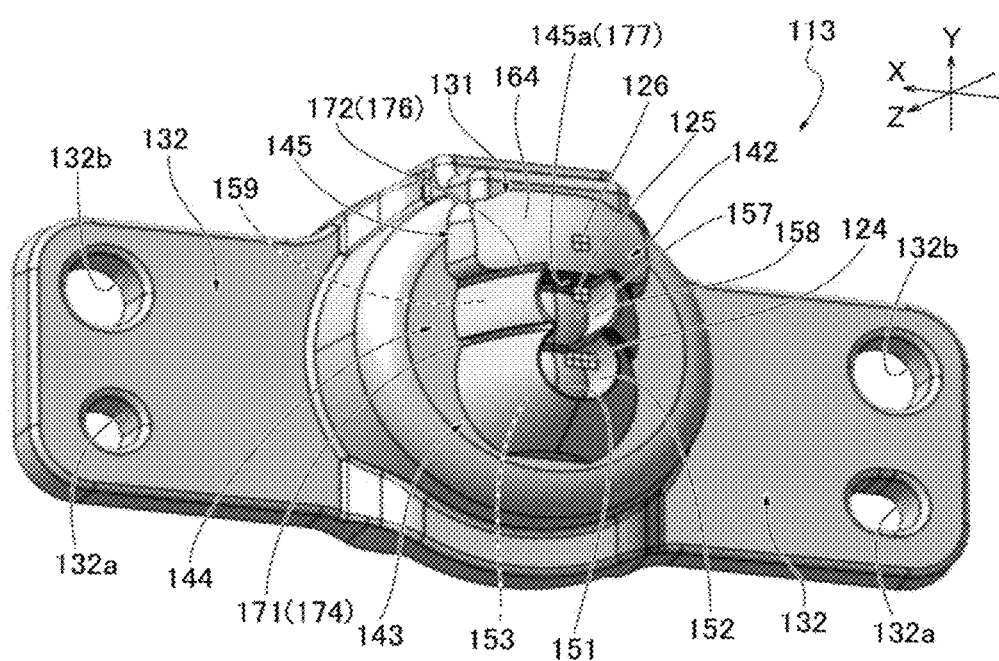
FIG. 19 is an explanatory diagram illustrating a state of the collecting lens as viewed from the light source portion side and obliquely from a lower side in an up-down direction.

The first lens portion 143 is opposed to the first light source 124 in the optical axis direction (located on the emission optical axis of the first light source 124) and collects the light from the first light source 124 to an area where the first slit portion 1361 of the shade 114 is provided. As illustrated in FIGS. 16, 17, 19 and the like, the back surface 142 of the first lens portion 143 has a central portion recessed toward the inside of the collecting lens 113 (the side opposite to the light source portion 112) and is provided with a first opposing incidence surface portion 151 curved convexly outward at the center, a first inclined incidence surface portion 152 surrounding it, and a first reflective surface 153 surrounding the first inclined incidence surface portion 152 in a truncated cone shape.

The first opposing incidence surface portion 151 is provided on the emission optical axis to be opposed to the first light source 124 in the optical axis direction, and the first light source 124 is located in the vicinity of the focal point on the rear side (rear focal point). The first opposing incidence surface portion 151 causes the light emitted from the first light source 124 to enter the first lens portion 143 as parallel light traveling substantially parallel to the axis line of the first lens portion 143, and causes the light to travel toward a first inner emission surface portion 155 (described below) of the front surface 141. In addition, the parallel light (light that is parallel) refers to the light that is collimated by passing through the first opposing incidence surface portion 151.

The first inclined incidence surface portion 152 is provided to protrude toward the first light source 124 side and causes the light which does not travel to the first opposing incidence surface portion 151 among the light from the first light source 124 to be incident on the first lens portion 143. The first reflective surface 153 is provided at a position where the light incident on the collecting lens 113 from the first inclined incidence surface portion 152 travels. The first reflective surface 153 reflects light incident from the first inclined incidence surface portion 152 and causes the light to travel toward a first outer emission surface portion 156 described below of the front surface 141 as parallel light traveling substantially parallel to the axis line of first lens portion 143. The first reflective surface 153 may reflect light by using total reflection, or may reflect light by adhering aluminum, silver, or the like by vapor deposition, coating, or the like. For these reasons, the back surface 142 causes the light emitted from the first light source 124 to be efficiently incident and guides the light to the front surface 141.

Therefore, in the first lens portion 143, the light having passed through the first opposing incidence surface portion 151 becomes direct light that travels directly toward the front surface 141 side, and the light having passed through the first inclined incidence surface portion 152 and reflected by the first reflective surface 153 becomes reflected light that travels toward the front surface 141 side after being internally reflected. Since the first lens portion 143 has such a configuration, it is possible to efficiently use light emitted from the corresponding first light source 124.

Figure 18:
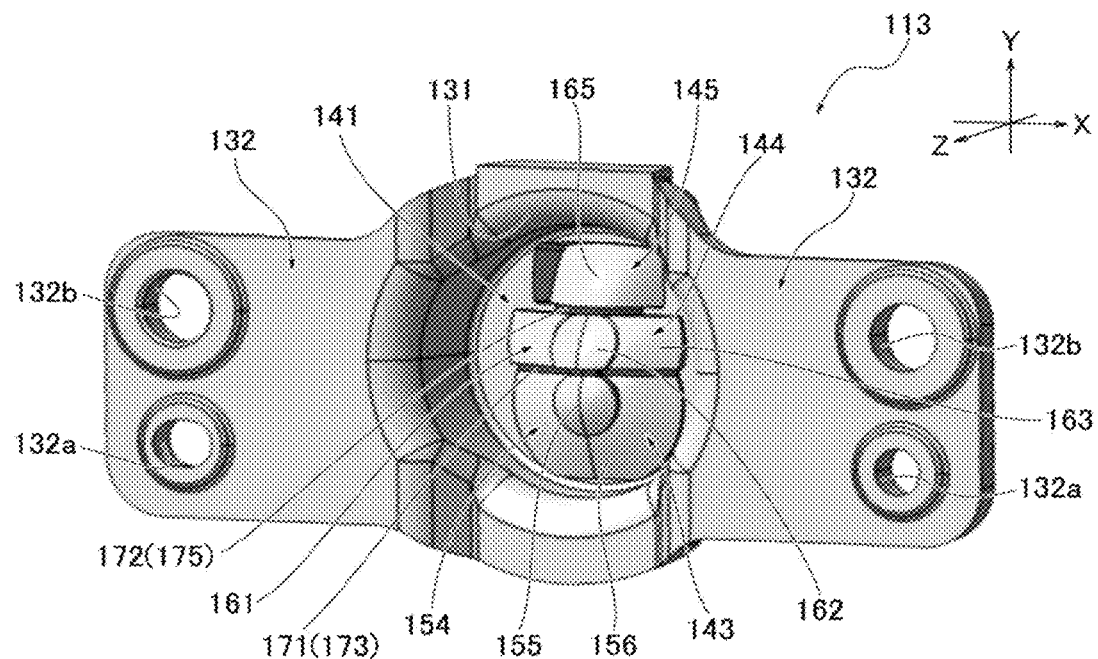
FIG. 18 is an explanatory diagram illustrating a state of the collecting lens as viewed from the shade side.

The first lens portion 143 is provided with a first emission surface 154 that emits light incident on the front surface 141 side to the front side in the front-back direction. As illustrated in FIG. 18 and the like, the first emission surface 154 has a circular shape in which a part of the upper side is cut out in a front view, and includes the first inner emission surface portion 155 and the first outer emission surface portion 156 having different optical settings. The first inner emission surface portion 155 is provided in an area of the first emission surface 154 where the light having passed through the first opposing incidence surface portion 151 travels, and has a substantially circular shape in a front view. The first inner emission surface portion 155 protrudes outward (the projecting lens 115 side (the front side in the front-back direction)) of the collecting lens 113 beyond the first outer emission surface portion 156. The first inner emission surface portion 155 refracts the light emitted from the first light source 124 and passing through the first opposing incidence surface portion 151, thereby forming a plurality of light distribution images of the first light source 124 on the first slit portion 1361 of the shade 114 at positions corresponding to the optical characteristics in an appropriately overlapping manner. The optical characteristics can be set by adjusting the curvature (surface shape) of the first inner emission surface portion 155 together with the first opposing incidence surface portion 151 for each place and, according to the second embodiment, the curvatures are set to be gradually changed.

The first outer emission surface portion 156 is provided to surround the area sandwiching the first inner emission surface portion 155 in the width direction and the area below the first inner emission surface portion 155, and is located in the area where the light travels after being emitted from the first light source 124, passing through the first inclined incidence surface portion 152, and being reflected by the first reflective surface 153. The first outer emission surface portion 156 is located (recessed) on the inner side (the back side in the front-back direction) of the collecting lens 113 with respect to the first inner emission surface portion 155. The first outer emission surface portion 156 refracts the light emitted from the first light source 124, passed through the first inclined incidence surface portion 152, and reflected by the first reflective surface 153, thereby forming a plurality of light distribution images of the first light source 124 on the first slit portion 1361 of the shade 114 at positions corresponding to the optical characteristics in an appropriately overlapping manner. The optical characteristics can be set by adjusting the curvature (surface shape) of the first outer emission surface portion 156 together with the first reflective surface 153 for each place, and according to the second embodiment, the curvatures are set to be gradually changed.

For example, the first lens portion 143 forms a light distribution area to brighten the entire area of the first slit portion 1361 with the light having passed through the first inner emission surface portion 155 and forms a light distribution area to brighten the vicinity of the apex of the first slit portion 1361 with the light having passed through the first outer emission surface portion 156. Then, the first lens portion 143 overlaps the light having passed through the first inner emission surface portion 155 with the light having passed through the first outer emission surface portion 156 and thus forms a first light distribution area in which the vicinity of the apex of the first slit portion 1361 has the highest light flux (light amount) while the entire area of the first slit portion 1361 is brightened. As long as the first lens portion 143 forms the light distribution area that brightens the first slit portion 1361 from the viewpoint of appropriately forming the corresponding first radiation design Di1, the brightness distribution, shape, and the like in the light distribution areas formed by the first inner emission surface portion 155 and the first outer emission surface portion 156 may be appropriately set, and are not limited to the second embodiment.

The second lens portion 144 is opposed to the second light source 125 in the optical axis direction (located on the emission optical axis of the second light source 125), and collects the light from the second light source 125 to the area where the second slit portion 1362 of the shade 114 is provided. The second lens portion 144 has the same basic configuration on the back surface 142 and the front surface 141 and the same basic concept of light collection with respect to the second slit portion 1362 except for detailed optical settings caused by the difference in size and shape of the corresponding slit portion 136. Therefore, hereinafter, the configuration and optical setting of the second lens portion 144 will be briefly described.

As illustrated in FIGS. 16, 17, 19 and the like, the back surface 142 of the second lens portion 144 has a central portion recessed toward the inside of the collecting lens 113 (the side opposite to the light source portion 112) and is provided with a second opposing incidence surface portion 157 curved convexly outward at the center, a second inclined incidence surface portion 158 surrounding it, and a second reflective surface 159 surrounding the second inclined incidence surface portion 158 in a truncated cone shape. The second opposing incidence surface portion 157 is provided on the emission optical axis to be opposed to the second light source 125 in the optical axis direction, causes the light emitted from the second light source 125 to be incident on the collecting lens 113 as parallel light traveling substantially parallel to the axis line of the second lens portion 144, and causes the light to travel toward a second inner emission surface portion 162 described below of the front surface 141. The second inclined incidence surface portion 158 is provided to protrude toward the second light source 125 side, and causes the light that does not travel to the second opposing incidence surface portion 157 among the light from the second light source 125 to be incident on the second lens portion 144. The second reflective surface 159 reflects the light incident on the collecting lens 113 from the second inclined incidence surface portion 158, and collects the light so that the light travels toward a second outer emission surface portion 163 described below of the front surface 141 as parallel light traveling substantially parallel to the axis line of the second lens portion 144.

The second lens portion 144 is provided with a second emission surface 161 that emits light incident on the front surface 141 side to the front side in the front-back direction. The second emission surface 161 has a substantially rectangular shape elongated in the width direction in a front view, and includes a second inner emission surface portion 162 and a second outer emission surface portion 163 having different optical settings. The second inner emission surface portion 162 is provided in an area of the second emission surface 161 where the light having passed through the second opposing incidence surface portion 157 travels, has a substantially circular shape in a front view, and protrudes outward (the projecting lens 115 side (the front side in the front-back direction)) of the collecting lens 113 beyond the second outer emission surface portion 163. The second outer emission surface portion 163 is provided in the area sandwiching the second inner emission surface portion 162 in the width direction, is located in the area where the light travels after being emitted from the second light source 125, passing through the second inclined incidence surface portion 158, and being reflected by the second reflective surface 159, and is located (recessed) on the inner side (the back side in the front-back direction) of the collecting lens 113 with respect to the second inner emission surface portion 162.

For example, the second lens portion 144 forms a light distribution area to brighten the entire area of the second slit portion 1362 with the light having passed through the second inner emission surface portion 162 and forms a light distribution area to brighten the vicinity of the apex of the second slit portion 1362 with the light having passed through the second outer emission surface portion 163. Then, the second lens portion 144 overlaps the light having passed through the second inner emission surface portion 162 with the light having passed through the second outer emission surface portion 163 and thus forms a second light distribution area AL (see FIG. 21) in which the vicinity of the apex of the second slit portion 1362 has the highest light flux (light amount) while the entire area of the second slit portion 1362 is brightened. As long as the second lens portion 144 forms the light distribution area that brightens the second slit portion 1362 from the viewpoint of appropriately forming the corresponding first radiation design Di1, the brightness distribution, shape, and the like in the light distribution area formed by the second inner emission surface portion 162 and the second outer emission surface portion 163 may be appropriately set, and are not limited to the second embodiment.

As illustrated in FIGS. 16 to 19 and the like, the third lens portion 145 is a convex lens formed in a substantially rectangular shape elongated in the width direction when viewed from the front in the optical axis direction and, as a whole, collects the light emitted from the third light source 126 and having a spread in a state close to being parallel to the projection optical axis Lp and causes the light to travel to the shade portion 133. The third lens portion 145 includes a third incidence surface 164 opposed to the third light source 126 and a third emission surface 165 directed to the opposite side. According to the second embodiment, the third lens portion 145 is a free-form surface in which the third incidence surface 164 and the third emission surface 165 are convex surfaces. The third incidence surface 164 and the third emission surface 165 may be a convex surface or a concave surface as long as the third lens portion 145 is a convex lens, and are not limited to the configuration according to the second embodiment.

The third incidence surface 164 is opposed to the third light source 126 in the optical axis direction, and the third light source 126 is located in the vicinity of the focal point on the rear side (rear focal point). The third incidence surface 164 causes the light emitted from the third light source 126 to enter the third lens portion 145 as parallel light traveling substantially parallel to the axis line of the third lens portion 145. The third emission surface 165 is provided on the side opposite to the third incidence surface 164, and refracts the light having passed through the third incidence surface 164 to cause the light to travel toward the front side in the front-back direction while diffusing the light. The third emission surface 165 emits the light from the third light source 126 through the third incidence surface 164 to form a plurality of light distribution images of the third light source 126 at positions corresponding to the optical characteristics on the shade 114 (the shade portion 133) in an appropriately overlapping manner. The optical characteristics can be set by adjusting the curvatures (surface shapes) of the third incidence surface 164 and the third emission surface 165 for each place and, according to the second embodiment, the curvatures are set to be gradually changed.

The third emission surface 165 appropriately refracts the light emitted from the third light source 126 and passing through the third incidence surface 164, thereby forming a third light distribution area in which the entire area of the third slit portion 1363 of the shade 114 has a substantially equal light flux (light amount). Here, a substantially equal light flux in the entire area means that a change in the light flux is smaller than that in at least the first light distribution area or the second light distribution area AL, and preferably means a substantially uniform light flux. It is assumed that the third light distribution area according to the second embodiment has a lower light flux than the first light distribution area and the second light distribution area AL.

In the collecting lens 113, the first lens portion 143 forms the first light distribution area in the first slit portion 1361 with the light from the first light source 124, the second lens portion 144 forms the second light distribution area AL in the second slit portion 1362 with the light from the second light source 125, and the third lens portion 145 forms the third light distribution area in the third slit portion 1363 with the light from the third light source 126. Therefore, on the shade 114, the collecting lens 113 can form a predetermined light flux distribution with a predetermined modulation (inflection (differences in the level of the light flux)) for the first slit portion 1361 and the second slit portion 1362 and can form a uniform light flux distribution lower than that of the first slit portion 1361 and the second slit portion 1362 for the third slit portion 1363.

In the collecting lens 113, the collecting lens main body 131 is provided with a first light reduction portion 171 and a second light reduction portion 172. The first light reduction portion 171 and the second light reduction portion 172 reduce or block light (light flux) from each light source (124, 125, 126) in the collecting lens main body 131, and the first light reduction portion 171 is located between the first lens portion 143 and the second lens portion 144, and the second light reduction portion 172 is located between the second lens portion 144 and the third lens portion 145.

According to the second embodiment, the first light reduction portion 171 includes a front-surface-side first light reduction portion 173 and a back-surface-side first light reduction portion 174, and the second light reduction portion 172 includes a front-surface-side second light reduction portion 175 and a back-surface-side second light reduction portion 176. The front-surface-side first light reduction portion 173 is formed, on the front surface 141 of the collecting lens main body 131, by performing light reduction processing between the first emission surface 154 of the first lens portion 143 and the second emission surface 161 of the second lens portion 144. In addition, the front-surface-side second light reduction portion 175 is formed, on the front surface 141 of the collecting lens main body 131, by performing light reduction processing between the second emission surface 161 of the second lens portion 144 and the third emission surface 165 of the third lens portion 145. Further, the back-surface-side first light reduction portion 174 is formed, on the back surface 142 of the collecting lens main body 131, by performing light reduction processing between the first opposing incidence surface portion 151, the first inclined incidence surface portion 152, and the first reflective surface 153 of the first lens portion 143 and the second opposing incidence surface portion 157, the second inclined incidence surface portion 158, and the second reflective surface 159 of the second lens portion 144. The back-surface-side second light reduction portion 176 is formed, on the back surface 142 of the collecting lens main body 131, by performing light reduction processing between the second opposing incidence surface portion 157, the second inclined incidence surface portion 158, and the second reflective surface 159 of the second lens portion 144 and the third incidence surface 164 of the third lens portion 145.

Examples of the light reduction processing include forming a shielding surface by applying a light-shielding coating material such as black, and forming a scattering surface by forming a fine optical element, a prism (unevenness), emboss, or the like. In the collecting lens main body 131, the first light reduction portion 171 and the second light reduction portion 172 are provided by performing the above-described light reduction processing on a band-shaped area having a predetermined size in the up-down direction while extending in the width direction with respect to the above-described position on the front surface 141 or the back surface 142. Here, the size of the first light reduction portion 171 and the second light reduction portion 172 in the up-down direction is equal to or less than 1 mm, and is 0.5 mm according to the second embodiment.

In addition, according to the second embodiment, in the third lens portion 145, the light reduction processing is also performed on a bottom surface 145a located on the second lens portion 144 side, and a bottom-surface-side second light reduction portion 177 forming a part of the second light reduction portion 172 is provided. While the third lens portion 145 is a convex lens and the third incidence surface 164 is a free-form surface as a convex surface as described above, the second lens portion 144 includes the second opposing incidence surface portion 157, the second inclined incidence surface portion 158, and the second reflective surface 159, and thus the bottom surface 145a is formed by the difference in shape therebetween (see FIG. 18). Since the bottom surface 145a is located obliquely forward and upward of the second light source 125, the light directly traveling from the second light source 125 may enter the third lens portion 145. Therefore, according to the second embodiment, the bottom-surface-side second light reduction portion 177 is formed by also performing the light reduction processing on the bottom surface 145a of the third lens portion 145.

Next, the operation of the vehicle lamp 110 will be described. The vehicle lamp 110 can turn on and off the light sources (124, 125, 126) individually, sequentially, or simultaneously by supplying electric power from the lighting control circuit to the light sources from the substrate 128. The light from each of the light sources (124, 125, 126) is collected by the collecting lens 113, is emitted to the shade 114, passes through the radiating slit 135 (each of the slit portions 136), and is then projected by the projecting lens 115, thereby forming the radiation pattern Pi on the road surface 102. The light transmitted through the radiating slit 135 (each of the slit portions 136 thereof) of the shade 114 having the above-described light (light flux) distribution is projected by the projecting lens 115, and thus the radiation pattern Pi is formed individually, sequentially, or simultaneously at the positions where the three radiation designs Di are arranged in the arrow direction Da.

The vehicle lamp 110 is interlocked with the turn lamps, and when one of the left and right turn lamps is turned on, the light sources (124, 125, 126) provided on the turned-on side are turned on to form the radiation pattern Pi on the road surface 102. According to the second embodiment, first, the third light source 126 is turned on, then the second light source 125 is turned on while the third light source 126 is continuously turned on, then the first light source 124 is turned on while the third light source 126 and the second light source 125 are continuously turned on, then the light sources (124, 125, 126) are turned off all at once, and thereafter this is repeated. As a result, the radiation pattern Pi can appear as if the radiation pattern Pi extends in the arrow direction Da by turning on the third radiation design Di3, the second radiation design Di2, and the first radiation design Di1 in this order. Therefore, in a scene where the vehicle 101 is traveling from an alley with poor visibility to a different alley, the vehicle lamp 110 can cause a person on the different alley to visually recognize the radiation pattern Pi formed on the road surface 102 even when the person cannot visually recognize the vehicle 101. In addition, in the vehicle 101, when the hazard lamps are turned on, the two left and right vehicle lamps 110 simultaneously form the radiation patterns Pi on the road surface 102 as described above and, therefore, it is possible to more reliably recognize that the hazard lamps are turned on, compared to a case where only the left and right turn lamps are blinked.

Here, in the conventional vehicle lamp described in the related art document, a plurality of light guides is provided individually corresponding to a plurality of light sources, and light from each light source is efficiently used. In the conventional vehicle lamp, each of the light guide members diffuses light therein to emit light having a substantially uniform light flux distribution, and a shade (shielding member) is irradiated with the light passing through each of the light guide members to obtain a substantially uniform light (light flux) distribution on the shade. Further, in the conventional vehicle lamp, since the light from the light source corresponding to each light guide is guided onto the shade, the light is separately guided onto the shade for each light source. For this reason, it is difficult for the conventional vehicle lamp to obtain a desired light distribution as in the case where an area having a high light flux is partially formed while continuously changing the light flux in an area having a low light flux on the shade.

On the other hand, the vehicle lamp 110 is provided with the single first lens portion 143, the single second lens portion 144, and the single third lens portion 145 that collect light from the respective three light sources (124, 125, 126) in the collecting lens 113. The first lens portion 143 forms, on the shade portion 133 of the shade 114, the first light distribution area in which the vicinity of the apex of the first slit portion 1361 is the brightest while the entire area of the first slit portion 1361 is brightened with the light from the corresponding first light source 124. In addition, the second lens portion 144 forms, on the shade portion 133 of the shade 114, the second light distribution area AL in which the vicinity of the apex of the second slit portion 1362 is the brightest while the entire area of the second slit portion 1362 is brightened with the light from the corresponding second light source 125. The third lens portion 145 forms, on the shade portion 133 of the shade 114, the third light distribution area to brighten the entire area of the third slit portion 1363 with a uniform light flux lower than that of the first light distribution area and the second light distribution area AL.

Here, the third slit portion 1363 corresponds to the third radiation design Di3 located closest to the vehicle 101 in the radiation pattern Pi and is projected onto a place close to the vehicle lamp 110, and therefore, in order to form the third radiation design Di3 which is easy to see, it is desirable that the light flux be uniform and lower than that of the other radiation designs Di. This is due to the following reasons. Since the third slit portion 1363 corresponds to the third radiation design Di3, the third slit portion 1363 has a large dimension on the shade portion 133. Then, when the third slit portion 1363 is irradiated by using a lens having a predetermined light flux distribution in which the light flux is modulated as in the first lens portion 143 or the second lens portion 144, it is difficult to irradiate the entire area, and unevenness of the brightness, such as the occurrence of a dark place, occurs in the formed third radiation design Di3, and there is a concern that the appropriate third radiation design Di3 cannot be formed. On the other hand, since the first slit portion 1361 and the second slit portion 1362 correspond to the first radiation design Di1 and the second radiation design Di2 at positions away from the vehicle 101 in the radiation pattern Pi and are projected onto places distant from the vehicle lamp 110, it is desirable to have a light flux distribution with a predetermined modulation (inflection (differences in the level of the light flux)) in order to form the first radiation design Di1 and the second radiation design Di2 which are easy to see.

The vehicle lamp 110 can illuminate the shade 114 with a desired light distribution by providing the first lens portion 143, the second lens portion 144, and the third lens portion 145 individually corresponding to the respective light sources (124, 125, 126) in the single collecting lens 113. That is, the vehicle lamp 110 forms the first light distribution area and the second light distribution area AL having a light flux distribution with a predetermined modulation by using the first lens portion 143 and the second lens portion 144 for the first slit portion 1361 and the second slit portion 1362 and forms the third light distribution area having a uniform light flux by using the third lens portion 145 for the third slit portion 1363. Therefore, even with the use of the single collecting lens 113, the vehicle lamp 110 can form both a portion having a predetermined light flux distribution with modulation and a portion having a uniform light flux on the shade portion 133. As a result, the vehicle lamp 110 can make the middle of the leading end of the first radiation design Di1 and the second radiation design Di2 clear as a center, can make the entire third radiation design Di3 clear, and can form the more appropriate radiation pattern Pi. Therefore, as compared with conventional vehicle lamps, the vehicle lamp 110 can easily adjust the light distribution of the light distribution area formed on the shade 114 and can form the radiation pattern Pi that has a desired brightness distribution and is easy to see, while having a simple configuration using the single collecting lens 113.

Here, in the vehicle lamp 110, in order to individually correspond to each of the light sources (124, 125, 126) by the single collecting lens 113, the first lens portion 143, the second lens portion 144, and the third lens portion 145 having different optical characteristics are overlapped in the up-down direction and integrally formed in the collecting lens main body 131 of the collecting lens 113. Then, in the vehicle lamp 110, a part of the light from each light source (124, 125, 126) travels to a lens portion (143, 144, 145) different from the corresponding one, and an unintended light distribution area may be formed on the shade portion 133 of the shade 114 due to the light. This will be described below.

Figure 20:
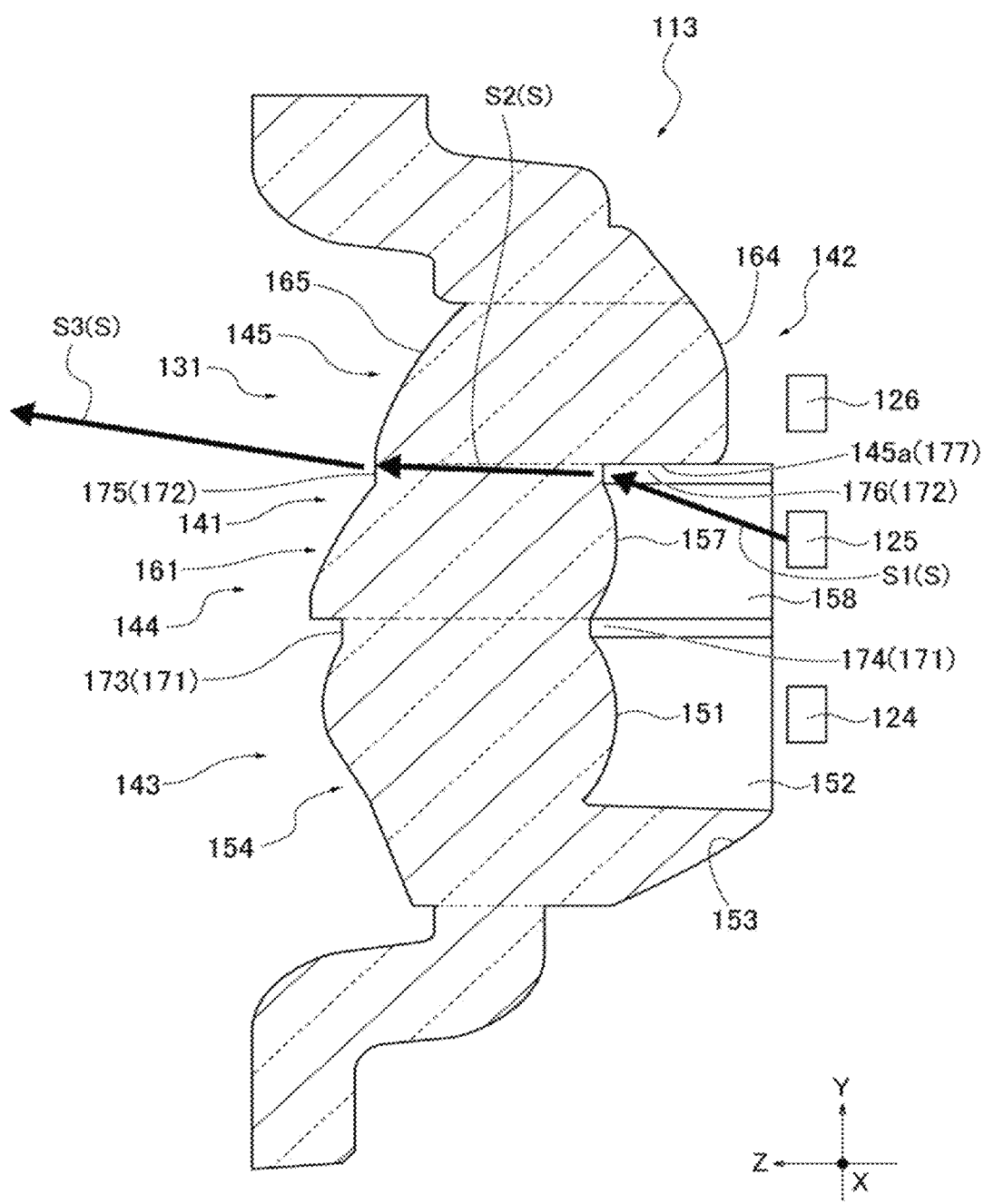
FIG. 20 is an explanatory diagram illustrating a state in which light from the second light source passes between a first lens portion and a second lens portion to become stray light in the collecting lens.
Figure 21:
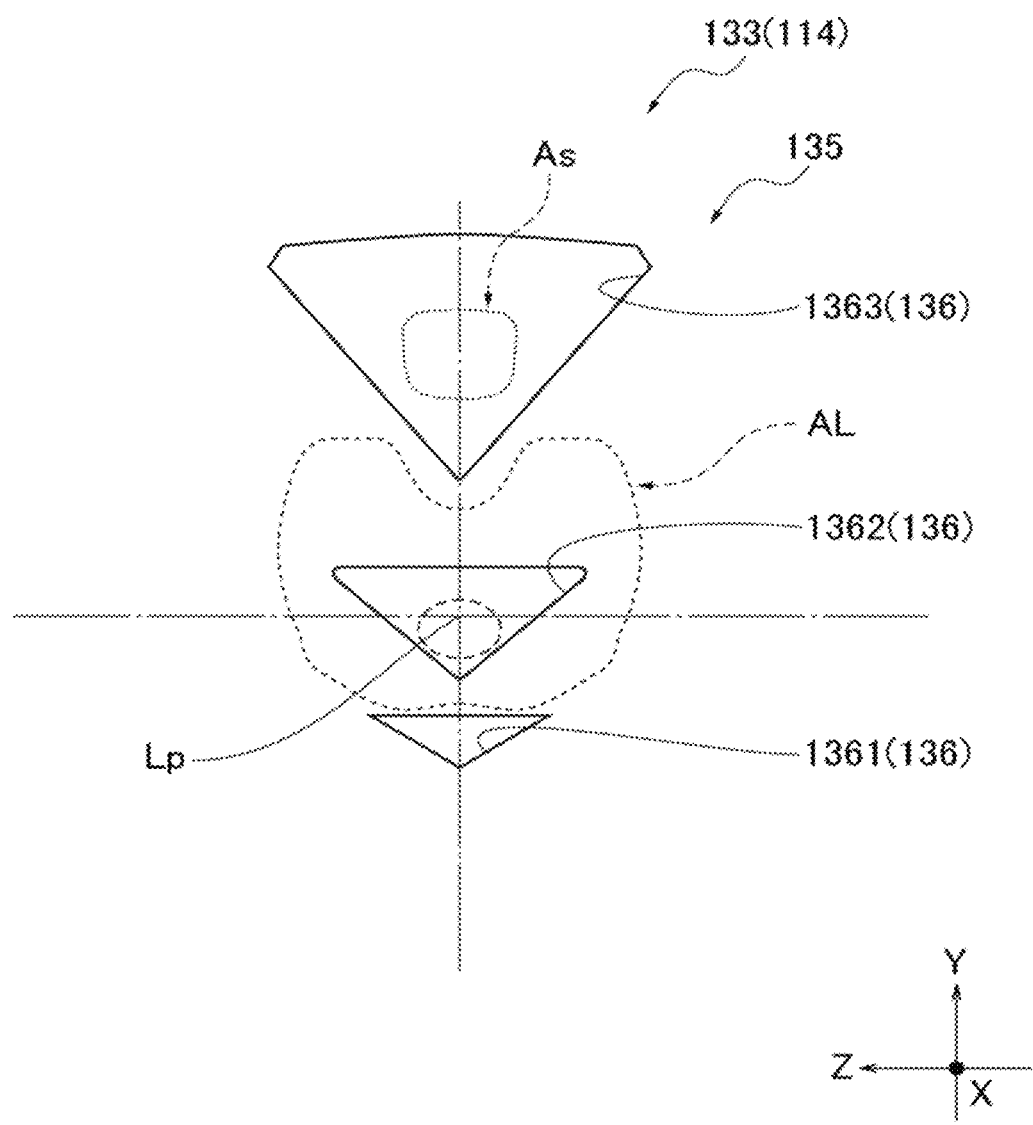
FIG. 21 is an explanatory diagram illustrating a state in which stray light illustrated in FIG. 20 forms an unintended light distribution (stray light area) in a third slit portion when the light from the second light source having passed through the second lens portion forms a light distribution in a second slit portion of the shade.

First, since the collecting lens main body 131 of the collecting lens 113 is configured as described above, basically, the light from the first light source 124 travels to the first lens portion 143 (the first opposing incidence surface portion 151 and the first inclined incidence surface portion 152 thereof), the light from the second light source 125 travels to the second lens portion 144 (the second opposing incidence surface portion 157 and the second inclined incidence surface portion 158 thereof), and the light from the third light source 126 travels to the third lens portion 145 (the third incidence surface 164 thereof). However, since each of the light sources (124, 125, 126) has a predetermined spread in the direction in which the light is emitted, a part of the light may be directed to a lens portion adjacent to the corresponding lens portion. This example is illustrated in FIGS. 20 and 21. In FIG. 20, the collecting lens 113 (the collecting lens main body 131) having the same configuration as that of the present invention is used. This is because the same problem occurs even in the collecting lens 113 (the collecting lens main body 131) when the first light reduction portion 171 and the second light reduction portion 172 are not provided. For this reason, in the following description, the description will be given using unintended light that may occur in a case where the front-surface-side first light reduction portion 173 and the front-surface-side second light reduction portion 175 of the front surface 141 and the back-surface-side first light reduction portion 174 and the back-surface-side second light reduction portion 176 of the back surface 142 are not provided in the collecting lens 113 (the collecting lens main body 131).

FIG. 20 illustrates an example of the situation where a part of the light (hereinafter, also referred to as stray light S) from the second light source 125 travels toward the shade 114 through the portion (the portion corresponding to the second light reduction portion 172) between the second lens portion 144 and the third lens portion 145. The stray light S is incident on the collecting lens main body 131 from between the second opposing incidence surface portion 157 or the second inclined incidence surface portion 158 of the second lens portion 144 and the third incidence surface 164 of the third lens portion 145 (defined as stray light S1). The stray light S travels between the second lens portion 144 and the third lens portion 145 (the portion corresponding to the second light reduction portion 172) (defined as stray light S2), is emitted from between the second emission surface 161 of the second lens portion 144 and the third emission surface 165 of the third lens portion 145, and travels toward the third slit portion 1363 of the shade 114 (defined as stray light S3). FIG. 21 illustrates a light distribution on the shade portion 133 of the shade 114 when only the second light source 125 is turned on and the above-described stray light S occurs.

In the shade portion 133, as described above, the light from the second light source 125 is emitted through the second lens portion 144 so that the second light distribution area AL is formed, in which the vicinity of the apex of the second slit portion 1362 is the brightest while the entire area of the second slit portion 1362 is brightened. When the above-described stray light S has occurred, the stray light S is directed toward the third slit portion 1363 of the shade 114, and thus an unintended light distribution area (hereinafter, referred to as a stray light area AS) is formed in the third slit portion 1363.

The stray light area AS brightens the vicinity of the center of the third slit portion 1363 even though the third light source 126 is turned off. Therefore, when the stray light S occurs in the vehicle lamp 110, even in a case where the second light source 125 is turned on while the third light source 126 is turned off, the second radiation design Di2 can be clearly formed, but a part of the area where the third radiation design Di3 is formed is brightened in a blurred manner. In addition, when the stray light S occurs in the vehicle lamp 110, even in a case where the second light source 125 and the third light source 126 are simultaneously turned on, an unintended area of the third radiation design Di3 is brightened corresponding to the stray light area AS, brightness unevenness occurs, and the appearance is different from the intended appearance, although the second radiation design Di2 can be appropriately formed.

On the other hand, in the vehicle lamp 110, the front-surface-side second light reduction portion 175 and the back-surface-side second light reduction portion 176 as the second light reduction portion 172 are provided between the second lens portion 144 and the third lens portion 145 in the collecting lens main body 131. Therefore, the above-described stray light S1 is blocked or scattered by the back-surface-side second light reduction portion 176 on the back surface 142 of the collecting lens main body 131 and is prevented from traveling into the collecting lens main body 131 like the stray light S2. That is, the back-surface-side second light reduction portion 176 can block the incidence of the stray light S1 to prevent the stray light S1 from becoming the stray light S2 or can diffuse the stray light S1 to prevent the stray light S2, which is strong light (high light flux) forming the stray light area AS, from traveling into the collecting lens main body 131. Further, after passing through the back-surface-side second light reduction portion 176, the stray light S2 is blocked or scattered by the front-surface-side second light reduction portion 175 on the front surface 141 of the collecting lens main body 131. Thus, the stray light S2 is blocked or diffused by the front-surface-side second light reduction portion 175 after being diffused and sufficiently weakened by the back-surface-side second light reduction portion 176 as described above, and therefore, it is possible to prevent the stray light S3, which is strong light (high light flux) forming the stray light area AS, from being emitted from the collecting lens main body 131 in a more reliable manner.

Further, although the above-described stray light S2 may occur even when the stray light does not pass through the back-surface-side second light reduction portion 176, the stray light S2 is blocked or scattered by the front-surface-side second light reduction portion 175 on the front surface 141 of the collecting lens main body 131, and is prevented from being emitted from the collecting lens main body 131 like the stray light S3. Accordingly, the vehicle lamp 110 can prevent the stray light area AS from being formed in the third slit portion 1363 of the shade 114 due to the stray light S from the second light source 125 as described above. Therefore, when the vehicle lamp 110 turns off the third light source 126 and turns on the second light source 125, the second radiation design Di2 can be clearly formed, and the area where the third radiation design Di3 is formed can be kept dark. In addition, when the second light source 125 and the third light source 126 are turned on at the same time, the vehicle lamp 110 can appropriately form the second radiation design Di2 and the third radiation design Di3, and can obtain an intended appearance.

Here, the stray light as described above may cause the same problem even when the light from the third light source 126 travels from between the second lens portion 144 and the third lens portion 145 toward the second slit portion 1362 of the shade 114. On the other hand, the vehicle lamp 110 can also block or scatter such stray light by the front-surface-side second light reduction portion 175 and the back-surface-side second light reduction portion 176 as the second light reduction portion 172.

Further, the stray light described above may cause the same problem even when the light from the second light source 125 travels from between the second lens portion 144 and the first lens portion 143 toward the first slit portion 1361 of the shade 114 or when the light from the first light source 124 travels from between the second lens portion 144 and the first lens portion 143 toward the second slit portion 1362 of the shade 114. In contrast, in the vehicle lamp 110, since the first light reduction portion 171 is provided between the first lens portion 143 and the second lens portion 144 in the collecting lens main body 131, such stray light can also be blocked or scattered by the front-surface-side first light reduction portion 173 and the back-surface-side first light reduction portion 174. For these reasons, the vehicle lamp 110 can appropriately form each of the radiation designs Di, and can make each of the radiation designs Di look as intended.

Here, the collecting lens main body 131 (the collecting lens 113) according to the second embodiment includes, as the first light reduction portion 171 and the second light reduction portion 172, the front-surface-side first light reduction portion 173 and the front-surface-side second light reduction portion 175 of the front surface 141 and the back-surface-side first light reduction portion 174 and the back-surface-side second light reduction portion 176 of the back surface 142. Therefore, the first light reduction portion 171 and the second light reduction portion 172 cannot block or scatter the light traveling between the lens portions (143, 144, 145) in the collecting lens main body 131. However, since the collecting lens main body 131 is provided with the three lens portions (143, 144, 145) individually corresponding to the three light sources (124, 125, 126), it is possible to suppress the light incident on the corresponding lens portion (143, 144, 145) from each light source (124, 125, 126) from being directed to the adjacent lens portion. In particular, in the collecting lens main body 131 according to the second embodiment, each of the lens portions (143, 144, 145) causes the light from the corresponding light source (124, 125, 126) to be incident as parallel light traveling in a substantially parallel manner, and therefore, the amount of light traveling toward an adjacent lens portion can be significantly reduced. For this reason, even when the collecting lens main body 131 (the collecting lens 113) includes the first light reduction portion 171 and the second light reduction portion 172 formed by performing the light reduction processing on predetermined positions of the front surface 141 and the back surface 142, the influence of the stray light described above can be sufficiently suppressed.

In addition, the collecting lens main body 131 (the collecting lens 113) according to the second embodiment is provided with the bottom-surface-side second light reduction portion 177 forming a part of the second light reduction portion 172 by performing the light reduction processing also on the bottom surface 145a located on the second lens portion 144 side in the third lens portion 145. For this reason, in the third lens portion 145, it is possible to suppress the light from being incident from the bottom surface 145a opposed to the second light source 125 and becoming stray light due to the difference in shape between the third incidence surface 164 and the second opposing incidence surface portion 157, the second inclined incidence surface portion 158, and the second reflective surface 159 in the second lens portion 144. Therefore, when the second light source 125 is turned on while the third light source 126 is turned off, the collecting lens main body 131 (the collecting lens 113) can keep the area where the third radiation design Di3 is formed dark, and when the second light source 125 and the third light source 126 are turned on at the same time, the second radiation design Di2 and the third radiation design Di3 can be appropriately formed.

The vehicle lamp 110 according to the second embodiment can obtain the following effects.

The vehicle lamp 110 includes the plurality of light sources (124, 125, 126), the collecting lens 113 that collects light from them, the shade 114 provided with the plurality of slit portions 136 that partially passes the collected light, and the projecting lens 115 that projects the light having passed therethrough to form the radiation pattern Pi including the plurality of radiation designs Di corresponding to the plurality of slit portions 136. The light sources (124, 125, 126) are provided individually corresponding to the slit portions 136, and the collecting lens 113 includes the plurality of lens portions (143, 144, 145) that individually corresponds to the slit portions 136 and overlaps with each other and is provided with the light reduction portions (171, 172) that reduces light between the plurality of lens portions (143, 144, 145). Therefore, the vehicle lamp 110 can sufficiently suppress the influence of the stray light in which the light incident on the corresponding lens portion (143, 144, 145) from each light source (124, 125, 126) is directed to the slit portion 136 different from the corresponding one.

In the vehicle lamp 110, the light reduction portions (171, 172) are formed by performing light reduction processing between the plurality of lens portions (143, 144, 145) on the back surface 142 on the plurality of light sources (124, 125, 126) side in the collecting lens 113. Therefore, the vehicle lamp 110 can suppress the brightness of the place of the radiation design Di which is not turned on or can suppress the occurrence of uneven brightness of the formed radiation design Di and thus the appearance different from the intended one due to the light (the stray light S1→S2) which is incident on the collecting lens 113 from between the lens portions (143, 144, 145).

In the vehicle lamp 110, the light reduction portions (171, 172) are formed by performing light reduction processing between the plurality of lens portions (143, 144, 145) on the surface 141 that is the shielding member (the shade 114) side in the collecting lens 113. Therefore, the vehicle lamp 110 can suppress the brightness of the place of the radiation design Di which is not turned on or can suppress the occurrence of uneven brightness of the formed radiation design Di and thus the appearance different from the intended one due to the light (the stray light S2→S3) emitted from between the lens portions (143, 144, 145).

The vehicle lamp 110 can sequentially turn on the plurality of light sources (124, 125, 126). Therefore, since the vehicle lamp 110 can prevent the place of the radiation design Di corresponding to the turned-off light source from being brightened, it is possible to appropriately express the intention of sequentially turning on the light sources.

In the vehicle lamp 110, the plurality of slit portions 136 includes the first slit portion 1361 corresponding to the first radiation design Di1 of the radiation pattern Pi, the second slit portion 1362 corresponding to the second radiation design Di2 of the radiation pattern Pi, and the third slit portion 1363 corresponding to the third radiation design Di3 of the radiation pattern Pi. Further, the plurality of lens portions (143, 144, 145) includes the first lens portion 143 opposed to the first slit portion 1361, the second lens portion 144 opposed to the second slit portion 1362, and the third lens portion 145 opposed to the third slit portion 1363. The first lens portion 143 includes the first opposing incidence surface portion 151 opposed to the corresponding first light source 124, the first inclined incidence surface portion 152 surrounding it, and the first reflective surface 153 surrounding it. In addition, the second lens portion 144 includes the second opposing incidence surface portion 157 opposed to the corresponding second light source 125, the second inclined incidence surface portion 158 surrounding it, and the second reflective surface 159 surrounding it, and the third lens portion 145 is a convex lens that collects light from the corresponding third light source 126. Therefore, the vehicle lamp 110 can efficiently use the light from the first light source 124 and the second light source 125, and can form a predetermined light flux distribution in the first slit portion 1361 and the second slit portion 1362 while simplifying the configuration of the first lens portion 143 and the second lens portion 144. In addition, the vehicle lamp 110 can form a uniform light flux distribution by using the third lens portion 145 for the third slit portion 1363 with the light from the third light source 126. For these reasons, even with the use of the single collecting lens 113, the vehicle lamp 110 can make the middle of the leading ends of the first radiation design Di1 and the second radiation design Di2 clear as a center, can make the entire third radiation design Di3 clear, and can form the more appropriate radiation pattern Pi.

In the vehicle lamp 110, in the third lens portion 145, the light reduction processing is also performed on the bottom surface 145a located on the second lens portion 144 side. Therefore, when the second light source 125 is turned on while the third light source 126 is turned off, the vehicle lamp 110 can keep the area where the third radiation design Di3 is formed dark, and when the second light source 125 and the third light source 126 are turned on at the same time, the second radiation design Di2 and the third radiation design Di3 can be appropriately formed.

In the vehicle lamp 110, the plurality of lens portions (143, 144, 145) is integrated. Therefore, in the vehicle lamp 110, it is possible to increase the relative positional accuracy between the plurality of lens portions (143, 144, 145) and to facilitate the assembly process and the like.

Therefore, the vehicle lamp 110 according to the second embodiment as the vehicle lamp according to the present disclosure can form the radiation pattern Pi having a desired brightness distribution while efficiently using the light from the plurality of light sources (124, 125, 126).

Although the vehicle lamp according to the present disclosure has been described above based on the second embodiment, the specific configuration is not limited to the second embodiment, and design changes, additions, and the like are allowed without departing from the gist of the invention according to each claim in the scope of claims.

According to the second embodiment, the radiation pattern Pi is configured such that the three radiation designs Di have a substantially isosceles triangle shape having a base on the vehicle 101 side and are arranged at substantially equal intervals in a direction away from the vehicle 101. However, as long as the radiation pattern includes the plurality of radiation designs Di formed by the shade (shielding member), the design of the symbol as the radiation design Di, the formation position, the number of the radiation designs Di, and the like, may be appropriately set, and are not limited to the configuration according to the second embodiment.

Although the vehicle lamp 110 is provided in the front portion of the vehicle 101 according to the second embodiment, the vehicle lamp 110 may be accommodated in a door mirror, may be provided in a lamp chamber of a headlight or a lamp chamber of a tail lamp (lamp chambers on both right and left sides of a rear portion of the vehicle), or may be provided in a vehicle body as long as it is provided in the vehicle 101 in accordance with the position where the radiation pattern is formed for the vehicle 101, and is not limited to the configuration according to the second embodiment.

Furthermore, according to the second embodiment, each of the light sources (124, 125, 126) emits amber light. However, the color of the light emitted from the light source may be appropriately set in accordance with the arrangement location and the content to be conveyed, and is not limited to the configuration according to the second embodiment.

According to the second embodiment, the shade 114 that causes the light collected by the collecting lens 113 to pass through the radiating slit 135 is used as the shielding member. However, the shielding member may have another configuration as long as it is provided with the plurality of slit portions 136 (the radiating slits 135) that partially passes the light collected by the collecting lens 113, and is not limited to the configuration according to the second embodiment. As another configuration, for example, it is possible to use a shielding plate (filter) in which a plurality of radiating slits that partially transmits light is provided in a plate-shaped film member that blocks the transmission of light and the light having passed through the collecting lens 113 is transmitted through the plurality of radiating slits.

According to the second embodiment, the vehicle lamp 110 is provided in the vehicle 101 driven by a driver. However, the vehicle lamp may be provided in a vehicle having an automatic driving function, and is not limited to the configuration according to the second embodiment. In this case, the vehicle lamp may form the radiation pattern at the timing corresponding to the usage for which the vehicle lamp is provided, i.e., at the timing corresponding to some intention regarding the operation of the vehicle 101, and is not limited to the configuration according to the second embodiment.

According to the second embodiment, the light source portion 112 is provided on the installation base portion 111 having a function as a heat sink, and the collecting lens 113, the shade 114, and the projecting lens 115 are attached to the installation base portion 111. However, the vehicle lamp may have a different configuration as long as the light from the light source is collected on the shielding member by the collecting lens and is projected by the projecting lens to form the radiation pattern, and is not limited to the configuration according to the second embodiment.

According to the second embodiment, each of the light sources (124, 125, 126) includes an LED chip and a phosphor covering it. However, as long as the light sources (124, 125, 126) individually correspond to the lens portions (143, 144, 145), the configuration of each of the light sources may be appropriately set and is not limited to the configuration according to the second embodiment.

According to the second embodiment, first, the third light source 126 is turned on, then the second light source 125 is turned on while the third light source 126 is continuously turned on, then the first light source 124 is turned on while the third light source 126 and the second light source 125 are continuously turned on, then the light sources (124, 125, 126) are turned off at the same time, and thereafter this is repeated. However, all of the light sources (124, 125, 126) may be turned on at the same time, all of the light sources may be turned on individually, or the light sources may be turned on in combination at random as appropriate, the order in which the light sources are turned on and the mode in which the light sources are turned on can be set as appropriate, and are not limited to the mode according to the second embodiment.

According to the second embodiment, the first light reduction portion 171 and the second light reduction portion 172 include the front-surface-side first light reduction portion 173 and the front-surface-side second light reduction portion 175 of the front surface 141 and the back-surface-side first light reduction portion 174 and the back-surface-side second light reduction portion 176 of the back surface 142 in the collecting lens main body 131 (the collecting lens 113). However, each of the light reduction portions (171, 172) is not limited to the configuration according to the second embodiment as long as the light reduction portion is provided between the corresponding lens portions (143, 144, 145) to block or scatter the progress of light. For example, each of the light reduction portions (171, 172) may be formed in a plate shape between the corresponding lens portions (143, 144, 145), i.e., may block or scatter the light traveling between the lens portions (143, 144, 145) in the collecting lens main body 131.

Hereinafter, a vehicle lamp according to a third embodiment of the present disclosure will be described with reference to the drawings. It should be noted that the present invention is not limited to the third embodiment. In addition, constituent elements according to the third embodiment described below include those that can be easily replaced by those skilled in the art or those that are substantially the same.

Third Embodiment

Figure 22:
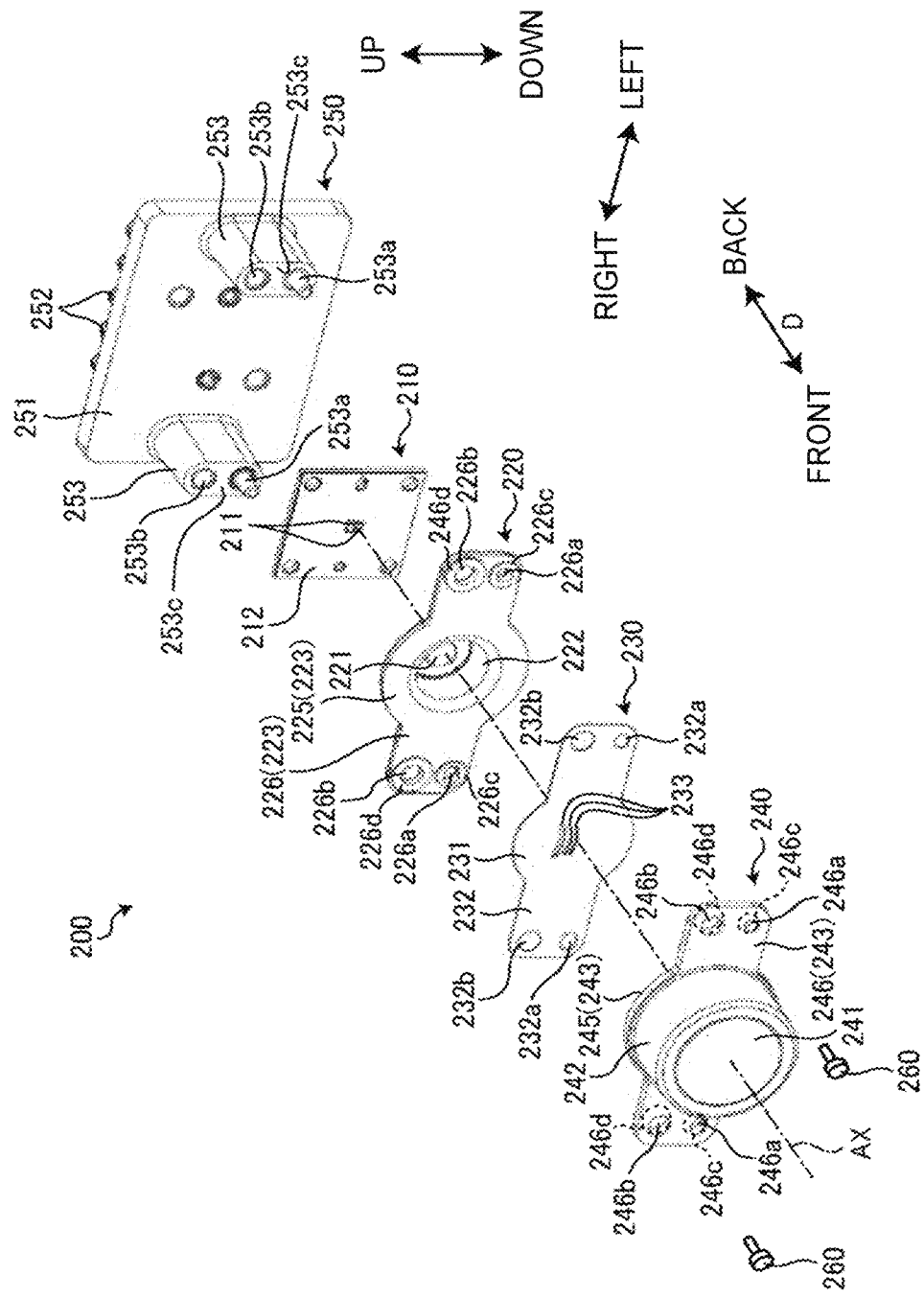
FIG. 22 is an exploded perspective view illustrating an example of a vehicle lamp according to a third embodiment.
Figure 23:
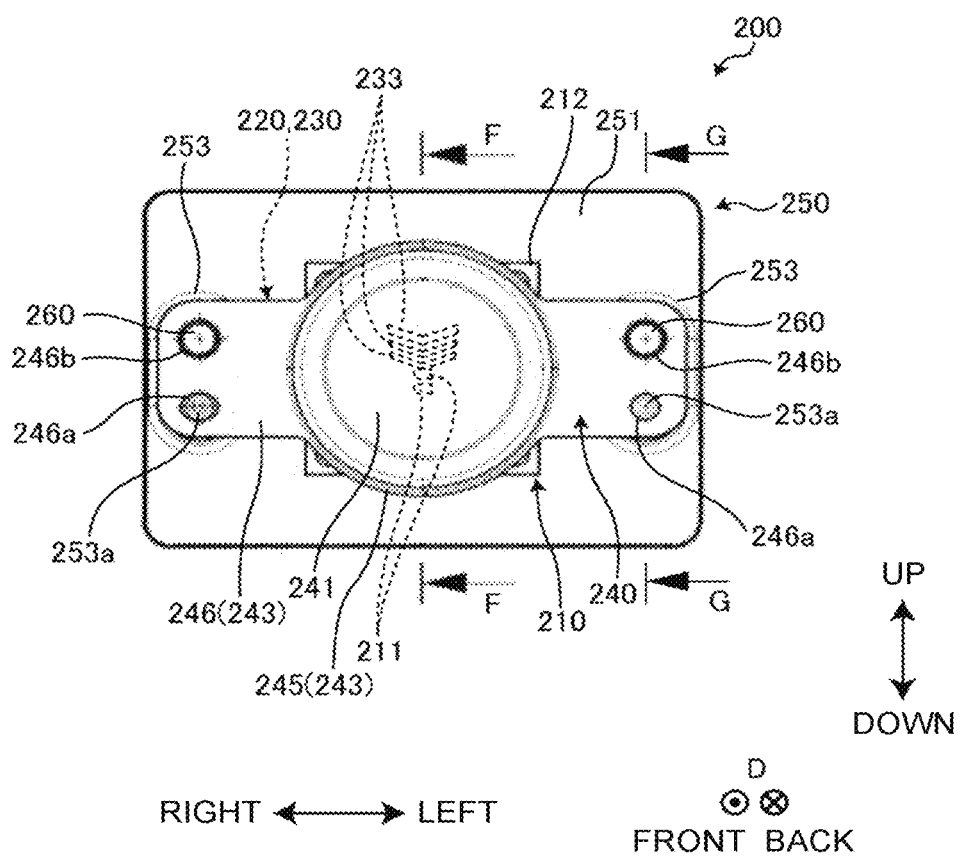
FIG. 23 is a diagram illustrating a state of the vehicle lamp as viewed from the front.
Figure 24:
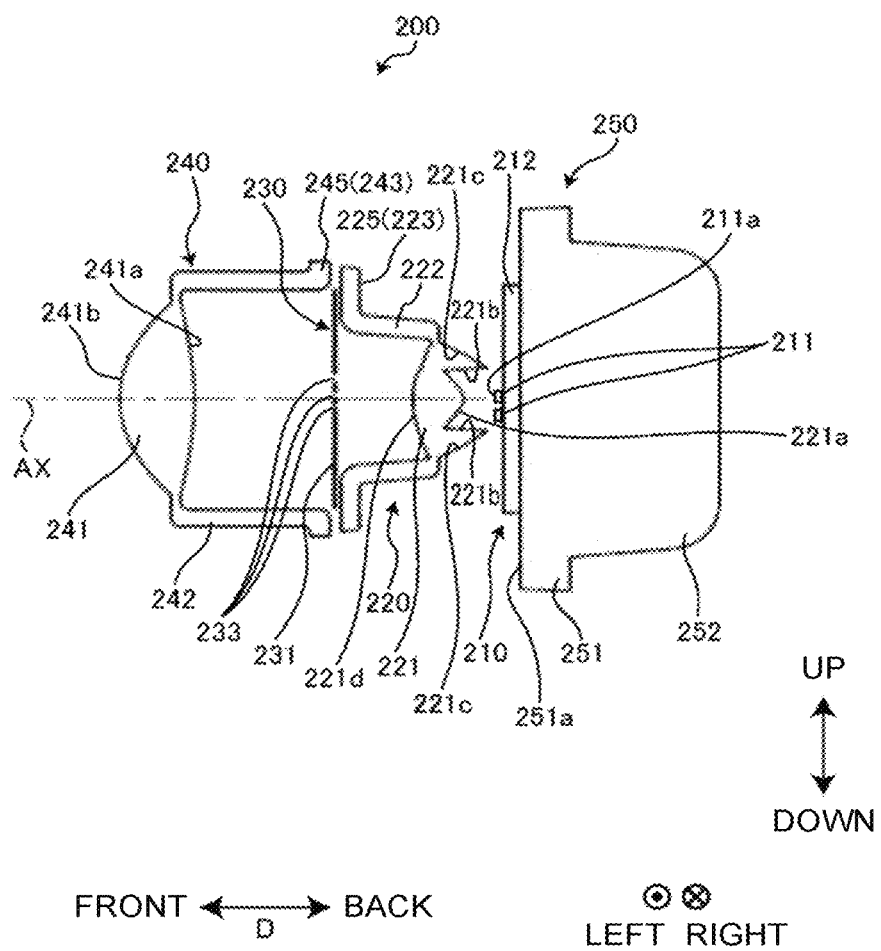
FIG. 24 is a diagram illustrating a configuration along a cross-section of F-F in FIG. 23.
Figure 25:
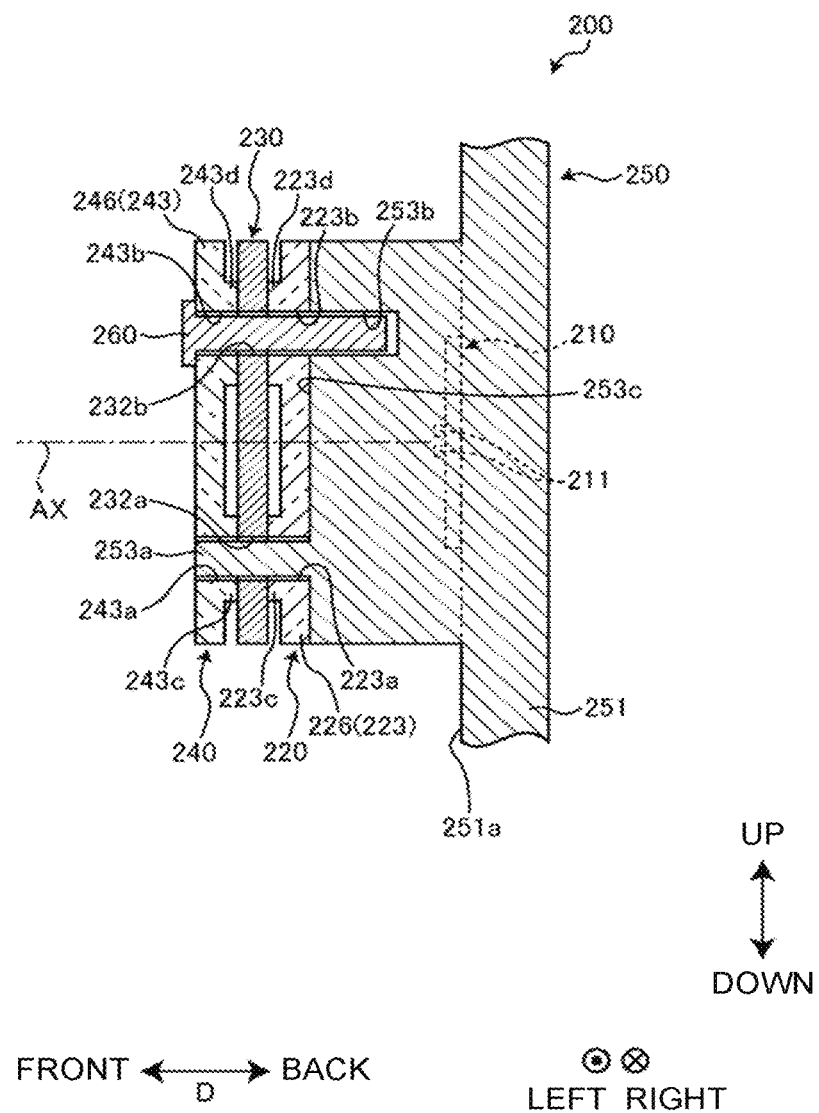
FIG. 25 is a diagram illustrating a configuration along a cross-section of G-G in FIG. 23.

FIG. 22 is an exploded perspective view illustrating an example of a vehicle lamp 200 according to the third embodiment. FIG. 23 is a diagram illustrating a state of the vehicle lamp 200 when viewed from the front. FIG. 24 is a diagram illustrating a configuration along a cross-section of F-F in FIG. 23. FIG. 25 is a diagram illustrating a configuration along a cross-section of G-G in FIG. 23. FIG. 25 is an enlarged view of a portion fixed to a fixing portion 253. As illustrated in FIGS. 22 to 25, the vehicle lamp 200 includes a light source portion 210, a collecting lens member 220, a shielding member 230, a projecting lens member 240, and a supporting member 250.

The light source portion 210 includes a light source 211 and a substrate 212. The light source 211 is, for example, a semiconductor-type light source such as an LED. The light source 211 includes a light emission surface 211$a$ that emits light. The light emission surface 211$a$ is provided to be opposed to a collecting lens 221 of the collecting lens member 220. The light source 211 emits, for example, orange (amber) light from the light emission surface 211$a$. The light sources 211 are arranged side by side in the up-down direction in a vehicle-mounted state. For example, the two light sources 211 are provided. The arrangement and the number of the light sources 211 are not limited to those described above. Further, the color of the light emitted from the light emission surface 211$a$ is not limited to orange, and may be another color such as white.

The light source 211 is mounted on the substrate 212. A wiring, a circuit, and the like for transmitting a signal to the light source 211 are formed on the substrate 212. The substrate 212 is fixed to a base portion 251 of the supporting member 250 described below.

The collecting lens member 220 includes a collecting lens 221, a cylindrical portion 222, and a collecting lens frame 223. In the collecting lens member 220, the collecting lens 221, the cylindrical portion 222, and the collecting lens frame 223 are formed as one member. The entire collecting lens member 220 is formed using the material forming the collecting lens 221. The collecting lens 221 is formed using a material capable of transmitting light from the light source 211. Examples of such a material include a resin material such as polycarbonate, but other materials such as acrylic may be used. In this case, the whole of the collecting lens member 220 can be easily formed by integral molding using the material forming the collecting lens 221. In the collecting lens member 220, a portion different from the collecting lens 221, i.e., at least a part of the cylindrical portion 222 and the collecting lens frame 223 may be formed using a material different from that of the collecting lens 221.

The collecting lens 221 collects the light emitted from the light source 211. As illustrated in FIG. 24, the collecting lens 221 includes a first incidence surface 221a, a second incidence surface 221b, a reflective surface 221c, and an emission surface 221d. The first incidence surface 221a is provided in front of the light source 211. The light emitted forward from the light source 211 is incident on the first incidence surface 221a.

The second incidence surface 221b is provided along the outer periphery of the first incidence surface 221a. The light emitted from the light source 211 in an inclined manner with respect to an optical axis AX is incident on the second incidence surface 221b. According to the third embodiment, an optical axis direction D is a direction along the optical axis AX. According to the third embodiment, the optical axis direction D coincides with the front-back direction.

The reflective surface 221c internally reflects the light incident from the second incidence surface 221b.

The emission surface 221d emits forward the light incident from the first incidence surface 221a and the light incident from the second incidence surface 221b and internally reflected by the reflective surface 221c.

The cylindrical portion 222 holds the collecting lens 221. The cylindrical portion 222 has, for example, a cylindrical shape. The cylindrical portion 222 connects the collecting lens 221 and the collecting lens frame 223. The cylindrical portion 222 is provided to protrude backward (toward the light source) with respect to the collecting lens frame 223. With this configuration, the collecting lens 221 is provided behind the collecting lens frame 223.

The collecting lens frame 223 holds the collecting lens 221 via the cylindrical portion 222. The collecting lens frame 223 has a flat plate shape. The collecting lens frame 223 includes an annular portion 225 protruding in the up-down direction from the cylindrical portion 222 and a band-shaped portion 226 protruding in the right-left direction from the cylindrical portion 222. The annular portion 225 is provided annularly along the outer periphery of the cylindrical portion 222. The band-shaped portion 226 is provided linearly in the right-left direction from the cylindrical portion 222. Corner portions on both sides in the right-left direction of the band-shaped portion 226 have a rounded shape. The band-shaped portion 226 is supported by an end surface 253c of the fixing portion 253 of the supporting member 250 described below. The band-shaped portion 226 includes a positioning opening 226a and a fixing opening 226b. A positioning protrusion 253a of the supporting member 250 described below is inserted into the positioning opening 226a. A fixing member 260 described below is inserted into the fixing opening 226b. The band-shaped portion 226 includes contact portions 226c and 226d. The contact portion 226c is provided along the outer periphery of the positioning opening 226a and protrudes forward from the band-shaped portion 226. The contact portion 226d is provided along the outer periphery of the fixing opening 226b and protrudes forward from the band-shaped portion 226. The contact portions 226c, 226d are formed so that the leading end surface in the protruding direction is flat. The collecting lens frame 223 is in contact with the shielding member 230 at the contact portions 226c, 226d. With this configuration, it is possible to secure the positional accuracy of the collecting lens frame 223 by appropriately defining the dimension such as the height in the protruding direction of the contact portions 226c, 226d of the band-shaped portion 226.

The shielding member 230 includes a slit formation portion 231 and a shielding frame 232. In the shielding member 230, the slit formation portion 231 and the shielding frame 232 are formed in a flat plate shape as one member. The entire shielding member 230 is formed using a material capable of shielding light. Examples of such a material include a material such as a metal, but other materials may be used.

The slit formation portion 231 is provided in, for example, a circular shape. The slit formation portion 231 includes a slit 233. The slit 233 causes a part of the light collected by the collecting lens 221 to pass therethrough. For example, the slits 233 are formed in a state where three slits are arranged in the up-down direction. The number and arrangement of the slits 233 are not limited to those described above.

The shielding frame 232 protrudes linearly in the right-left direction from the slit formation portion 231. Corner portions on both sides in the right-left direction of the shielding frame 232 have a rounded shape. Both front and back surfaces of the shielding frame 232 are flat. The shielding frame 232 is supported by the contact portions 226c, 226d of the band-shaped portion 226 of the collecting lens frame 223. Since the shielding frame 232 is supported by the contact portions 226c, 226d, the shielding frame 232 includes a positioning opening 232a and a fixing opening 232b. The positioning protrusion 253a of the supporting member 250 described below is inserted into the positioning opening 232a. The fixing member 260 described below is inserted into the fixing opening 232b.

The shielding member 230 is formed to cover the collecting lens 221 and the collecting lens frame 223 of the collecting lens member 220 when viewed from the front. For example, the slit formation portion 231 is provided at the position corresponding to the collecting lens 221 and is formed to have the shape and the dimension corresponding to the collecting lens 221. In addition, the shielding frame 232 is provided at the position corresponding to the collecting lens frame 223 and is formed to have the shape and the dimension corresponding to the collecting lens frame 223. According to the third embodiment, the shielding member 230 is formed to have the same or substantially the same outer shape as the collecting lens member 220 when viewed from the front. With this configuration, the light having passed through the collecting lens 221 and the collecting lens frame 223 can be blocked by the shielding member 230.

The projecting lens member 240 includes a projecting lens 241, a cylindrical portion 242, and a projecting lens frame 243. The projecting lens 241 projects the light having passed through the slit 233 onto the road surface in front of the vehicle to form a radiation pattern. In the projecting lens member 240, the projecting lens 241, the cylindrical portion 242, and the projecting lens frame 243 are formed as one member. The entire projecting lens member 240 is formed using a material that transmits light. The projecting lens 241 is formed using a material capable of transmitting light from the light source 211. Examples of such a material include a resin material such as acrylic, but other materials may be used. In this case, the entire projecting lens member 240 can be easily formed by integral molding using the material forming the projecting lens 241. The entire projecting lens member 240 is formed of a material different from that of the collecting lens member 220, but may be entirely formed of the same material as that of the collecting lens member 220.

In the projecting lens member 240, a portion different from the projecting lens 241, i.e., at least a part of the cylindrical portion 242 and the projecting lens frame 243 may be formed using a material different from that of the projecting lens 241.

As illustrated in FIG. 24, the projecting lens 241 includes an incidence surface 241a and an emission surface 241b. The light having passed through the slit 233 is incident on the incidence surface 241a. The emission surface 241b emits forward the light incident from the incidence surface 241a.

The cylindrical portion 242 holds the projecting lens 241. The cylindrical portion 242 has, for example, a cylindrical shape. The cylindrical portion 242 connects the projecting lens 241 and the projecting lens frame 243. The cylindrical portion 242 is provided to protrude forward with respect to the projecting lens frame 243. With this configuration, the projecting lens 241 is provided in front of the projecting lens frame 243.

The projecting lens frame 243 holds the projecting lens 241 via the cylindrical portion 242. The projecting lens frame 243 has a flat plate shape. The projecting lens frame 243 includes an annular portion 245 that protrudes from the cylindrical portion 242 in the up-down direction and a band-shaped portion 246 that protrudes from the cylindrical portion 242 in the right-left direction. The annular portion 245 is provided annularly along the outer periphery of the cylindrical portion 242. The band-shaped portion 246 is provided linearly in the right-left direction from the cylindrical portion 242. Corner portions on both sides in the right-left direction of the band-shaped portion 246 have a rounded shape. The band-shaped portion 246 includes a positioning opening 246a and a fixing opening 246b. The positioning protrusion 253a of the supporting member 250 described below is inserted into the positioning opening 246a. The fixing member 260 described below is inserted into the fixing opening 246b. The band-shaped portion 246 includes contact portions 246c, 246d. The contact portion 246c is provided along the outer periphery of the positioning opening 246a and protrudes backward from the band-shaped portion 246. The contact portion 246d is provided along the outer periphery of the fixing opening 246b and protrudes backward from the band-shaped portion 246. The contact portions 246c, 246d are formed so that the leading end surface in the protruding direction is flat. The projecting lens frame 243 is in contact with the shielding member 230 at the contact portions 246c, 246d. With this configuration, it is possible to ensure the positional accuracy of the projecting lens frame 243 by appropriately defining the dimension, such as the height in the protruding direction, of the contact portions 246c, 246d of the band-shaped portion 246.

The supporting member 250 includes a base portion 251, a fin 252, and a fixing portion 253. The base portion 251 has a flat plate shape. The base portion 251 includes a support surface 251a that supports the light source portion 210. The support surface 251a is a front surface of the base portion 251 and supports the substrate 212.

The fin 252 protrudes backward from the base portion 251. The plurality of fins 252 is provided. The fins 252 radiate the heat generated in the light source 211.

The fixing portion 253 protrudes forward from the support surface 251a of the base portion 251. The fixing portion 253 fixes the collecting lens frame 223, the shielding frame 232, and the projecting lens frame 243. The fixing portion 253 includes a positioning protrusion 253a and a fixing opening 253b. The positioning protrusion 253a and the fixing opening 253b are provided on a front end surface 253c of the fixing portion 253.

The positioning protrusion 253a protrudes forward and penetrates through the positioning opening 226a provided in the band-shaped portion 226 of the collecting lens frame 223, the positioning opening 232a provided in the shielding frame 232, and the positioning opening 246a provided in the band-shaped portion 246 of the projecting lens frame 243 in the front-back direction. The fixing member 260 described below is inserted into the fixing opening 253b.

The end surface 253c is formed, for example, in a flat shape. As illustrated in FIG. 25, the end surface 253c is formed to be perpendicular or substantially perpendicular to the optical axis AX. The collecting lens member 220 is supported by the end surface 253c so that the collecting lens member 220, the shielding member 230, and the projecting lens member 240 overlap with each other in the optical axis direction D. That is, the end surface 253c serves as a reference surface for supporting the collecting lens member 220, the shielding member 230, and the projecting lens member 240. Since the end surface 253c serving as a reference surface is formed to be perpendicular or substantially perpendicular to the optical axis AX, the collecting lens member 220, the shielding member 230, and the projecting lens member 240 can be appropriately provided along the optical axis AX.

The fixing member 260 fixes the collecting lens frame 223, the shielding frame 232, and the projecting lens frame 243 to the fixing portion 253. As the fixing member 260, for example, a fastening member such as a screw is used. The fixing member 260 is inserted into the fixing opening 253b of the fixing portion 253 by penetrating through the fixing opening 226b provided in the band-shaped portion 226 of the collecting lens frame 223, the fixing opening 232b provided in the shielding frame 232, and the fixing opening 246b provided in the band-shaped portion 246 of the projecting lens frame 243.

Figure 26:
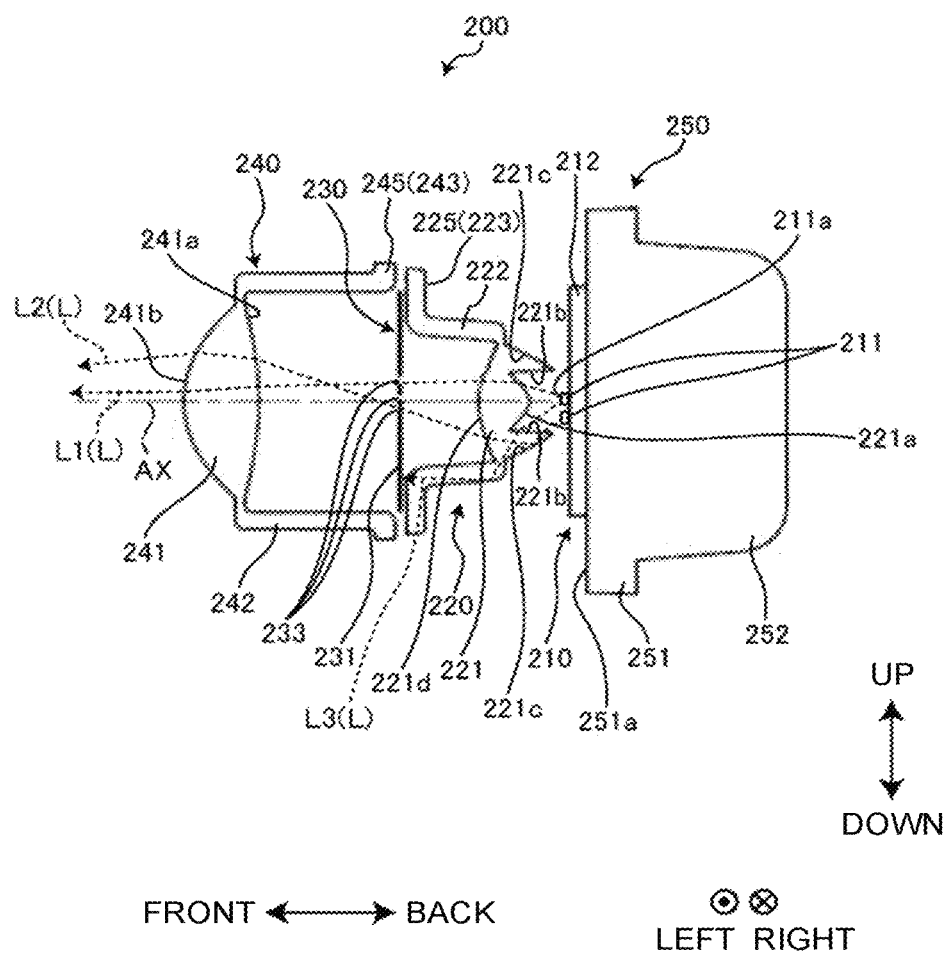
FIG. 26 is a diagram illustrating an example of an operation of the vehicle lamp.

Next, an example of an operation of the vehicle lamp 200 configured as described above will be described. FIG. 26 is a diagram illustrating an example of an operation of the vehicle lamp 200. When the driver performs a predetermined operation such as an operation of a vehicle-side direction indicator or an operation of a hazard switch, the vehicle lamp 200 emits light from the light emission surfaces 211a of the light source 211 in response to the operation.

A part of light L emitted from the light emission surface 211a is incident on the first incidence surface 221a and the second incidence surface 221b of the collecting lens 221. Light L1 incident on the first incidence surface 221a travels inside the collecting lens 221 and is emitted forward from the emission surface 221d. Light L2 incident on the second incidence surface 221b is reflected forward by the reflective surface 221c and is emitted forward from the emission surface 221d. Further, a part of the light L emitted from the light emission surface 211a enters the cylindrical portion 222 or the collecting lens frame 223. Light L3 incident on the cylindrical portion 222 or the collecting lens frame 223 is transmitted through the cylindrical portion 222 and the collecting lens frame 223 and is emitted forward.

The lights L1, L2 emitted forward from the emission surface 221d and the light L3 emitted forward from the cylindrical portion 222 or the collecting lens frame 223 reach the slit formation portion 231 of the shielding member 230. A part of the lights L1, L2 having reached the slit formation portion 231 passes through the slit 233 of the shielding member 230, and the remaining light is shielded by the shielding member 230. Further, the light L3 reaches the shielding frame 232 of the shielding member 230, and is shielded by the shielding frame 232. According to the third embodiment, the collecting lens member 220 and the shielding member 230 are provided such that their outer shapes overlap with each other when viewed from the optical axis direction D. Therefore, the light L3 emitted forward from a portion other than the collecting lens 221 in the collecting lens member 220, i.e., the cylindrical portion 222 or the collecting lens frame 223, is shielded by the shielding member 230. Therefore, the occurrence of glare can be prevented.

Figure 27:
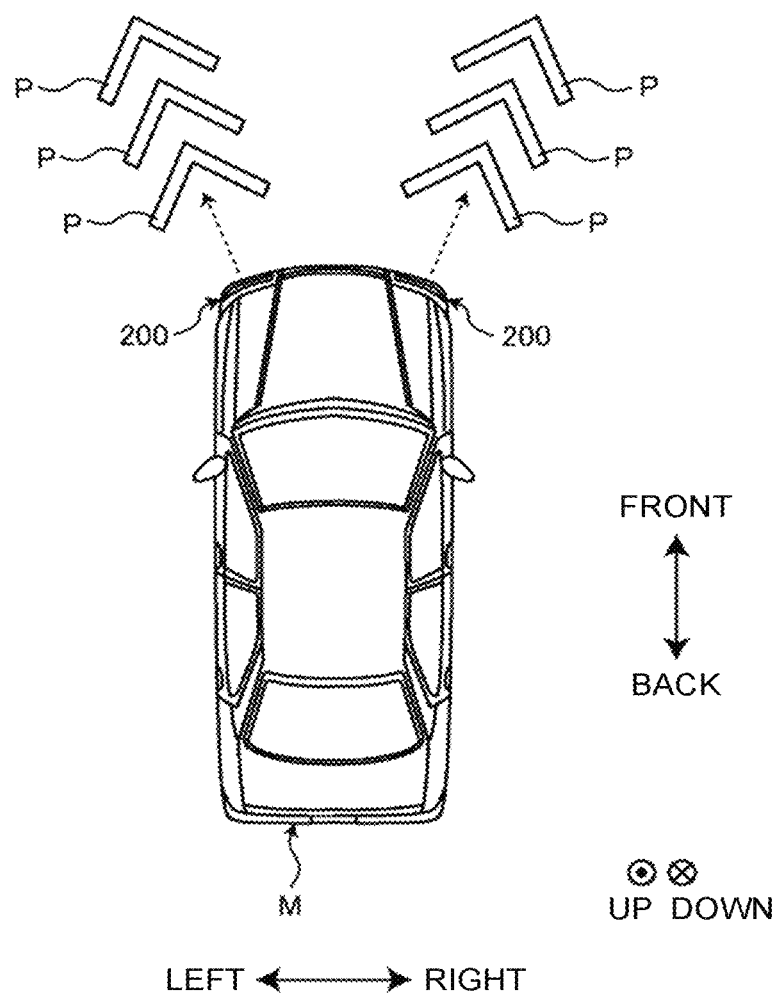
FIG. 27 is a diagram illustrating an example of a radiation pattern formed on a road surface by the vehicle lamp.

The lights L1, L2 having passed through the slits 233 are incident on the incidence surface 241*a* of the projecting lens 241 and are emitted from the emission surface 241*b* to the front of the vehicle. FIG. 27 is a diagram illustrating an example of a radiation pattern formed on a road surface by the vehicle lamp 200. As illustrated in FIG. 27, a radiation pattern P is formed on the road surface ahead of the vehicle M with the lights L1, L2 emitted to the front of the vehicle M.

As described above, the vehicle lamp 200 according to the third embodiment includes the light source 211, the collecting lens member 220 in which the collecting lens 221 that collects light emitted from the light source 211 and the collecting lens frame 223 holding the collecting lens 221 are formed as one member, the shielding member 230 in which the slit formation portion 231 including the slit 233 that partially passes a part of the light collected by the collecting lens 221 and the shielding frame 232 holding the slit formation portion 231 are formed as one member, the projecting lens member 240 provided with the projecting lens 241 that projects the light having passed through the slit 233 onto the road surface to form the radiation pattern P, and the supporting member 250 that supports the light source 211, and the collecting lens member 220, the shielding member 230, and the projecting lens member 240 are fixed to the supporting member 250 such that the collecting lens frame 223 and the shielding frame 232 overlap with each other in the optical axis direction D.

With this configuration, since the collecting lens frame 223 and the shielding frame 232 are fixed to the supporting member 250 to overlap with each other in the optical axis direction D, it is possible to reduce the number of components required for fixing each optical member of the collecting lens member 220, the shielding member 230, and the projecting lens member 240. By reducing the number of parts required for fixing, each optical member can be accurately attached.

In the vehicle lamp 200 according to the third embodiment, the entire collecting lens member 220 is formed using a material that transmits light, and the shielding member 230 is formed to cover the collecting lens 221 and the collecting lens frame 223 of the collecting lens member 220 when viewed from the front. With this configuration, it is possible to form the entire collecting lens member 220 by using the material forming the lens portion that transmits light. Therefore, the collecting lens member 220 can be easily formed at low costs. Further, in this configuration, even when the light from the light source 211 is transmitted through a portion other than the collecting lens 221 of the collecting lens member 220, the light can be shielded by the shielding member 230. Therefore, the occurrence of glare light can be prevented.

In the vehicle lamp 200 according to the third embodiment, the projecting lens 241 and the projecting lens frame 243 holding the projecting lens 241 are formed as one member in the projecting lens member 240, and the collecting lens member 220, the shielding member 230, and the projecting lens member 240 are fixed to the supporting member 250 such that the collecting lens frame 223, the shielding frame 232, and the projecting lens frame 243 overlap with each other in the optical axis direction D. With this configuration, in addition to the collecting lens frame 223 and the shielding frame 232, the projecting lens frame 243 is also fixed to the supporting member 250 to overlap in the optical axis direction D, and thus it is possible to accurately attach each optical member.

In the vehicle lamp 200 according to the third embodiment, the collecting lens 221 is provided behind the collecting lens frame 223 in the optical axis direction in the collecting lens member 220, and the projecting lens 241 is provided in front of the projecting lens frame 243 in the optical axis direction in the projecting lens member 240. With this configuration, the collecting lens 221 and the projecting lens 241 can be efficiently arranged.

In the vehicle lamp 200 according to the third embodiment, the supporting member 250 includes the base portion 251 including the support surface 251*a* that supports the light source 211 and the fixing portion 253 that fixes the collecting lens frame 223, the shielding frame 232, and the projecting lens frame 243, and the fixing portion 253 protrudes from the support surface 251*a*. With this configuration, it is possible to sufficiently secure a space for arranging the collecting lens 221 in the supporting member 250.

In the vehicle lamp 200 according to the third embodiment, the fixing portion 253 is provided with the end surface 253*c* serving as a reference surface to fix the collecting lens frame 223, the shielding frame 232, and the projecting lens frame 243 at the leading end in the protruding direction, and the end surface 253*c* is formed to be orthogonal to the optical axis AX. With this configuration, it is possible to appropriately arrange the collecting lens member 220, the shielding member 230, and the projecting lens member 240 along the optical axis AX.

The technical scope of the present invention is not limited to the above-described third embodiment, and modifications can be made without departing from the spirit of the present invention. For example, according to the third embodiment described above, the configuration in which the entire collecting lens member 220 is formed using a material that transmits light has been described as an example, but the present invention is not limited thereto. The collecting lens member 220 may have a configuration in which at least the collecting lens 221 is formed using a material that transmits light, and the cylindrical portion 222 and the collecting lens frame 223 may be formed using a material that does not transmit light.

Similarly, according to the third embodiment described above, the configuration in which the entire projecting lens member 240 is formed using a material that transmits light has been described as an example, but the present invention is not limited thereto. The projecting lens member 240 may have a configuration in which at least the projecting lens 241 is formed using a material that transmits light, and the cylindrical portion 242 and the projecting lens frame 243 may be formed using a material that does not transmit light.

According to the third embodiment described above, the configuration in which the collecting lens 221 is provided behind the collecting lens frame 223 in the optical axis direction in the collecting lens member 220 and the projecting lens 241 is provided in front of the projecting lens frame 243 in the optical axis direction in the projecting lens member 240 has been described as an example, but the present invention is not limited thereto. For example, the thicknesses of the collecting lens frame 223 and the projecting lens frame 243 may be the same as those of the collecting lens 221 and the projecting lens 241, respectively.

In addition, according to the third embodiment, the configuration in which the fixing portion 253 protrudes from the support surface 251a in the supporting member 250 has been described as an example, but the present invention is not limited thereto. For example, the collecting lens frame 223 may be configured to protrude toward the support surface 251a.

According to the third embodiment described above, the configuration in which the vehicle lamp 200 is provided at the front portion of a vehicle M has been described as an example, but the present invention is not limited thereto. The vehicle lamp 200 may be configured to be provided on a rear portion or a side portion of the vehicle M, and may be configured to form a radiation pattern on a road surface behind or beside the vehicle M.

DESCRIPTION OF REFERENCE NUMERALS

10 VEHICLE LAMP
14 COLLECTING LENS
15 SHADE (AS EXAMPLE OF SHIELDING MEMBER)
16 PROJECTING LENS
31 FIRST LIGHT SOURCE
32 SECOND LIGHT SOURCE
53 RADIATING SLIT
541 FIRST SLIT PORTION (AS EXAMPLE OF FAR-SIDE SLIT PORTION)
542 SECOND SLIT PORTION (AS EXAMPLE OF FAR-SIDE SLIT PORTION)
543 THIRD SLIT PORTION (AS EXAMPLE OF NEAR-SIDE SLIT PORTION)
61 FIRST LENS PORTION
62 SECOND LENS PORTION
65 CURVED INCIDENCE SURFACE PORTION
66 ANNULAR INCIDENCE SURFACE PORTION
67 REFLECTIVE SURFACE
110 VEHICLE LAMP
113 COLLECTING LENS
114 SHADE (AS EXAMPLE OF SHIELDING MEMBER)
115 PROJECTING LENS
124 FIRST LIGHT SOURCE
125 SECOND LIGHT SOURCE
126 THIRD LIGHT SOURCE
136 SLIT PORTION
1361 FIRST SLIT PORTION
1362 SECOND SLIT PORTION
1363 THIRD SLIT PORTION
141 FRONT SURFACE
142 BACK SURFACE
143 FIRST LENS PORTION
144 SECOND LENS PORTION
145 THIRD LENS PORTION
145a BOTTOM SURFACE
151 FIRST OPPOSING INCIDENCE SURFACE PORTION
152 FIRST INCLINED INCIDENCE SURFACE PORTION
153 FIRST REFLECTIVE SURFACE
157 SECOND OPPOSING INCIDENCE SURFACE PORTION
158 SECOND INCLINED INCIDENCE SURFACE PORTION
159 SECOND REFLECTIVE SURFACE
171 FIRST LIGHT REDUCTION PORTION (AS EXAMPLE OF LIGHT REDUCTION PORTION)
172 SECOND LIGHT REDUCTION PORTION (AS EXAMPLE OF LIGHT REDUCTION PORTION)
200 VEHICLE LAMP
210 LIGHT SOURCE PORTION
211 LIGHT SOURCE
211a LIGHT EMISSION SURFACE
212 SUBSTRATE
220 COLLECTING LENS MEMBER
221 COLLECTING LENS
221a FIRST INCIDENCE SURFACE
221b SECOND INCIDENCE SURFACE
221c REFLECTIVE SURFACE
221d, 241b EMISSION SURFACE
222, 242 CYLINDRICAL PORTION
223 COLLECTING LENS FRAME
225, 245 ANNULAR PORTION
226, 246 BAND-SHAPED PORTION
226a, 232a, 246a POSITIONING OPENING
226b, 232b, 246b, 253b FIXING OPENING
226c, 226d, 246c, 246d CONTACT PORTION
230 SHIELDING MEMBER
231 SLIT FORMATION PORTION
232 SHIELDING FRAME
233 SLIT
240 PROJECTING LENS MEMBER
241 PROJECTING LENS
241a INCIDENCE SURFACE
243 PROJECTING LENS FRAME
250 SUPPORTING MEMBER
251 BASE PORTION
251a SUPPORT SURFACE
252 FIN
253 FIXING PORTION
253a POSITIONING PROTRUSION
253c END SURFACE
260 FIXING MEMBER
Ai INNER RING LIGHT DISTRIBUTION AREA
Ao OUTER RING LIGHT DISTRIBUTION AREA
A1 FIRST LIGHT DISTRIBUTION AREA
A2 SECOND LIGHT DISTRIBUTION AREA
AX OPTICAL AXIS
D OPTICAL AXIS DIRECTION
Di RADIATION DESIGN
Di1 FIRST RADIATION DESIGN
Di2 SECOND RADIATION DESIGN
Di3 THIRD RADIATION DESIGN
L, L1, L2, L3 LIGHT
Lp PROJECTION OPTICAL AXIS
M VEHICLE
Pi RADIATION PATTERN

The invention claimed is:
1. A vehicle lamp comprising:
a first light source and a second light source arranged in parallel;
a collecting lens that collects light from the first light source and the second light source;
a shielding member that is provided with a radiating slit that partially passes the light collected by the collecting lens; and
a projecting lens that projects the light having passed through the shielding member to form a radiation pattern, wherein the collecting lens includes a first lens portion that corresponds to the first light source and a second lens portion that corresponds to the second light source, the radiating slit includes a near-side slit portion that corresponds to a near-side radiation design projected onto a near position in the radiation pattern and a far-side slit portion that corresponds to a far-side radiation design projected onto a farther position than the near-side radiation design in the radiation pattern, the first lens portion is provided to be opposed to the far-side slit portion, and the second lens portion is provided to be opposed to the near-side slit portion.

2. The vehicle lamp according to claim 1, wherein
the first lens portion forms, on the shielding member, a first light distribution area to irradiate an entire area of the far-side slit portion with light from the first light source, and the second lens portion forms, on the shielding member, a second light distribution area to irradiate an entire area of the near-side slit portion with light from the second light source.

3. The vehicle lamp according to claim 2, wherein
the first lens portion includes a curved incidence surface portion opposed to the first light source, an annular incidence surface portion surrounding the curved incidence surface portion, and a reflective surface surrounding the annular incidence surface portion, the second lens portion is a convex lens that collects light from the second light source, the first lens portion forms, on the shielding member, an inner ring light distribution area to irradiate the far-side slit portion with light from the first light source via the curved incidence surface portion and forms an outer ring light distribution area to irradiate the entire far-side slit portion while providing a light flux in the vicinity of a center of the far-side slit portion higher than surroundings with light from the first light source having passed through the annular incidence surface portion and reflected by the reflective surface, and the first light distribution area is formed such that the inner ring light distribution area and the outer ring light distribution area overlap with each other.

4. The vehicle lamp according to claim 3, wherein the second light distribution area has a lower light flux than the inner ring light distribution area and the outer ring light distribution area and has a smaller light flux difference than the outer ring light distribution area.

5. The vehicle lamp according to claim 1, wherein the first lens portion and the second lens portion are integrated.

6. The vehicle lamp according to claim 1, wherein, in the shielding member, three quarters or more of the far-side slit portion are provided below a projection optical axis of the projecting lens.

7. The vehicle lamp according to claim 1, wherein
the first light source and the second light source are arranged in parallel in a vertical direction, and
the first light source is located below the second light source.

8. The vehicle lamp according to claim 2, wherein
the far-side radiation design includes a first radiation design on a far side and a second radiation design closer to the near-side radiation design than the first radiation design, the far-side slit portion includes a first slit portion that corresponds to the first radiation design and a second slit portion that corresponds to the second radiation design, and the first light distribution area provides, in the vicinity of a center of the first slit portion, the highest light flux in the first light distribution area and the second light distribution area.

9. A vehicle lamp comprising:
a plurality of light sources;
a collecting lens that collects light from the plurality of light sources;
a shielding member that is provided with a plurality of slit portions that partially passes the light collected by the collecting lens; and
a projecting lens that projects the light having passed through the shielding member to form a radiation pattern including a plurality of radiation designs that corresponds to the plurality of slit portions, wherein the light sources are provided individually corresponding to the slit portions, and the collecting lens includes a plurality of lens portions that individually corresponds to the slit portions and overlaps with each other, and the collecting lens is provided with a light reduction portion that reduces light between the plurality of lens portions.

10. The vehicle lamp according to claim 9, wherein the light reduction portion is formed by performing light reduction processing between the plurality of lens portions on a back surface that is a side of the plurality of light sources in the collecting lens.

11. The vehicle lamp according to claim 9, wherein the light reduction portion is formed by performing light reduction processing between the plurality of lens portions on a front surface that is a side of the shielding member in the collecting lens.

12. The vehicle lamp according to claim 9, wherein the plurality of light sources is sequentially turned on.

13. The vehicle lamp according to claim 9, wherein
the plurality of slit portions includes a first slit portion that corresponds to a first radiation design projected onto a distant position in the radiation pattern, a second slit portion that corresponds to a second radiation design projected onto a closer position than the first radiation design in the radiation pattern, and a third slit portion that corresponds to a third radiation design projected onto a closer position than the second radiation design in the radiation pattern, the plurality of lens portions includes a first lens portion opposed to the first slit portion, a second lens portion opposed to the second slit portion, and a third lens portion opposed to the third slit portion, the first lens portion includes a first opposing incidence surface portion opposed to the corresponding light source, a first inclined incidence surface portion surrounding the first opposing incidence surface portion, and a first reflective surface surrounding the first inclined incidence surface portion, the second lens portion includes a second opposing incidence surface portion opposed to the corresponding light source, a second inclined incidence surface portion surrounding the second opposing incidence surface portion, and a second reflective surface surrounding the second inclined incidence surface portion, and the third lens portion is a convex lens that collects light from the corresponding light source.

14. The vehicle lamp according to claim 13, wherein, in the third lens portion, light reduction processing is also performed on a bottom surface located on the second lens portion side.

15. The vehicle lamp according to claim 9, wherein the plurality of lens portions is integrated.

16. A vehicle lamp comprising:
a light source;
a collecting lens member in which a collecting lens that collects light emitted from the light source and a collecting lens frame holding the collecting lens are formed as one member;
a shielding member in which a slit formation portion including a slit that partially passes a part of the light collected by the collecting lens and a shielding frame holding the slit formation portion are formed as one member;
a projecting lens member provided with a projecting lens that projects the light having passed through the slit onto a road surface to form a radiation pattern; and
a supporting member that supports the light source, wherein the collecting lens member, the shielding member, and the projecting lens member are fixed to the supporting member such that the collecting lens frame and the shielding frame overlap with each other in an optical axis direction.

17. The vehicle lamp according to claim 16, wherein
the entire collecting lens member is formed using a material forming the collecting lens, and
the shielding member is formed to cover the collecting lens and the collecting lens frame of the collecting lens member when viewed from the front.

18. The vehicle lamp according to claim 16, wherein
in the projecting lens member, the projecting lens and a projecting lens frame holding the projecting lens are formed as one member, and
the collecting lens member, the shielding member, and the projecting lens member are fixed to the supporting member such that the collecting lens frame, the shielding frame, and the projecting lens frame overlap with each other in the optical axis direction.

19. The vehicle lamp according to claim 18, wherein
the collecting lens of the collecting lens member is provided behind the collecting lens frame in the optical axis direction, and
the projecting lens of the projecting lens member is provided in front of the projecting lens frame in the optical axis direction.

20. The vehicle lamp according to claim 19, wherein
the supporting member includes a base portion including a support surface that supports the light source and a fixing portion that fixes the collecting lens frame, the shielding frame, and the projecting lens frame, and
the fixing portion protrudes from the support surface.

21. The vehicle lamp according to claim 20, wherein
the fixing portion is provided with an end surface serving as a reference surface to fix the collecting lens frame, the shielding frame, and the projecting lens frame at a leading end in a protruding direction, and
the end surface is formed to be orthogonal to the optical axis direction.

* * * * *